United States Patent
Stephanou

(10) Patent No.: US 11,327,051 B1
(45) Date of Patent: May 10, 2022

(54) ULTRASOUND SYSTEM WITH ULTRASONIC ISOLATORS

(71) Applicant: Atlas Sensors, LLC, Sunnyvale, CA (US)

(72) Inventor: Philip Jason Stephanou, Mountain View, CA (US)

(73) Assignee: Atlas Sensors, LLC, Mountain View, CA (US)

( * ) Notice: Subject to any disclaimer, the term of this patent is extended or adjusted under 35 U.S.C. 154(b) by 318 days.

(21) Appl. No.: 16/255,648

(22) Filed: Jan. 23, 2019

Related U.S. Application Data

(60) Provisional application No. 62/641,945, filed on Mar. 12, 2018, provisional application No. 62/625,353, filed on Feb. 2, 2018.

(51) Int. Cl.
*G01N 29/22* (2006.01)
*G01N 29/11* (2006.01)
*G01N 29/07* (2006.01)
*G01N 29/265* (2006.01)

(52) U.S. Cl.
CPC .......... *G01N 29/221* (2013.01); *G01N 29/07* (2013.01); *G01N 29/11* (2013.01); *G01N 29/265* (2013.01); *G01N 2291/0234* (2013.01); *G01N 2291/0289* (2013.01); *G01N 2291/2634* (2013.01)

(58) Field of Classification Search
CPC ...... G01N 29/221; G01N 29/07; G01N 29/11; G01N 29/265; G01N 2291/0234; G01N 2291/0289; G01N 2291/2634
USPC .......................................................... 73/592
See application file for complete search history.

(56) References Cited

U.S. PATENT DOCUMENTS

| | | | | |
|---|---|---|---|---|
| 4,872,526 A * | 10/1989 | Wignall | ............... | G10K 11/002 181/102 |
| 6,051,913 A * | 4/2000 | King | ........................ | H04R 1/00 310/322 |
| 9,880,133 B1 | 1/2018 | Stephanou | | |
| 2007/0267942 A1* | 11/2007 | Matsumoto | ............ | H03H 9/175 310/313 A |
| 2008/0098818 A1* | 5/2008 | Fernald | ................. | G01F 1/7082 73/622 |
| 2010/0000331 A1* | 1/2010 | Gysling | .................. | G01F 15/14 73/861.28 |
| 2010/0208552 A1* | 8/2010 | Camwell | ................. | E21B 47/16 367/82 |
| 2010/0257941 A1* | 10/2010 | Gysling | .................. | G01F 1/667 73/861.28 |
| 2014/0374168 A1* | 12/2014 | Michael | .................. | E21B 17/07 175/320 |

(Continued)

FOREIGN PATENT DOCUMENTS

| | | | | |
|---|---|---|---|---|
| WO | WO-2009126895 A1 * | 10/2009 | ............. | G01F 1/662 |
| WO | WO-2010003063 A2 * | 1/2010 | ............. | G01F 1/662 |

*Primary Examiner* — Lisa M Caputo
*Assistant Examiner* — Rose M Miller
(74) *Attorney, Agent, or Firm* — Van Pelt, Yi & James LLP

(57) ABSTRACT

A system for inspection includes an ultrasound transmitter, an ultrasound receiver, an isolator, and a control system. The ultrasound transmitter, the ultrasound receiver, and the isolator are coupled to an exterior of a metal pipeline. The control system is configured to provide an input signal to the ultrasound transmitter; receive a received signal using the ultrasound receiver; and provide a result based at least in part on the received signal.

42 Claims, 50 Drawing Sheets

(56) References Cited

U.S. PATENT DOCUMENTS

| | | | |
|---|---|---|---|
| 2016/0377144 A1* | 12/2016 | McLean | D06F 37/24 |
| | | | 248/634 |
| 2018/0113098 A1* | 4/2018 | Dahme | G01N 29/2462 |
| 2019/0049613 A1* | 2/2019 | Funke, Jr. | G01V 1/44 |

* cited by examiner

US 11,327,051 B1

ULTRASOUND SYSTEM WITH ULTRASONIC ISOLATORS

CROSS REFERENCE TO OTHER APPLICATIONS

This application claims priority to U.S. Provisional Patent Application No. 62/625,353 entitled NON-DESTRUCTIVE INSTRUMENT FOR DETECTING INSERTS WITHIN STEEL CASINGS filed Feb. 2, 2018 which is incorporated herein by reference for all purposes. This application also claims priority to U.S. Provisional Patent Application No. 62/641,945 entitled ULTRASOUND SYSTEM WITH ULTRASONIC ISOLATORS filed Mar. 12, 2018 which is incorporated herein by reference for all purposes.

BACKGROUND OF THE INVENTION

Polymer pipes are widely used for transporting low pressure gases. For example, Medium Density Poly-Ethylene (MDPE) and Aldyl-A pipes are used in natural gas distribution networks that transport natural gas from high pressure transmission pipelines to end users. The practice of nesting polymer pipe inserts within previously installed lengths of steel pipeline is used as an alternative to removing and replacing existing distribution pipeline sections that have become unfit for service (e.g., because of aging or accidentally inflicted damage). Safely working on distribution pipeline requires a priori knowledge of the presence or absence of such inserts, which must be gleaned without damaging the pipe or disrupting the flow of gas within. Existing approaches are problematic because these approaches are based on, for example, radiography or tapping into the line and require expensive equipment, highly trained operators, and special safety precautions.

BRIEF DESCRIPTION OF THE DRAWINGS

Various embodiments of the invention are disclosed in the following detailed description and the accompanying drawings.

DETAILED DESCRIPTION

Figure 1:
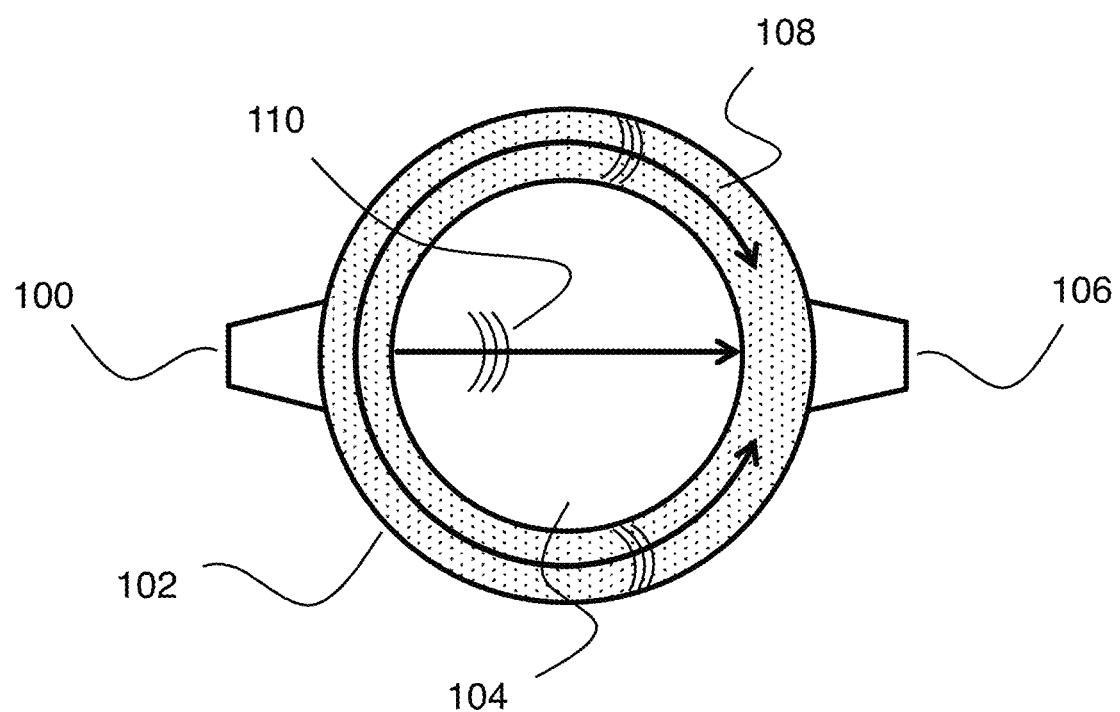
FIG. 1 is a diagram illustrating an embodiment of an ultrasound transmitter and an ultrasound receiver coupled to a metal pipeline.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An ultrasound system with ultrasonic isolators is disclosed. The system is used for inspection and comprises an ultrasound transmitter, an ultrasound receiver, an isolator, and a control system. The ultrasound transmitter, the ultrasound receiver, and the isolator are coupled to an exterior of a metal pipeline. The control system is configured to provide an input signal to the ultrasound transmitter, receive a received signal using the ultrasound receiver, and provide a result based at least in part on the received signal.

Polymer pipes are widely used for transporting low pressure gases. For example, Medium Density Poly-Ethylene (MDPE) and Aldyl-A pipes are used in natural gas distribution networks that transport natural gas from high pressure transmission pipelines to end users. The practice of nesting polymer pipe inserts within previously installed lengths of steel pipeline is used as an alternative to removing and replacing existing distribution pipeline sections that have become unfit for service (e.g., because of aging or accidentally inflicted damage). Safely working on distribution pipeline requires a priori knowledge of the presence or absence of such inserts, which must be gleaned without damaging the pipe or disrupting the flow of gas within. Unlike existing approaches based on, for example, radiography or tapping into the line that require expensive equipment, highly trained operators and special safety precautions, approaches based on ultrasonic sensing can enable compact, high-throughput instruments that are easy to deploy and use in the field.

The system is an improvement over existing approaches. The system is easy to use and does not involve damaging the pipe or disrupting the flow in the pipe. The system does not require highly trained operators or special safety precautions.

FIG. 1 is a diagram illustrating an embodiment of an ultrasound transmitter and an ultrasound receiver coupled to a metal pipeline. In the example shown, metal pipeline 102 comprises a metal pipeline. Ultrasound transmitter 100 and ultrasound receiver 106 are coupled to metal pipeline (e.g., a pipe made from iron, cast iron, steel, another metal, an alloy, etc.). Metal pipeline 102 comprises a pipeline of any appropriate outer diameter and wall thickness. Typically, a metal pipeline comprises a pipeline with outer diameter in the range of ½" to 12" and wall thickness in the range of ⅟₃₂" to ½". In some embodiments, ultrasound transmitter 100 and ultrasound receiver 106 comprise a single unit (e.g., an ultrasound transmitter and an ultrasound receiver housed in a single physical structure). Ultrasound transmitter 100 comprises a comb transducer, a wedge transducer, or any other appropriate transducer type. Metal pipeline 102 encloses enclosed fluid 104 (e.g., air at atmospheric pressure, a gas at less than 100 psi gauge, methane, natural gas, ethane, propane, butane, isobutene, ethylene, propylene, gasoline, butylene, and/or isobutylene, a combination of gases, etc.). Transmission path 110 comprises a desired transmission path for ultrasound from ultrasound transmitter 100 to ultrasound receiver 106 via enclosed fluid 104. For example, ultrasound is carried in desired transmission path 104 via a pressure wave. Parasitic transmission path 108 comprises a parasitic transmission path for ultrasound from ultrasound transmitter 100 to ultrasound receiver 106 via the wall of metal pipeline 102. For example, ultrasound is carried in parasitic transmission path 108 via a Lamb wave mode. In some embodiments, an ultrasound couplant gel is used to enhance coupling between the ultrasound transmitter 100 and metal pipeline 102 and between ultrasound receiver 106 and metal pipeline 102.

Figure 2:
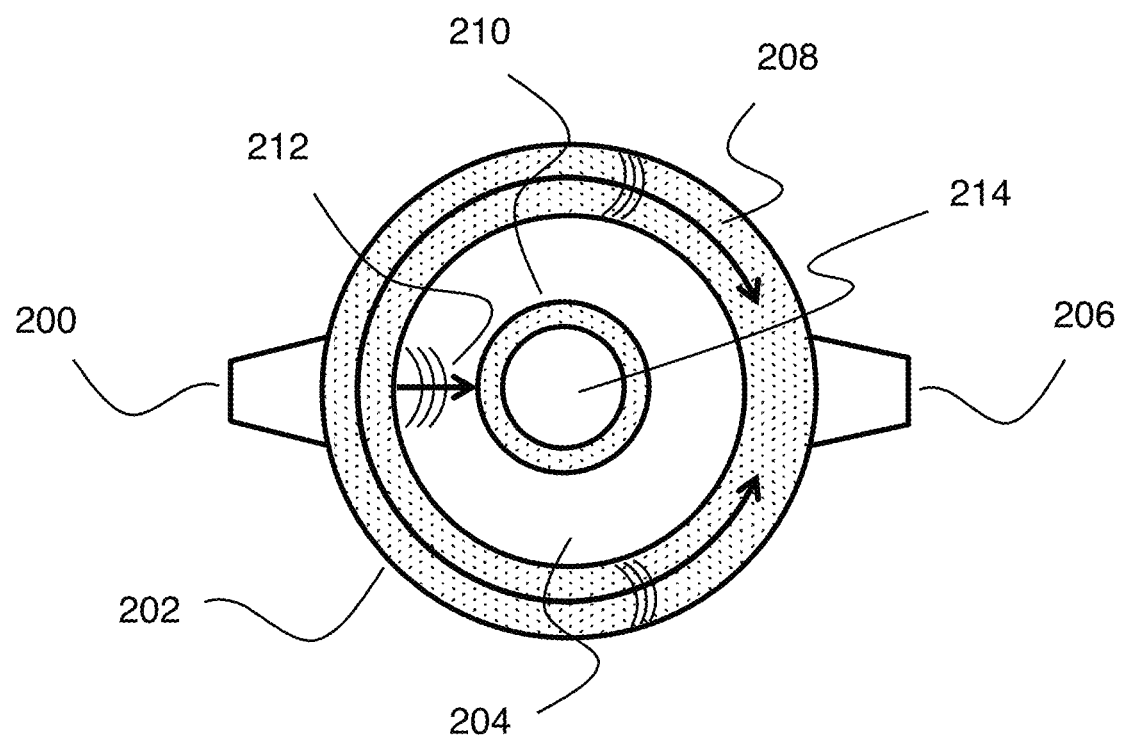
FIG. 2 is a diagram illustrating an embodiment of an ultrasound transmitter and an ultrasound receiver coupled to a metal pipeline including an inserted plastic pipeline.

FIG. 2 is a diagram illustrating an embodiment of an ultrasound transmitter and an ultrasound receiver coupled to a metal pipeline including an inserted plastic pipeline. In the example shown, ultrasound transmitter 200 and ultrasound receiver 206 are coupled to metal pipeline 202. Metal pipeline 202 comprises a metal pipeline (e.g., a pipe made from iron, cast iron, steel, another metal, an alloy, etc.). Metal pipeline 202 comprises a pipeline of any appropriate outer diameter and wall thickness. Typically, a metal pipeline comprises a pipeline with outer diameter in the range of ½" to 12" and wall thickness in the range of ¹⁄₃₂" to ½". Metal pipeline 202 encloses enclosed fluid 204. For example, fluid 204 comprises air with less than 30 psi gauge. In various embodiments, enclosed fluid 204 comprises one or more of the following: air at atmospheric pressure, a gas at less than 100 psi gauge, methane, natural gas, ethane, propane, butane, isobutene, ethylene, propylene, gasoline, butylene, and/or isobutylene, a combination of gases, or any other appropriate fluid or gas. Metal pipeline 202 additionally encloses inserted pipeline 210. Inserted pipeline 210 comprises a pipeline made from medium density polyethylene (e.g., MDPE), Aldyl-A, another polymer, a metal, etc. For example, inserted pipeline 210 encloses an enclosed fluid 214 (e.g., a gas with less than 100 psi gauge). In various embodiments, enclosed fluid 204 and enclosed fluid 214 are isolated (i.e., inserted pipeline 210 is gas-tight). In various embodiments, enclosed fluid 204 and enclosed fluid 214 are connected (i.e., inserted pipeline 210 leaks). The outer diameter of inserted pipeline 210 is typically in the range of 10% to 100% of the inner diameter of metal pipeline 202. Transmission path 212 comprises an ultrasound transmission path through enclosed fluid 204. Transmission path 212 is obstructed by inserted pipeline 210. Inserted pipeline 210 comprises an ultrasound absorber and/or reflector, absorbing and/or reflecting ultrasound transmitted along transmission path 212. For example, the lack of ultrasound signal transmitted along transmission path 212 and received at ultrasound receiver 206 should be interpreted as an indication of the presence of inserted pipeline 210. Ultrasound is transmitted from ultrasound transmitter 200 to ultrasound receiver 206 via parasitic transmission path 208. Detection of ultrasound transmitted via parasitic transmission path 208 can be interpreted as a false indication of no inserted pipeline present.

Figure 3:
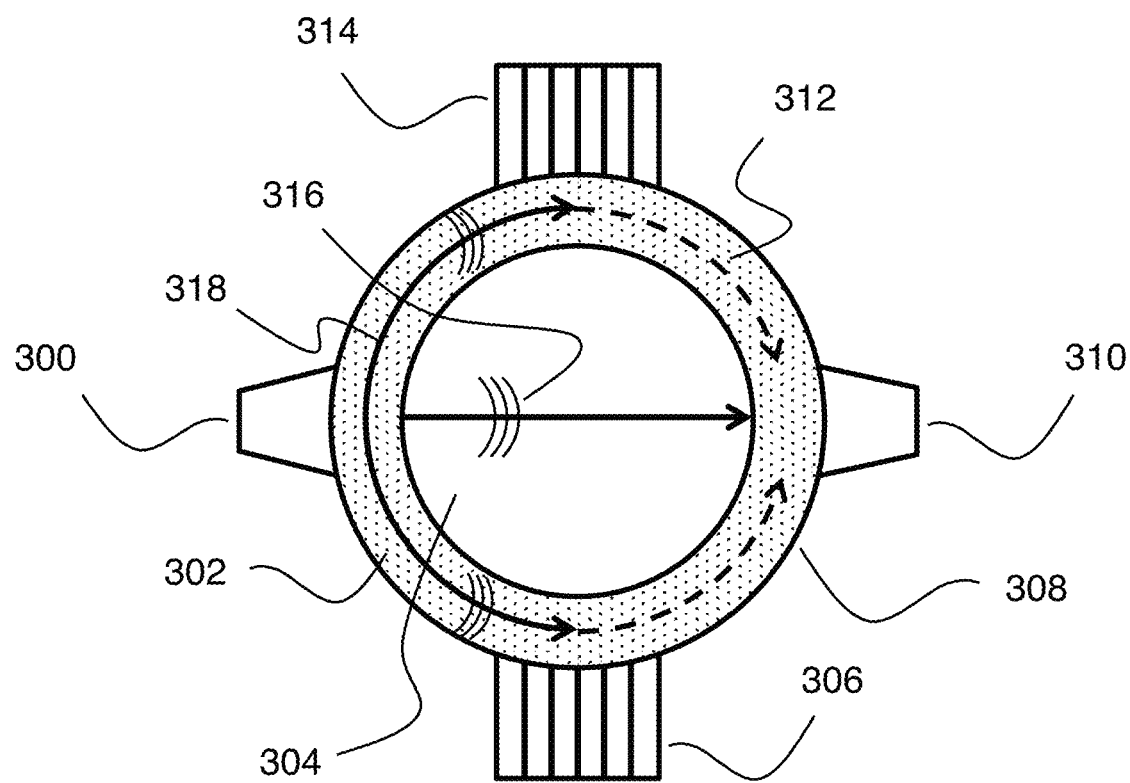
FIG. 3 is a diagram illustrating an embodiment of an ultrasound transmitter, an ultrasound receiver, and two ultrasound isolators coupled to a metal pipeline.

FIG. 3 is a diagram illustrating an embodiment of an ultrasound transmitter, an ultrasound receiver, and two ultrasound isolators coupled to a metal pipeline. In the example shown, ultrasound transmitter 300 and ultrasound receiver 310 are coupled to metal pipeline 308. Metal pipeline 308 comprises a metal pipeline (e.g., a pipe made from iron, cast iron, steel, another metal, an alloy, etc.). Metal pipeline 308 comprises a pipeline of any appropriate outer diameter and wall thickness. Typically, a metal pipeline comprises a pipeline with outer diameter in the range of ½" to 12" and wall thickness in the range of ¹⁄₃₂" to ½". Metal pipeline 308 encloses enclosed fluid 304. In various embodiments, enclosed fluid 304 comprises one or more of the following: air at atmospheric pressure, a gas at less than 100 psi gauge, methane, natural gas, ethane, propane, butane, isobutene, ethylene, propylene, gasoline, butylene, and/or isobutylene, a combination of gases, or any other appropriate fluid or gas. Transmission path 316 comprises a desired transmission path for ultrasound from ultrasound transmitter 300 to ultrasound receiver 310 via enclosed fluid 304. Transmission path 318 and transmission path 312 comprise a parasitic transmission path for ultrasound from ultrasound transmitter 300 to ultrasound receiver 310 via wall 302 of metal pipeline 308.

Ultrasound isolator 306 and ultrasound isolator 314 are coupled to metal pipeline 308. For example, ultrasound isolator 306 and ultrasound isolator 314 comprise ultrasound isolators tuned to the wavelength of ultrasound waves emitted by ultrasound transmitter 300 propagating on transmission path 318 and transmission path 312. Ultrasound isolator 306 and ultrasound isolator 314 attenuate and/or reflect ultrasound propagating on transmission path 318, reducing the magnitude of the ultrasound signal received at ultrasound receiver 310 via transmission path 312. Ultrasound isolator 306 and ultrasound isolator 314 additionally increase the magnitude of the ultrasound signal received at ultrasound receiver 310 via transmission path 316. For example, each of ultrasound isolator 306 and ultrasound isolator 314 comprise an isolator of a plurality of isolators, wherein the isolator is for reducing ultrasound transmission along one or more spurious transmission paths (e.g., a circumferential transmission path in wall 302 of metal pipeline 308—for example, transmission path 312) and/or increasing ultrasound transmission along one or more desired transmission paths (e.g., axial transmission paths in wall 302 of metal pipeline 308 or transmission paths across enclosed fluid 304—for example, transmission path 316). In some embodiments, an ultrasound couplant gel is used to enhance coupling between the one or more ultrasound isolators and metal pipeline 308.

For example, an ultrasound isolator (e.g., ultrasound isolator 306 and/or ultrasound isolator 314) creates a boundary that confines an ultrasound wave in a region of metal pipeline 308 (e.g., in transmission path 318) or excludes an ultrasound wave from a region of metal pipeline 308 (e.g., from transmission path 312). The boundary to transmission of ultrasound waves comprises a structure with a higher acoustic impedance and lower acoustic impedance. For example, the boundary to transmission of ultrasound waves is caused by an impedance mismatch (e.g., a mismatch in an acoustic impedance of a first region of the ultrasonic isolator and a second region of the ultrasonic isolator). The boundary condition can confine resonant ultrasound waves within a region of metal pipeline 308 (e.g., a region centered on ultrasound transmitter 300), thereby increasing the coupled energy into enclosed fluid 304. The structure is made from any appropriate higher and/or lower acoustic impedance materials, for example comprising one or more of a metal, a void, and/or a polymer. The structure comprises an appropriate structure—for example, a comb structure, a staggered comb structure, and/or an array of posts. Fingers of the structure (e.g., fingers of a comb structure, posts, etc.) comprise a fingers-away-from-coupling topology (e.g., fingers joined on an end near a coupling of the isolator to a metal pipeline and free on an end opposite the coupling) or a fingers-toward coupling topology (e.g., fingers joined on an end opposite a coupling of the isolator to a metal pipeline and free on an end near the coupling). In some embodiments, the structure is periodic (e.g., comprising a periodic repeating pattern of higher and lower acoustic impedance materials)—for example, periodic in a direction parallel or perpendicular to an axis of the metal pipeline. In some embodiments, a periodicity of the structure is related to a wavelength of ultrasound waves in wall 302 of the metal pipeline 308 (e.g., the periodicity of the structure is a multiple of the wavelength of ultrasound waves in transmission path 318 and/or in transmission path 312 transmitted by the ultrasound transmitter 300—for example, the same length as the wavelength of ultrasound waves transmitted by the ultrasound transmitter, one half the length of the wavelength of ultrasound waves transmitted by the ultrasound transmitter, one quarter of the length of the wavelength of ultrasound waves transmitted by the ultrasound transmitter, etc.). In some embodiments, the structure is potted in an ultrasound damping material (e.g., for filling void areas of the periodic isolator structure) that serves as the lower acoustic impedance material. In some embodiments, the structure has a contact surface that is contoured to match the outer diameter of the metal pipeline.

Figure 4:
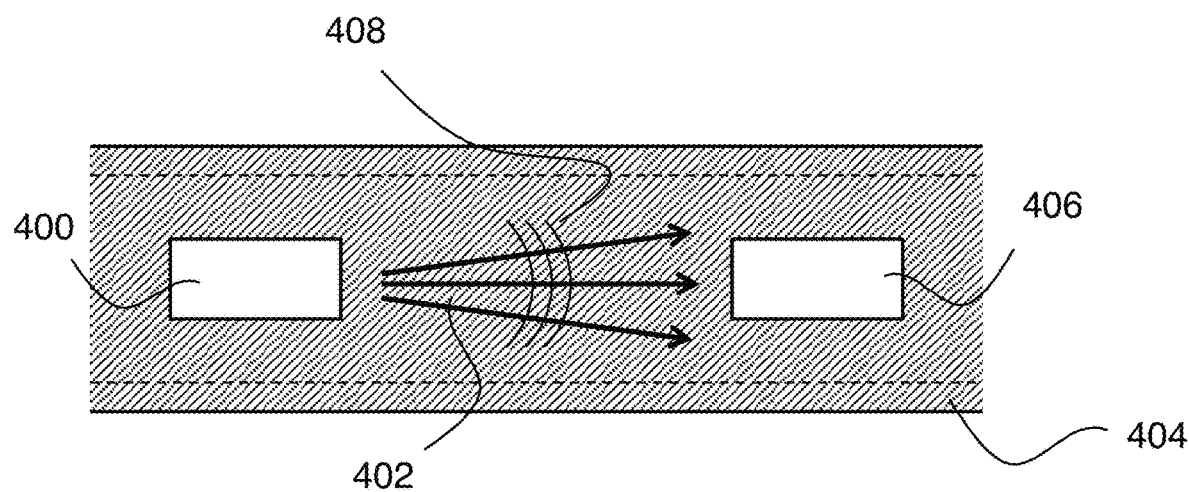
FIG. 4 is a diagram illustrating an embodiment of an ultrasound transmitter and an ultrasound receiver coupled to a metal pipeline in an axial configuration.

FIG. 4 is a diagram illustrating an embodiment of an ultrasound transmitter and an ultrasound receiver coupled to a metal pipeline in an axial configuration. In the example shown, ultrasound transmitter 400 and ultrasound receiver 406 are coupled to metal pipeline 404. Metal pipeline 404 comprises a metal pipeline (e.g., a pipe made from iron, cast iron, steel, another metal, an alloy, etc.). Metal pipeline 404 comprises a pipeline of any appropriate outer diameter and wall thickness. Typically, a metal pipeline comprises a pipeline with outer diameter in the range of ½" to 12" and wall thickness in the range of ⅓₂" to ½". Ultrasound waves 408 propagate along the wall of metal pipeline 404 with a beam divergence indicated by angle 402. In the example shown, ultrasound transmitter 400 and ultrasound receiver 406 are coupled to the same side of metal pipeline 404. For example, ultrasound transmitter 400 is coupled to metal pipeline 404 at a first circumferential angle and ultrasound receiver 406 is coupled to metal pipeline 404 at a second circumferential angle, wherein the first circumferential angle and the second circumferential angle are approximately 0 degrees apart. In some embodiments, the first circumferential angle and the second circumferential angle are approximately 180 degrees apart (e.g., ultrasound transmitter 400 and ultrasound receiver 406 are coupled to opposite sides of metal pipeline 404).

Figure 5:
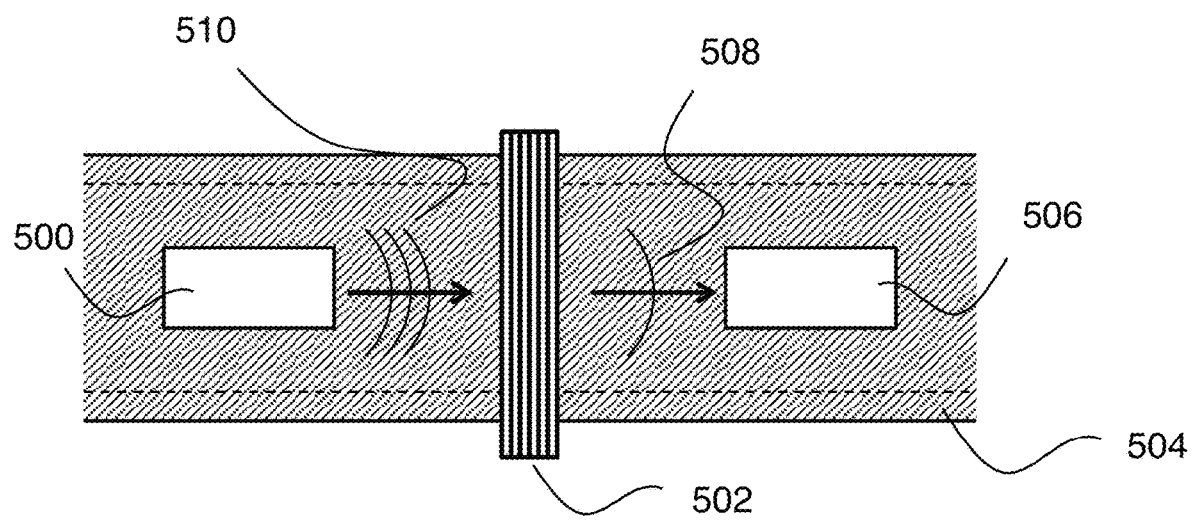
FIG. 5 is a diagram illustrating an embodiment of an ultrasound transmitter, an ultrasound receiver, and an ultrasound isolator coupled to a metal pipeline in an axial configuration.

FIG. 5 is a diagram illustrating an embodiment of an ultrasound transmitter, an ultrasound receiver, and an ultrasound isolator coupled to a metal pipeline in an axial configuration. In the example shown, metal pipeline 504 comprises a metal pipeline (e.g., a pipe made from iron, cast iron, steel, another metal, an alloy, etc.). Metal pipeline 504 comprises a pipeline of any appropriate outer diameter and wall thickness. Typically, a metal pipeline comprises a pipeline with outer diameter in the range of ½" to 12" and wall thickness in the range of ⅓₂" to ½". Ultrasound transmitter 500 and ultrasound receiver 506 are coupled to metal pipeline 504. Ultrasound isolator 502 is additionally coupled to metal pipeline 504. Ultrasound isolator 502 causes ultrasound waves 508 (e.g., waves entering ultrasound receiver 506 after propagating through metal pipe 504) to be attenuated in comparison with ultrasound waves 510 (e.g., waves emitted from ultrasound transmitter 500 and propagating through metal pipe 504). For example, ultrasound waves traveling axially through metal pipe 504 from ultrasound transmitter 500 to ultrasound receiver 506 comprise a noise signal that it is desirable to minimize. In various embodiments, an ultrasound noise signal may follow a helical path, a circumferential path, or another path through metal pipe 504.

Figure 6:
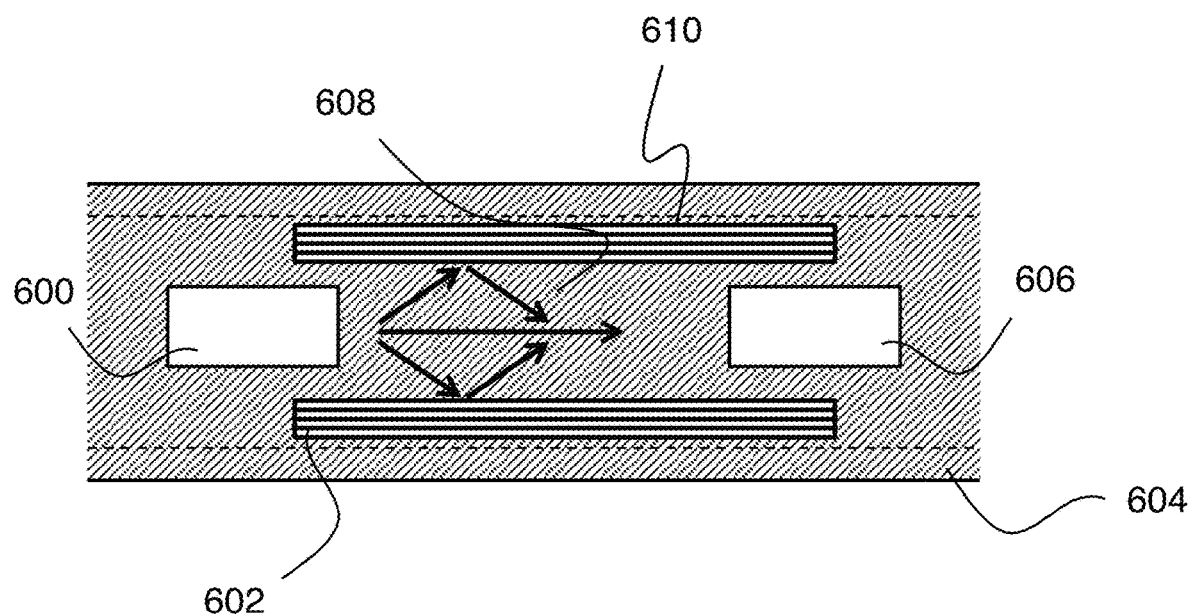
FIG. 6 is a diagram illustrating an embodiment of an ultrasound transmitter, an ultrasound receiver, and two ultrasound isolators coupled to a metal pipeline in an axial configuration.

FIG. 6 is a diagram illustrating an embodiment of an ultrasound transmitter, an ultrasound receiver, and two ultrasound isolators coupled to a metal pipeline in an axial configuration. In the example shown, metal pipeline 604 comprises a metal pipeline (e.g., a pipe made from iron, cast iron, steel, another metal, an alloy, etc.). Metal pipeline 604 comprises a pipeline of any appropriate outer diameter and wall thickness. Typically, a metal pipeline comprises a pipeline with outer diameter in the range of ½" to 12" and wall thickness in the range of ⅓₂" to ½". Ultrasound transmitter 600 and ultrasound receiver 606 are coupled to metal pipeline 604. Ultrasound isolator 602 and ultrasound isolator 610 are additionally coupled to metal pipeline 604. Ultrasound isolator 602 and ultrasound isolator 610 confine ultrasound waves 608 on the path from ultrasound transmitter 600 to ultrasound receiver 606. For example, ultrasound isolator 602 and ultrasound isolator 610 confine (for example, by reflecting) a portion of the ultrasound waves that would otherwise not be received by ultrasound receiver 606 due to beam divergence. For example, the magnitude of the ultrasound signal received by ultrasound receiver 606 is increased compared with the configuration wherein ultrasound isolator 602 and ultrasound isolator 610 are not present.

Figure 7:
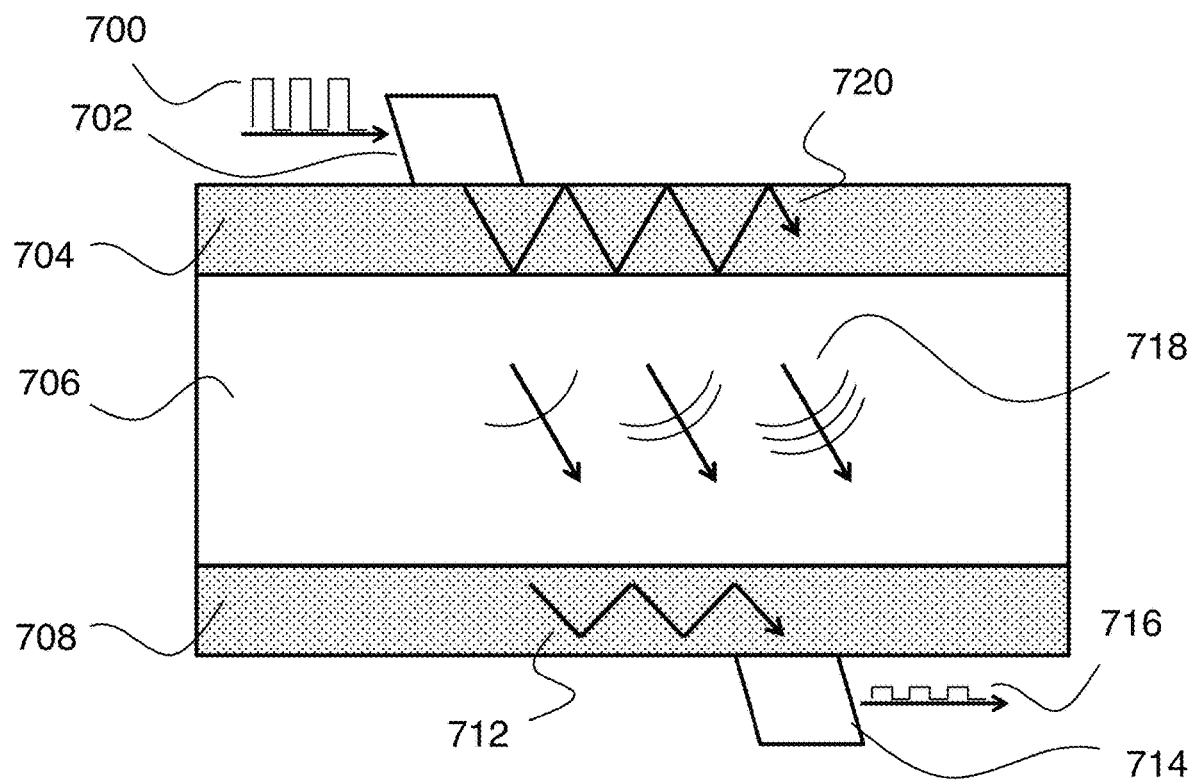
FIG. 7 is a diagram illustrating an embodiment of an ultrasound transmitter and an ultrasound receiver coupled to a metal pipeline.

FIG. 7 is a diagram illustrating an embodiment of an ultrasound transmitter and an ultrasound receiver coupled to a metal pipeline. In some embodiments, the ultrasound transmitter and the ultrasound receiver of FIG. 7 are showing a longitudinal cut of a pipe corresponding to the cross section cut of a pipe shown in FIG. 1. In the example shown, metal pipeline 704 comprises a metal pipeline (e.g., a pipe made from iron, cast iron, steel, another metal, an alloy, etc.). Metal pipeline 704 comprises a pipeline of any appropriate outer diameter and wall thickness. Typically, a metal pipeline comprises a pipeline with outer diameter in the range of ½" to 12" and wall thickness in the range of ⅓₂" to ½". Metal pipeline 704 comprises pipe wall region 708. Metal pipeline 704 encloses fluid 706. In various embodiments, fluid 706 comprises one or more of the following: air at atmospheric pressure, a gas at less than 100 psi gauge, methane, natural gas, ethane, propane, butane, isobutene, ethylene, propylene, gasoline, butylene, and/or isobutylene, a combination of gases, or any other appropriate gas or fluid. Ultrasound transmitter 702 and ultrasound receiver 714 are coupled to metal pipeline 704. Ultrasound transmitter 702 is driven with ultrasound drive signal 700 (e.g., a square wave). Ultrasound transmitter 702 couples ultrasound wave 720 into metal pipeline 704. For example, ultrasound wave 720 comprises a Lamb wave mode. The out-of-plane component of ultrasound wave 720 (e.g., up and down as drawn in FIG. 7) couples ultrasound vibrational energy into fluid 706, creating ultrasound waves 718. For example, ultrasound waves 718 comprise pressure waves. Ultrasound waves 718 propagate across fluid 706 and couple into pipe wall region 708, creating ultrasound wave 712. For example, ultrasound wave 712 comprises a Lamb wave mode. Ultrasound wave 712 is received by ultrasound receiver 714 and is converted to received ultrasound signal 716 (e.g., an attenuated and time-delayed version of ultrasound drive signal 700). In the example shown, ultrasound waves make a single trip across fluid 706 and are detected on a region of metal pipeline 708 opposite from the region on metal pipeline 704 where the ultrasound waves were transmitted. In the example shown, ultrasound transmitter 702 and ultrasound receiver 714 are on opposite sides of metal pipeline 704 (e.g., ultrasound transmitter 702 is coupled to metal pipeline 704 at a first circumferential angle and ultrasound receiver 714 is coupled to metal pipeline 704 at a second circumferential angle, wherein the first circumferential angle and the second circumferential angle are approximately 180 degrees apart). In some embodiments, ultrasound waves are detected on the same side of metal pipeline 704 from the side where the ultrasound waves were transmitted (e.g., ultrasound transmitter 702 is coupled to metal pipeline 704 at a first circumferential angle and ultrasound receiver 714 is coupled to metal pipeline 704 at a second circumferential angle, wherein the first circumferential angle and the second circumferential angle are approximately 0 degrees apart). In the example shown, axial separation between ultrasound transmitter 702 and ultrasound receiver 714 (e.g., separation along the length of metal pipeline 704, e.g., in the left to right direction in FIG. 7) is less than the diameter of metal pipeline 704. In various embodiments, axial separation between ultrasound transmitter 702 and ultrasound receiver 714 ranges from less than the diameter of metal pipeline 704 up to 10 times the diameter of metal pipeline 704. For example, ultrasound transmitter 702 is coupled at a first z location and ultrasound receiver 714 is coupled at a second z location, wherein the first z location and the second z location are separated by less than 10 times a diameter of metal pipeline 704.

Figure 8:
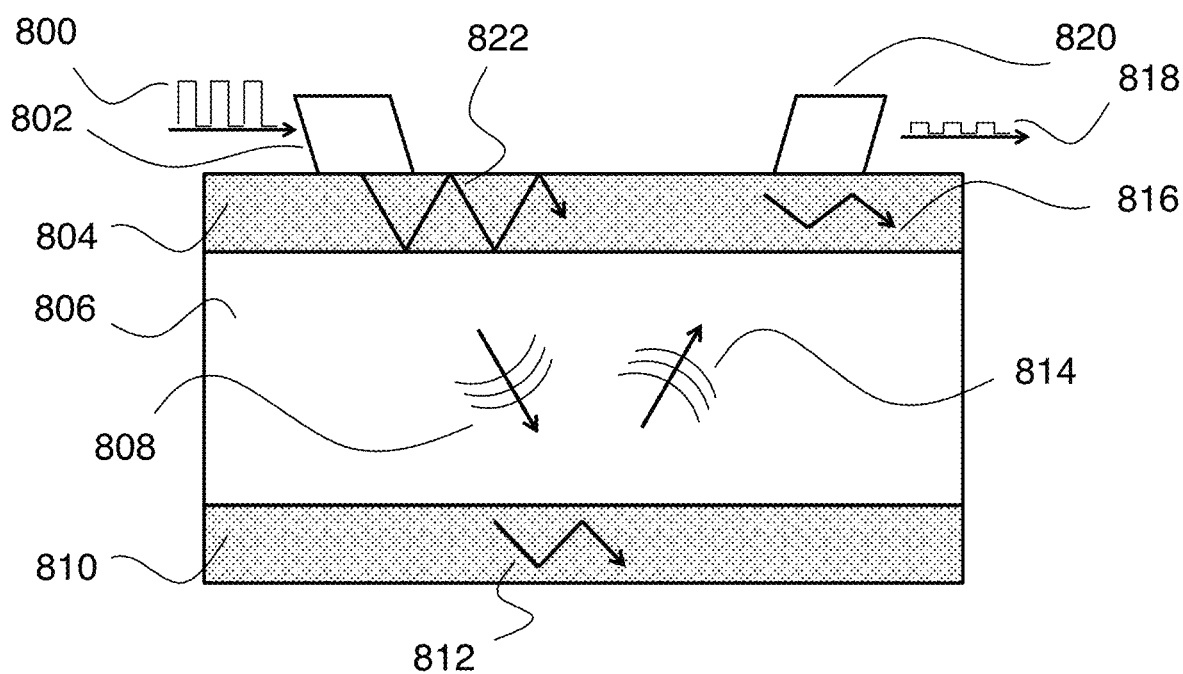
FIG. 8 is a diagram illustrating an embodiment of an ultrasound transmitter and an ultrasound receiver coupled to a metal pipeline.

FIG. 8 is a diagram illustrating an embodiment of an ultrasound transmitter and an ultrasound receiver coupled to a metal pipeline. In the example shown, metal pipeline 804 comprises a metal pipeline (e.g., a pipe made from iron, cast iron, steel, another metal, an alloy, etc.). Metal pipeline 804 comprises a pipeline of any appropriate outer diameter and wall thickness. Typically, metal pipeline 804 comprises a pipeline with outer diameter in the range of ½" to 12" and wall thickness in the range of 1/32" to ½". Metal pipeline 804 comprises pipe wall region 810. Metal pipeline 804 encloses fluid 806. In various embodiments, fluid 806 comprises one or more of the following: air at atmospheric pressure, a gas at less than 100 psi gauge, methane, natural gas, ethane, propane, butane, isobutene, ethylene, propylene, gasoline, butylene, and/or isobutylene, a combination of gases, or any other appropriate gas or fluid. Ultrasound transmitter 802 and ultrasound receiver 820 are coupled to metal pipeline 804. Ultrasound transmitter 802 is driven with ultrasound drive signal 800 (e.g., a square wave). Ultrasound transmitter 802 couples ultrasound wave 822 into metal pipeline 804. For example, ultrasound wave 822 comprises a Lamb wave mode. The out-of-plane component of ultrasound wave 822 (e.g., up and down as drawn in FIG. 8) couples ultrasound vibrational energy into fluid 806, creating ultrasound waves 808. For example, ultrasound waves 808 comprise pressure waves. Ultrasound waves 808 propagate across fluid 806 and are reflected by pipe wall region 810, creating ultrasound waves 814. In some embodiments, ultrasound waves 808 propagate across fluid 806 and couple into pipe wall region 810, creating ultrasound wave 812. For example, ultrasound wave 812 comprises a Lamb wave mode. The out-of-plane component of ultrasound wave 812 couples ultrasound vibrational energy again into fluid 806, contributing to ultrasound waves 814. Typically, the reflection of ultrasound waves 808 is the dominant contributor to ultrasound waves 814. Ultrasound waves 814 propagate across fluid 806 and couple into metal pipeline 804, creating ultrasound wave 816. For example, ultrasound wave 816 comprises a Lamb wave mode. Ultrasound wave 816 is received by ultrasound receiver 820 and is converted to received ultrasound signal 818 (e.g., an attenuated and time-delayed version of ultrasound drive signal 800). In the example shown, ultrasound waves make two trips across fluid 806 and are detected on a region of metal pipeline 804 on the same side of metal pipeline 804 from the region where the ultrasound waves were transmitted. In the example shown, axial separation between ultrasound transmitter 802 and ultrasound receiver 820 (e.g., separation along the length of metal pipeline 804, e.g., in the left to right direction in FIG. 8) is approximately the diameter of metal pipeline 804. In various embodiments, axial separation between ultrasound transmitter 802 and ultrasound receiver 820 ranges from less than the diameter of metal pipeline 804 up to 10 times the diameter of metal pipeline 804. For example, the signal path shown from ultrasound transmitter 802 to ultrasound receiver 820 making two trips through fluid 806 via pipe wall region 812 can be distinguished from the signal path from ultrasound transmitter 802 to ultrasound receiver 820 coupling directly through metal pipeline 804 because the propagation velocity of ultrasound waves is higher in metal pipeline 804 than in fluid 806, enabling the signals to be distinguished based on their received time. Distinguishing the signals in this way can be challenging due to reflections in the metal pipeline causing multiple copies of drive signal 800 to be received at ultrasound receiver 820 without transmission through gas 806.

Figure 9:
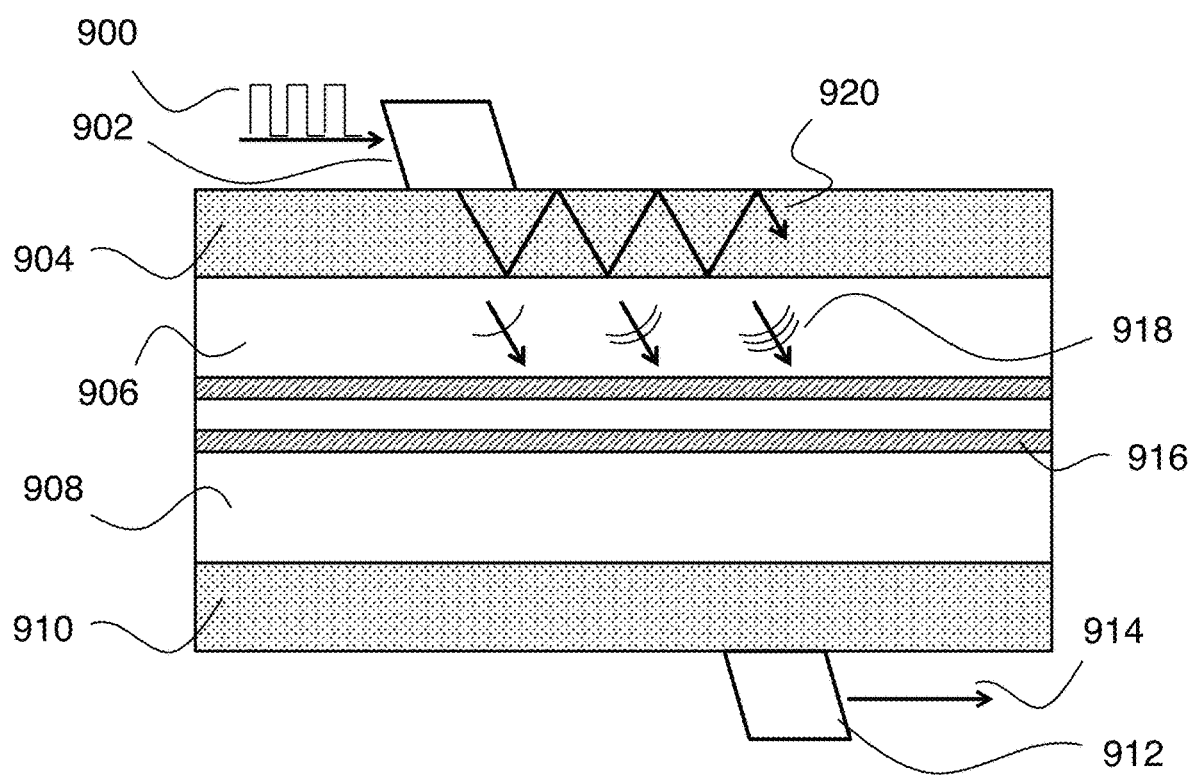
FIG. 9 is a diagram illustrating an embodiment of an ultrasound transmitter and an ultrasound receiver coupled to a metal pipeline including an inserted plastic pipeline.

FIG. 9 is a diagram illustrating an embodiment of an ultrasound transmitter and an ultrasound receiver coupled to a metal pipeline including an inserted plastic pipeline. In some embodiments, the ultrasound transmitter and the ultrasound receiver of FIG. 9 are showing a longitudinal cut of a pipe corresponding to the cross section cut of a pipe shown in FIG. 2. In the example shown, metal pipeline 904 comprises a metal pipeline (e.g., a pipe made from iron, cast iron, steel, another metal, an alloy, etc.). Metal pipeline 904 comprises a pipeline of any appropriate outer diameter and wall thickness. Typically, a metal pipeline comprises a pipeline with outer diameter in the range of ½" to 12" and wall thickness in the range of 1/32" to ½". Metal pipeline 904 comprises pipe wall region 910. Ultrasound transmitter 902 and ultrasound receiver 912 are coupled to metal pipeline 904. Metal pipeline 904 encloses enclosed fluid 906 and enclosed fluid 908. In various embodiments, enclosed fluid 906 and enclosed fluid 908 comprise one or more of the following: air at atmospheric pressure, a gas at less than 100 psi gauge, methane, natural gas, ethane, propane, butane, isobutene, ethylene, propylene, gasoline, butylene, and/or isobutylene, a combination of gases, or any other appropriate gas or fluid. Metal pipeline 904 additionally encloses inserted pipeline 916. Inserted pipeline 916 comprises a pipeline made from medium density polyethylene (e.g., MDPE), Aldyl-A, another polymer, a metal, etc. For example, inserted pipeline 916 encloses an enclosed fluid (e.g., a gas with less than 100 psi gauge). The outer diameter of inserted pipeline 916 is typically in the range of 10% to 100% of the inner diameter of metal pipeline 904. Ultrasound transmitter 902 is driven with ultrasound drive signal 900. In the example shown, ultrasound drive signal 900 comprises a square wave. In various embodiments, ultrasound drive signal 900 comprises a square wave or a sine wave in the range of 100 kHz to 2 MHz, for a duration of 1 to 30 half-periods, with an amplitude from 3 V to 100 V. For example, the ultrasound drive signal comprises a single-ended signal (e.g., a drive signal that varies over time between a positive drive level and a negative drive level is applied to ultrasound transmitter 902) or the ultrasound drive signal comprises a differential signal (e.g., two drive signals varying between a positive drive level and a ground state are applied 180 degrees out of phase with one another to ultrasound transmitter 902). The ultrasound sensing additionally comprises a single-ended signal (e.g., ultrasound receiver 912 receives an ultrasound signal that varies over time between a positive sense signal level and a negative sense signal level) or the ultrasound sensing comprises a differential signal (e.g., ultrasound receiver 912 receives two ultrasound signals varying between a positive sense signal level and a ground state and 180 degrees out of phase with one another). A detection window for sensing is dependent on an ultrasound time of flight for the sensor configuration, and is typically in the range of 50 µs to 1000 µs. Ultrasound transmitter 902 couples ultrasound wave 920 into metal pipeline 904. For example, ultrasound wave 920 comprises a Lamb wave mode. The out-of-plane component of ultrasound wave 920 (e.g., up and down as drawn in FIG. 9) couples ultrasound vibrational energy into fluid 906, creating ultrasound waves 918. For example, ultrasound waves 918 comprise pressure waves. Ultrasound waves 918 are absorbed and/or reflected by inserted pipeline 916 and do not propagate through enclosed fluid 908. For example, ultrasound waves 918 are blocked because the acoustic impedance of solids is typically at least four orders of magnitude greater than the acoustic impedance of low pressure gasses. No signal or a greatly attenuated signal is received by ultrasound receiver 912, and sensed signal 914 comprises no signal or a greatly attenuated signal.

Figure 10:
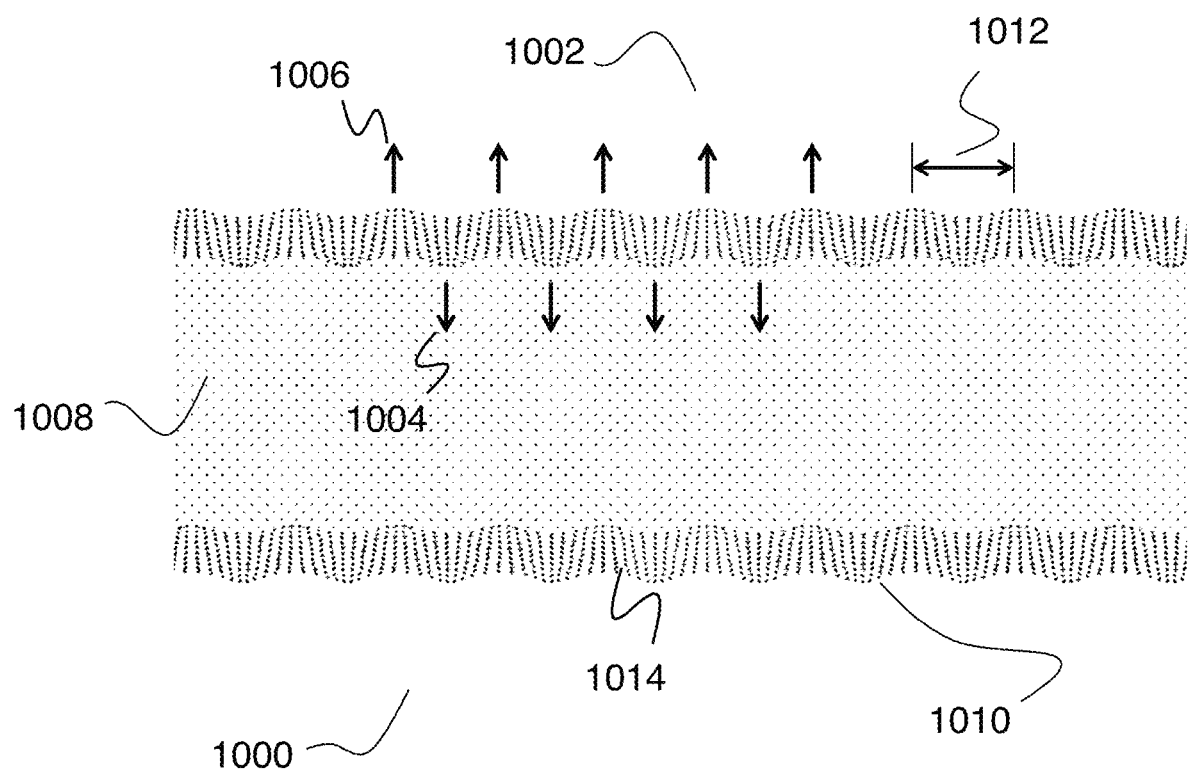
FIG. 10 is a diagram illustrating an embodiment of pipe walls undergoing displacement.

FIG. 10 is a diagram illustrating an embodiment of pipe walls undergoing displacement. In the example shown, view 1000 comprises a cross-sectional view of a metal pipeline. Metal pipeline 1014 comprises a metal pipeline (e.g., a pipe made from iron, cast iron, steel, another metal, an alloy, etc.). Metal pipeline 1014 comprises a pipeline of any appropriate outer diameter and wall thickness. Typically, a metal pipeline comprises a pipeline with outer diameter in the range of ½" to 12" and wall thickness in the range of ¹⁄₃₂" to ½". Metal pipeline 1014 encloses enclosed fluid 1008 and is surrounded by surrounding fluid 1002. In various embodiments, enclosed fluid 1008 comprises one or more of the following: air at atmospheric pressure, a gas at less than 100 psi gauge, methane, natural gas, ethane, propane, butane, isobutene, ethylene, propylene, gasoline, butylene, and/or isobutylene, a combination of gases, or any other appropriate gas or fluid. In various embodiments, surrounding fluid 1002 comprises air at atmospheric pressure, a gas at less than 100 psi gauge, a combination of gases, or any other appropriate gas or fluid. In the example shown, metal pipeline 1014 is carrying a vibrational mode indicated by displacement field 1010. For example, the vibrational mode comprises a Lamb wave mode, for example a zeroth-order anti-symmetric (e.g., "A0") mode. The displacement comprises out-of-plane displacement in the vertical direction indicated by arrow 1004 and arrow 1006. The out-of-plane displacement efficiently couples vibrational energy between metal pipeline 1014 and enclosed fluid 1008, and between metal pipeline 1014 and surrounding fluid 1002. For example, the vibrational energy couples into enclosed fluid 1008 and surrounding fluid 1002 comprise ultrasonic pressure waves. The vibrational mode in the pipe walls of metal pipeline 1014 comprises wavelength 1012. Typically wavelength 1012 is in the range of 1 mm to 20 mm.

Figure 11:
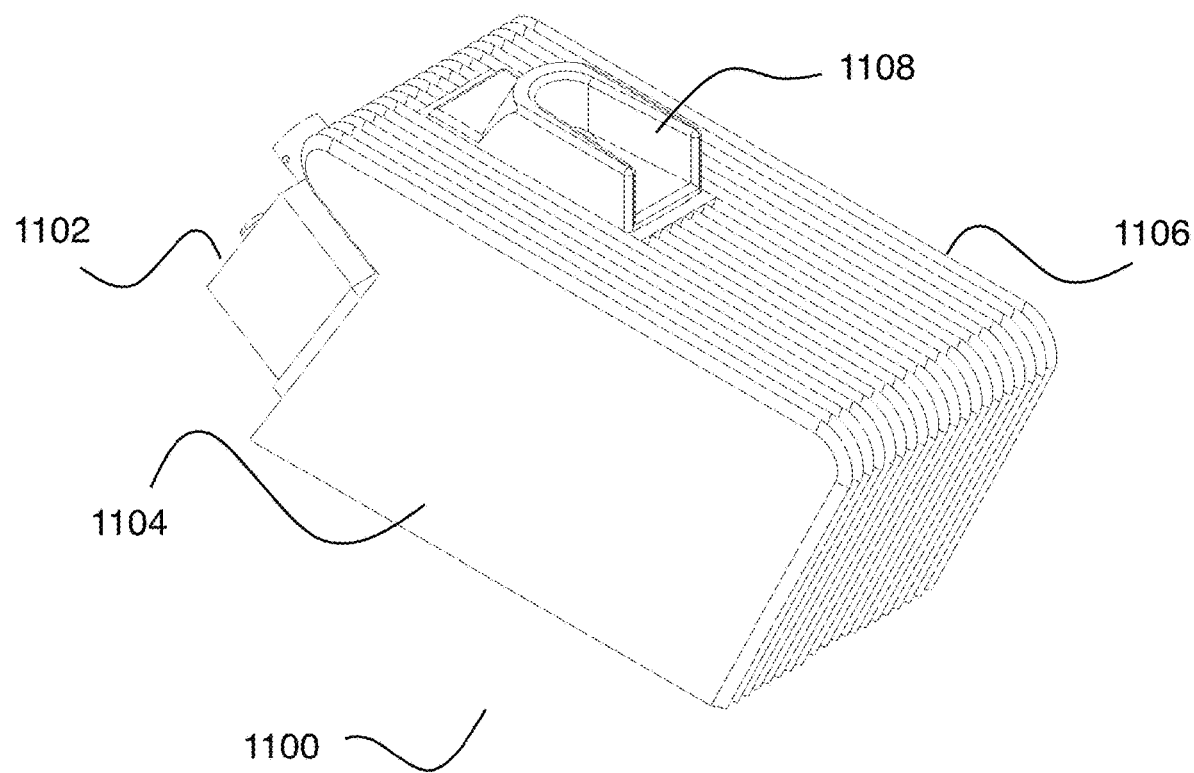
FIG. 11 is a diagram illustrating an embodiment of an ultrasound wedge.

FIG. 11 is a diagram illustrating an embodiment of an ultrasound wedge. For example, ultrasound wedge 1100 comprises an ultrasound transmitter or an ultrasound receiver. In some embodiments, ultrasound wedge 1100 of FIG. 11 is used to implement the ultrasound transmitter or ultrasound receiver in FIGS. 1-9. In the example shown, ultrasound wedge 1100 comprises ultrasound electro-mechanical converter 1102. Ultrasound electro-mechanical converter 1102 comprises an electro-mechanical converter for converting an electrical signal into an ultrasound mechanical vibration. Ultrasound electro-mechanical converter 1102 comprises a piezoelectric electro-mechanical converter, a magnetostrictive electro-mechanical converter, a ferroelectric electro-mechanical converter, etc. In some embodiments, ultrasound electro-mechanical converter 1102 comprises an electrical tuning network (e.g., resistors, capacitors, inductors, diodes, transistors, transformers, operational amplifiers, etc.) for impedance matching and/or tuning ringdown. For example, a piezo electro-mechanical converter typically comprises a fractional bandwidth between 10% and 100% and a center frequency of 100 kHz to 2 MHz. Ultrasound wedge 1100 comprises clamping guide 1108. Clamping guide 1108 comprises a clamping guide for guiding clamping of ultrasound wedge 1100 to a metal pipeline. For example, clamping guide 1108 is used to position and align ultrasound wedge 1100 in axial and circumferential directions, enabling greater measurement to measurement consistency (e.g., enhancing accuracy) and reducing setup time and effort. Ultrasound wedge 1100 comprises ultrasound damping material 1104 and ultrasound scattering serrations 1106. Ultrasound scattering serrations 1106 comprise serrations for breaking up reflections that could cause unwanted standing wave modes (e.g., spurious resonances) within ultrasound wedge 1100. Damping material 1104 comprises an ultrasound damper for attenuating an ultrasound return signal in an ultrasound transmitting material (e.g., an ultrasound transmitting material for transmitting ultrasound from ultrasound electro-mechanical converter 1102 to a bottom surface of ultrasound wedge 1100) or at a contact surface between ultrasound wedge 1100 and a wall of a metal pipeline. Damping material 1104 comprises a material with a high ultrasound attenuation coefficient such as an attenuation coefficient on the order of 500 to 2000 dB/m (e.g., one or more of silicone, urethane, epoxy, etc.). Damping material 1104 can additionally include high acoustic impedance grit particles (e.g., one or more of silicon carbide grit, tungsten grit) for improving an impedance match to a low-loss ultrasound transmitting material and decreasing ringing.

Figure 12:
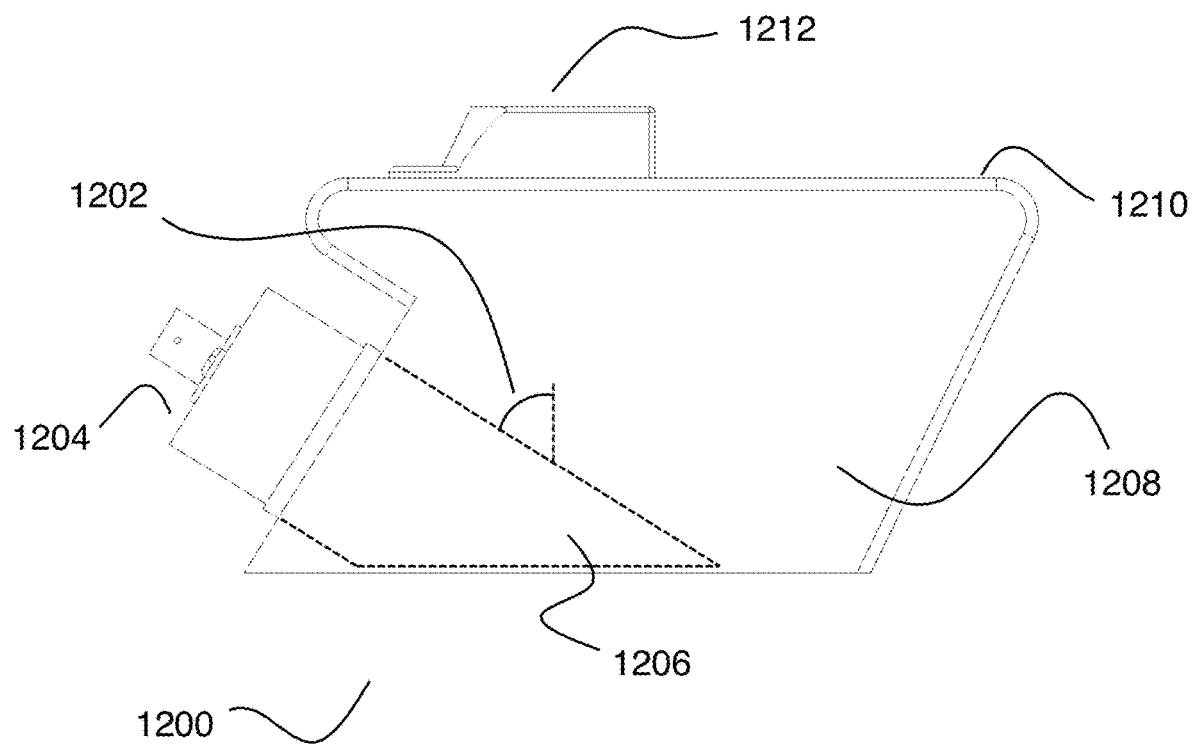
FIG. 12 is a diagram illustrating a cross-sectional view of an ultrasound wedge.

FIG. 12 is a diagram illustrating a cross-sectional view of an ultrasound wedge. In some embodiments, the ultrasound wedge of FIG. 12 is a side view of the ultrasound wedge of FIG. 11. In the example shown, ultrasound wedge 1200 comprises ultrasound electro-mechanical converter 1204 disposed at angle of incidence 1202 to a lower surface of ultrasound wedge 1200. For example, the lower surface of ultrasound wedge 1202 comprises a surface for coupling to a metal pipeline. Ultrasound wedge 1200 additionally comprises ultrasound transmitting material 1206. Ultrasound transmitting material 1206 comprises a material for transmitting ultrasound waves from ultrasound electro-mechanical converter 1204 to the lower surface of ultrasound wedge 1200. In some embodiments, an end of ultrasound transmitting material 1206 is flush with the lower surface of ultrasound wedge 1200 (i.e., an end of ultrasound transmitting material 1206 comprises a surface for coupling to a metal pipeline). In some embodiments, an end of ultrasound transmitting material 1206 does not extend to the lower surface of ultrasound wedge 1200 (i.e., an end of ultrasound transmitting material 1206 terminates within ultrasound damping material 1208). In some embodiments, the transmission of ultrasound waves depends at least in part on the distance between an end of ultrasound transmitting material 1206 terminating within ultrasound damping material 1208 and the lower surface of ultrasound wedge 1200. In some embodiments, the distance between an end of ultrasound transmitting material 1206 terminating within ultrasound damping material 1208 and the lower surface of ultrasound wedge 1200 is a multiple of a wavelength of ultrasonic waves within ultrasound transmitting material 1206. For example, the distance may be one-quarter of a wavelength, one-half of a wavelength, one wavelength, or another multiple of a wavelength. For example, ultrasound transmitting material 1206 comprises a metal, a metal rod, a polymer, a polymer rod, a ceramic rod, another suitable material, etc. In various embodiments, an end of ultrasound transmitting material 1206 is contoured to match the outer diameter of a metal pipeline. Ultrasound transmitting material 1206 typically comprises a material with a longitudinal wave speed in the range of 1500 m/s to 3000 m/s and an ultrasonic attenuation coefficient in the range of 20 dB/m to 200 dB/m. Angle of incidence 1202 is determined according to Snell's law, based on the longitudinal wave speed in ultrasound transmitting material 1206 and the phase velocity of a Lamb wave mode in the wall of the metal pipeline coupled to ultrasound wedge 1200. For example, the angle of incidence is determined to be the inverse sine of the ratio of the longitudinal wave speed in ultrasound transmitting material 1206 and the phase velocity of a Lamb wave mode in a metal pipeline wall. For example, the angle of incidence is chosen to stimulate ultrasound Lamb waves (i.e., guided waves) in a metal pipeline in contact with the lower surface of the ultrasound wedge parallel to the metal pipeline wall. Ultrasound wedge 1200 additionally comprises ultrasound damping material 1208, ultrasound scattering serrations 1210, and clamping guide 1212.

Figure 13:
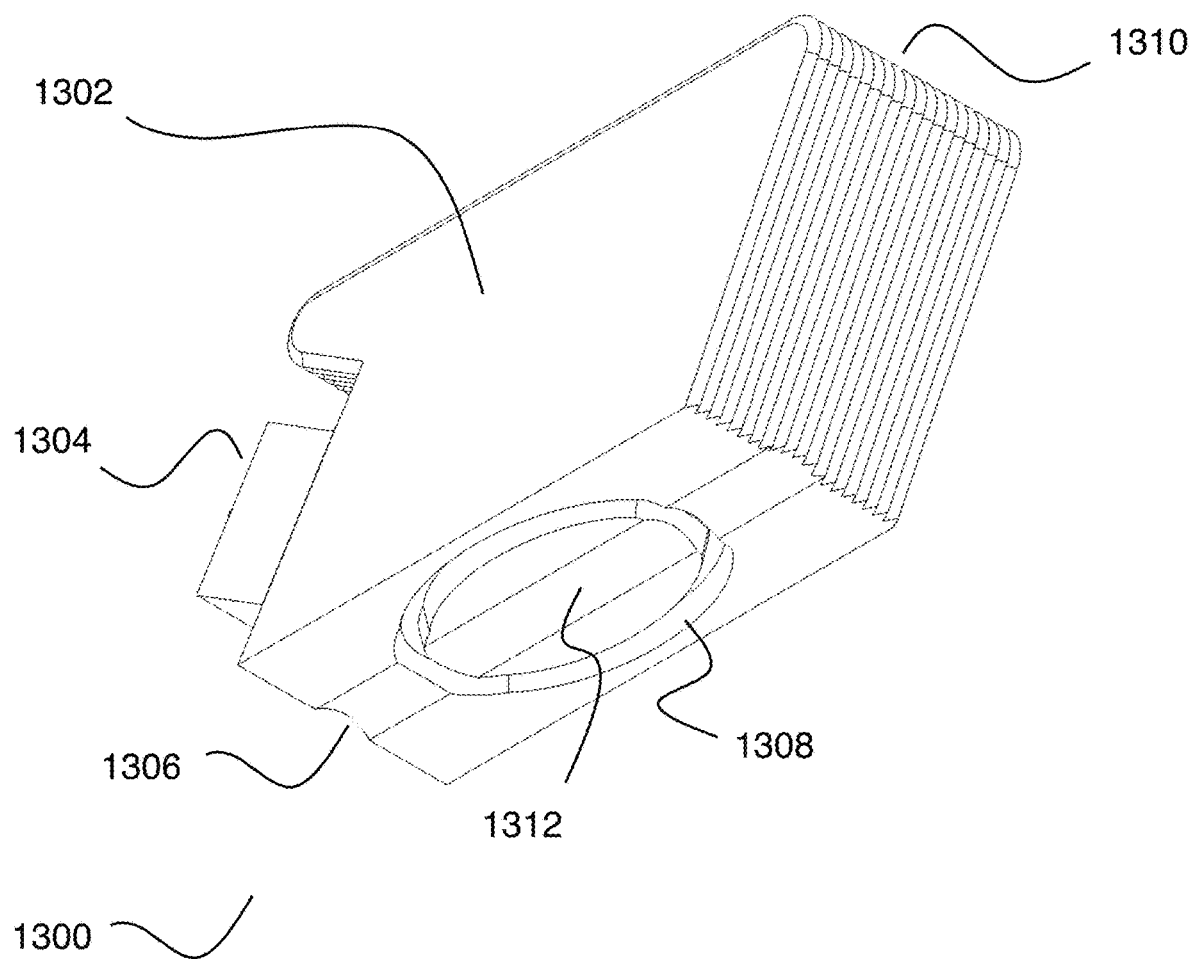
FIG. 13 is a diagram illustrating an embodiment of a bottom view of an ultrasound wedge.

FIG. 13 is a diagram illustrating an embodiment of a bottom view of an ultrasound wedge. In some embodiments, the ultrasound wedge of FIG. 13 is a bottom view of the ultrasound wedge of FIG. 11. In the example shown, ultrasound wedge 1300 comprises ultrasound electro-mechanical converter 1304. A bottom surface of ultrasound wedge 1300 couples to a metal pipeline. The bottom surface of ultrasound wedge 1300 comprises pipe contouring 1306 for providing a conformal fit to a metal pipeline wall. An ultrasound couplant gel can be used between ultrasound wedge 1300 and the metal pipeline. For example, the ultrasound couplant gel displaces air and provides acoustic impedance matching (e.g., the ultrasound couplant gel is used to enhance coupling between an ultrasound transmitter and the metal pipeline and/or an ultrasound receiver and the metal pipeline). A couplant gel comprises a water-based material, an oil-based material, a glycerin-based material, etc. In some embodiments, ultrasound wedge 1300 is permanently attached to the metal pipeline (e.g., using epoxy or another adhesive). Ultrasound wedge 1300 comprises couplant isolation groove 1308. Couplant isolation groove 1308 isolates a region of the bottom surface of ultrasound wedge 1300 coupled to ultrasound electro-mechanical converter 1304 via ultrasound transmitting material from a region of the bottom surface of ultrasound wedge 1300 damped by ultrasound damping material 1302. Couplant isolation groove 1308 makes coupling more reproducible and prevents excessive damping of ultrasound waves in the metal pipeline wall by the leading edge of ultrasound damping material 1302. Contact surface 1312 comprises the region of pipe contouring 1306 within couplant isolation groove 1308 (e.g., a contact surface for coupling ultrasound into a wall of a metal pipeline). In some embodiments, contact surface 1312 comprises a stepped region or another suitable configuration. Ultrasound wedge 1300 additionally comprises ultrasound scattering serrations 1310. In some embodiments, the ultrasound transmitter or receiver includes a couplant isolation feature for controlling the coverage of an ultrasound couplant gel (e.g., keeping the gel isolated to a region between the transmitter or receiver and a pipe wall).

Figure 14:
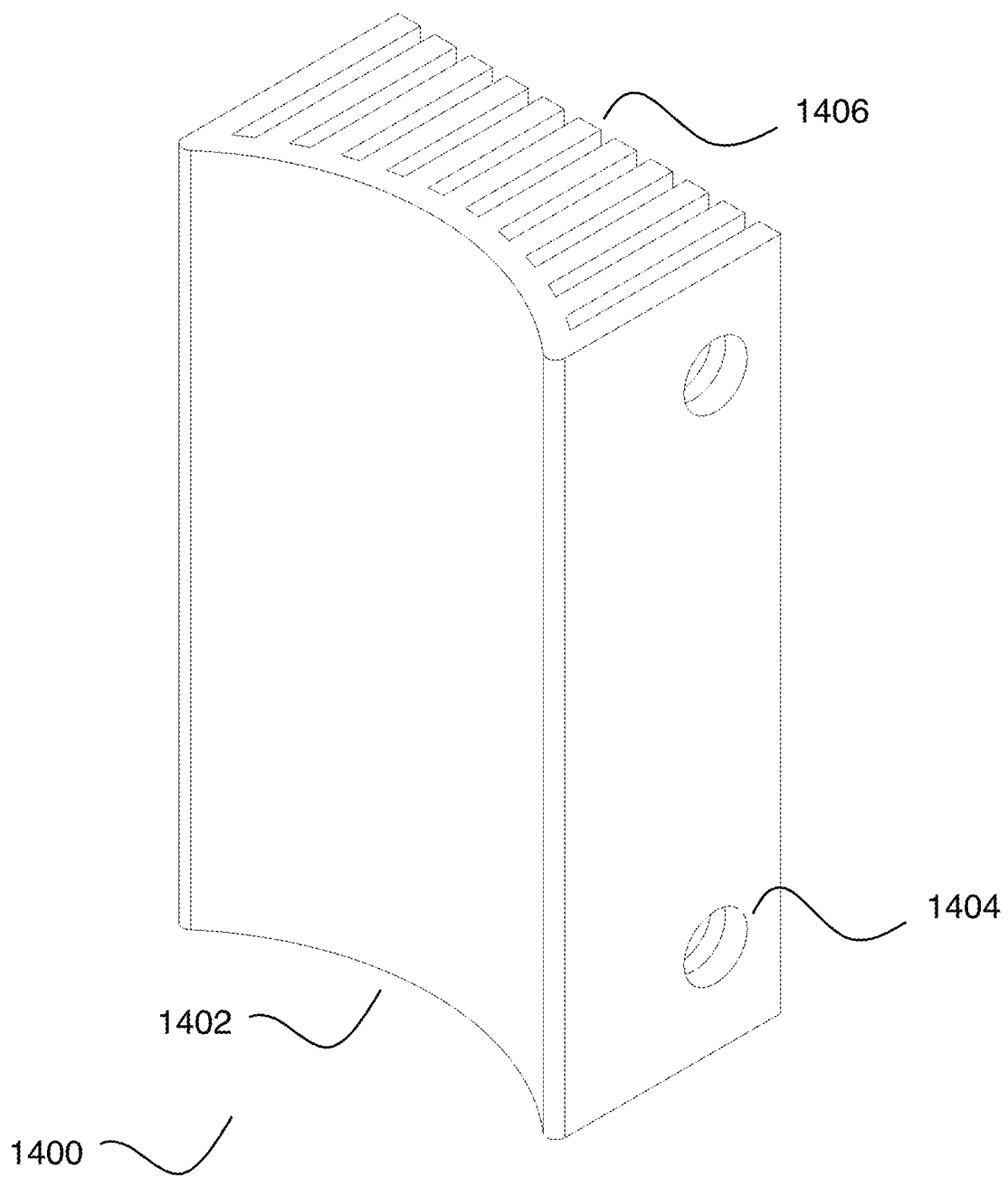
FIG. 14 is a diagram illustrating an embodiment of an ultrasound isolator.

FIG. 14 is a diagram illustrating an embodiment of an ultrasound isolator. In some embodiments, the ultrasound isolator of FIG. 14 is used to implement ultrasound isolators of FIGS. 3 and 6. In the example shown, ultrasound isolator 1400 comprises pipe contour 1402 for providing a conformal fit to a metal pipeline wall. Ultrasound isolator 1400 additionally comprises fingers 1406 and mounting hole 1404. Ultrasound isolator 1400 comprises an ultrasound isolator in a fingers-out (e.g., fingers 1406 are fixed on the end coupling to the metal pipeline wall and extend out) and longitudinal groove (e.g., grooves cut between fingers 1406 are parallel to the longitudinal direction of the metal pipeline) configuration. Ultrasound isolator 1400 reduces the magnitude of elastic waves transmitted in a parasitic path through the metal pipeline wall—for example, between an ultrasound transmitter and an ultrasound receiver. Ultrasound isolator 1400 additionally increases the magnitude of elastic waves transmitted in a desired path through the metal pipeline wall, which increases the magnitude of elastic waves transmitted from the metal pipeline wall into an enclosed fluid. Ultrasound isolator 1400 can be used to provide ultrasound isolation in a metal pipeline in a circumferential direction or in an axial direction. In a configuration wherein ultrasound isolator 1400 is coupled to a metal pipeline between an ultrasound transmitter and an ultrasound receiver, ultrasound isolator 1400 provides two physical mechanisms to increase the signal-to-noise ratio of a signal coupling through a fluid enclosed by the metal pipeline. Typically, the signal-to-noise ratio of a signal coupling through a fluid enclosed by the metal pipeline increases in proportion to the density of the enclosed fluid. Ultrasound isolator 1400 reflects a portion of incident vibrational energy away from the sense transducer (e.g., so the portion of the incident vibrational energy is not coupled directly through the metal pipeline from the drive transducer to the sense transducer). The reflected waves confined to an axial path additionally increase the signal coupling from the metal pipeline wall to the enclosed fluid, increasing the signal level. Ultrasound isolator 1400 comprises a narrowband reflector tuned to the material properties, curvature, and thickness of the metal pipeline wall and to the frequency used by the drive transducer (e.g., the pipeline properties and the drive transducer frequency together determine the ultrasound wavelength in the metal pipeline wall). Ultrasound isolator 1400 additionally absorbs ultrasound energy to convert a portion of the incident vibration into heat. The length of ultrasound isolator 1400 is typically in the range of 25 mm to 300 mm—for example, greater or less than the axial separation distance between the ultrasound transmitter and the ultrasound receiver. The number of fingers 1406 is typically in the range of 1 finger to 30 fingers (e.g., providing better isolation with an increasing number of fingers). Ultrasound isolator 1400 can be made from a material with a high ultrasound attenuation (e.g., above 5 dB/m) and with a good acoustic impedance match to the metal of a metal pipeline (e.g., 20 to 60 MRayls). For example, ultrasound isolator 1400 is made from steel, cast iron, brass, bronze, zinc, an alloy of metals, a composite of high acoustic impedance material (e.g., tungsten or silicon carbide) in a polymer matrix, etc.

Figure 15:
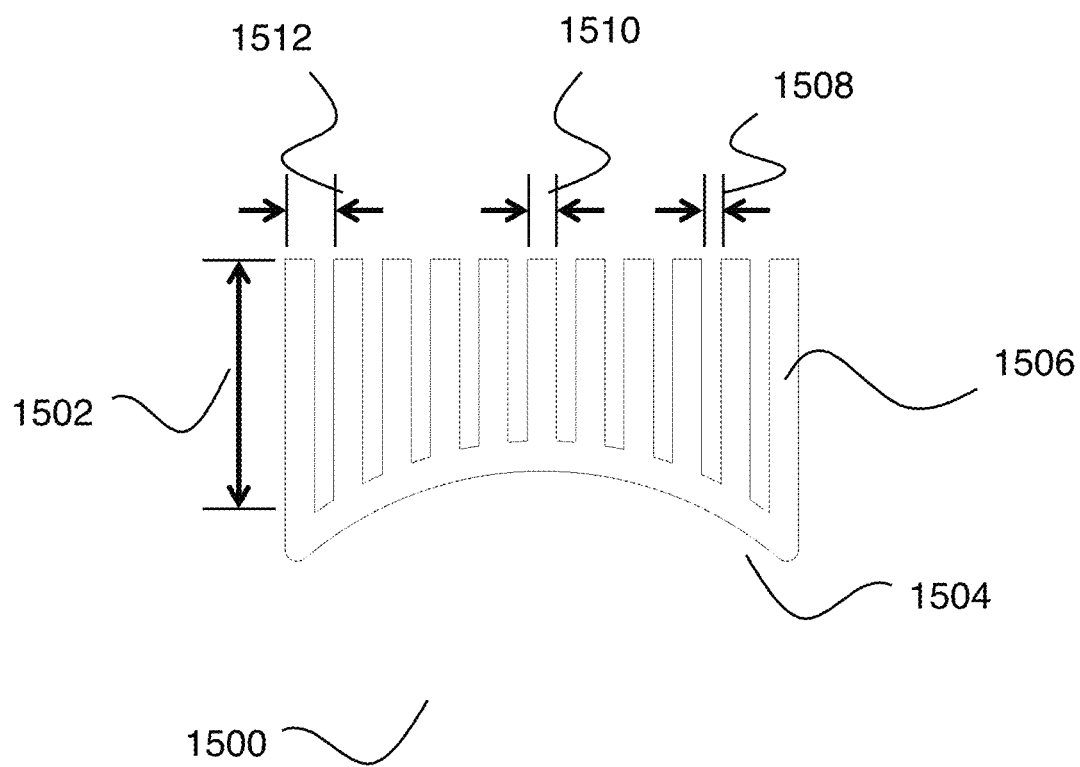
FIG. 15 is a diagram illustrating an embodiment of an ultrasound isolator.

FIG. 15 is a diagram illustrating an embodiment of an ultrasound isolator. In some embodiments, FIG. 15 comprises a cross-sectional view of ultrasound isolator 1400 of FIG. 14. In the example shown, ultrasound isolator 1500 comprises a set of fingers (e.g., finger 1506) mounted on pipe contouring 1504. Each finger comprises a finger height (e.g., finger height 1502) and a finger width (e.g., finger width 1510). A finger spacing (e.g., finger spacing 1508) exists between adjacent fingers. A finger pitch (e.g., finger pitch 1512) comprises the sum of the finger width and the finger spacing. The alternation of the finger regions and the space regions (e.g., between the fingers) present alternating high acoustic impedances and low acoustic impedances, respectively, to incident ultrasound waves. Ultrasound reflection by ultrasound isolator 1500 can be maximized when the finger pitch is near one quarter the wavelength of the ultrasound waves. Finger pitch is typically in the range of 0.25 mm to 5 mm. Finger height is typically in the range of 10 mm to 50 mm. A couplant gel can be used between ultrasound isolator 1500 and the metal pipeline. For example, the couplant gel displaces air and provides acoustic impedance matching. A couplant gel comprises a water-based material, an oil-based material, a glycerin-based material, etc. In some embodiments, ultrasound isolator 1500 is permanently attached to the metal pipeline (e.g., using epoxy or another adhesive). Isolation of ultrasonic isolator 1500 can by increased by potting the fingers (e.g., filling the regions between, above, and/or around the fingers) with a high-attenuation material (e.g., a urethane, a silicone, an epoxy, etc.).

Figure 16:
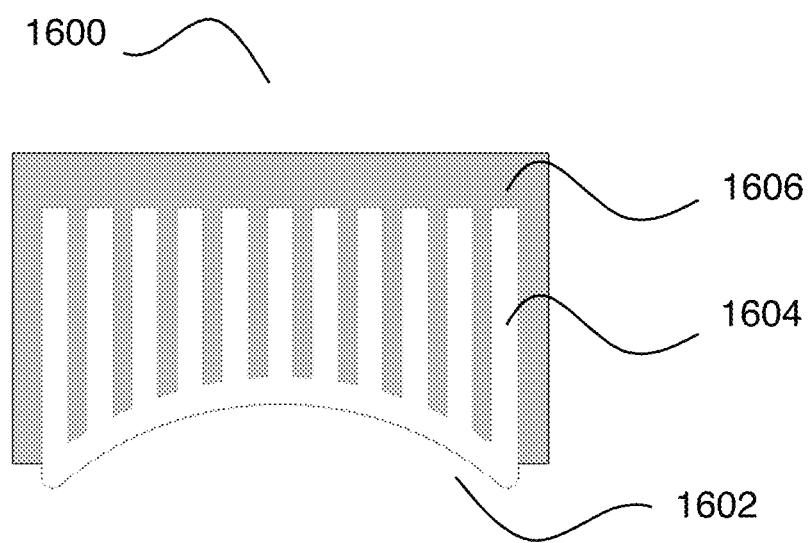
FIG. 16 is a diagram illustrating an embodiment of an ultrasound isolator.

FIG. 16 is a diagram illustrating an embodiment of an ultrasound isolator. In some embodiments, FIG. 16 comprises a cross-sectional view of an ultrasound isolator. In the example shown, ultrasound isolator 1600 comprises a potted ultrasound isolator. Ultrasound isolator 1600 comprises a set of fingers (e.g., finger 1604) and a pipe contouring (e.g., pipe contouring 1602). Ultrasound isolator 1600 additionally comprises potting material 1606. Potting material 1606 fills the regions between, above, and around the fingers of ultrasound isolator 1600. Potting material 1606 comprises a material with high ultrasound attenuation (e.g., silicone, urethane, epoxy, etc.). Potting material 1606 additionally can comprise grit particles (e.g., silicon carbide grit, tungsten grit, iron oxide grit, etc.) or filler particles (e.g., polystyrene filler, etc.) to increase attenuation and/or to tailor acoustic impedance. The acoustic impedance of potting material 1606 should be low compared to the fingers of ultrasound isolator 1600 in order not to compromise the ultrasound reflection properties of ultrasound isolator 1600. For example, the ultrasound reflection properties of ultrasound isolator 1600 arise from impedance mismatch between finger regions and inter-finger space regions.

Figure 17:
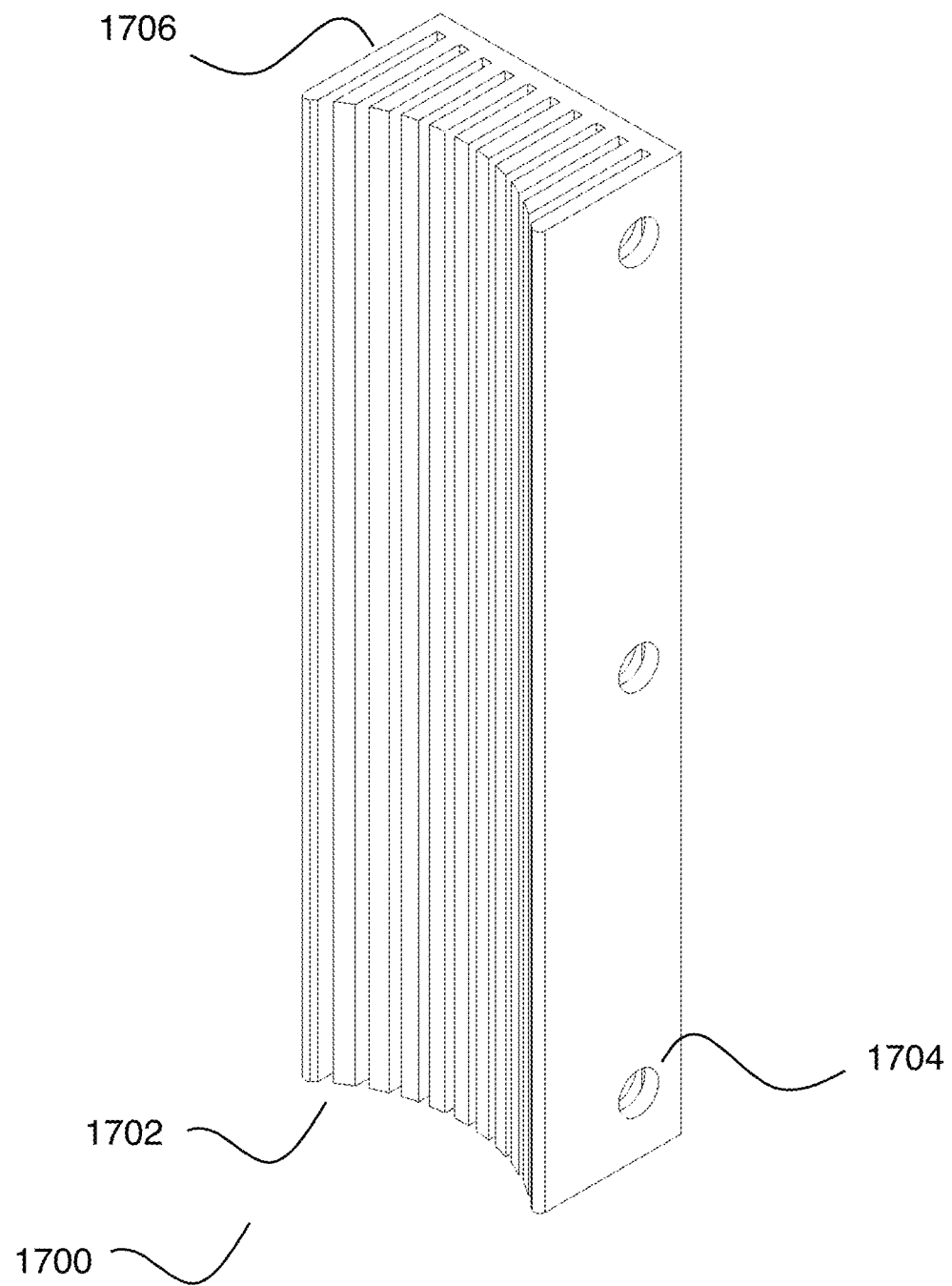
FIG. 17 is a diagram illustrating an embodiment of an ultrasound isolator.

FIG. 17 is a diagram illustrating an embodiment of an ultrasound isolator. In some embodiments, the ultrasound isolator of FIG. 17 is used to implement ultrasound isolators of FIGS. 3 and 6. In the example shown, ultrasound isolator 1700 comprises pipe contouring 1702 for coupling to a metal pipeline. Ultrasound isolator 1700 comprises an ultrasound isolator in a fingers-in (e.g., fingers 1706 are fixed on the end opposite from the metal pipeline and free on the end coupled to the metal pipeline) and longitudinal groove (e.g., grooves cut between fingers 1706 are parallel to the longitudinal direction of the metal pipeline) configuration. Ultrasound isolator 1700 additionally comprises mounting hole 1704.

Figure 18:
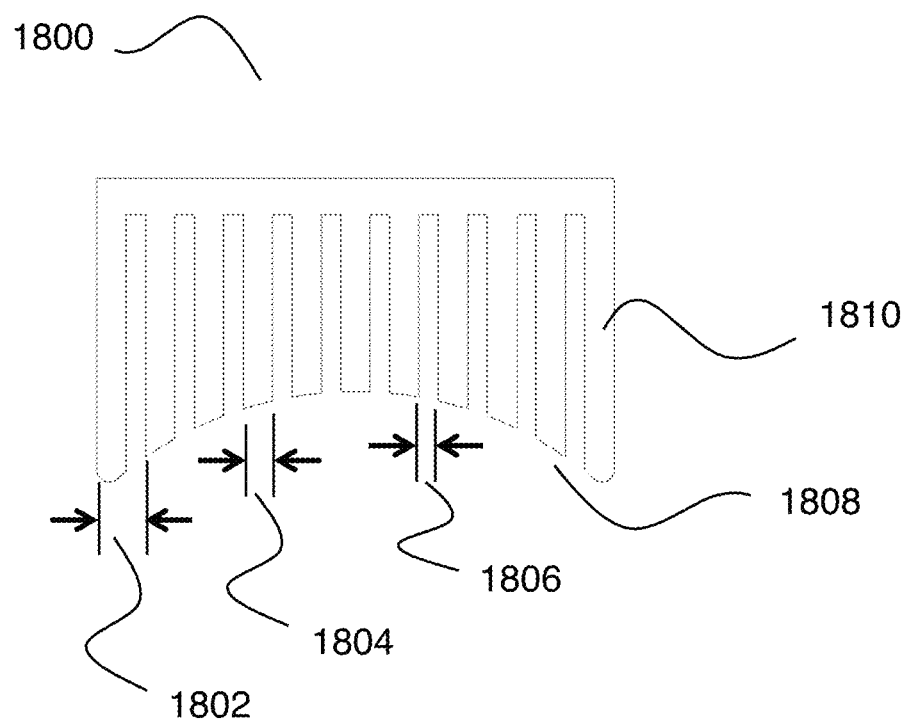
FIG. 18 is a diagram illustrating an embodiment of an ultrasound isolator.

FIG. 18 is a diagram illustrating an embodiment of an ultrasound isolator. In some embodiments, FIG. 18 comprises a cross-sectional view of ultrasound isolator 1700 of FIG. 17. In the example shown, ultrasound isolator 1800 comprises a set of fingers (e.g., finger 1810) mounted on pipe contouring 1808. Each finger comprises a finger height and a finger width (e.g., finger width 1804). A finger spacing (e.g., finger spacing 1806) exists between adjacent fingers. A finger pitch (e.g., finger pitch 1802) comprises the sum of the finger width and the finger spacing. Ultrasound isolator 1800 comprises an ultrasound isolator in a fingers-in, longitudinal groove configuration.

Figure 19:
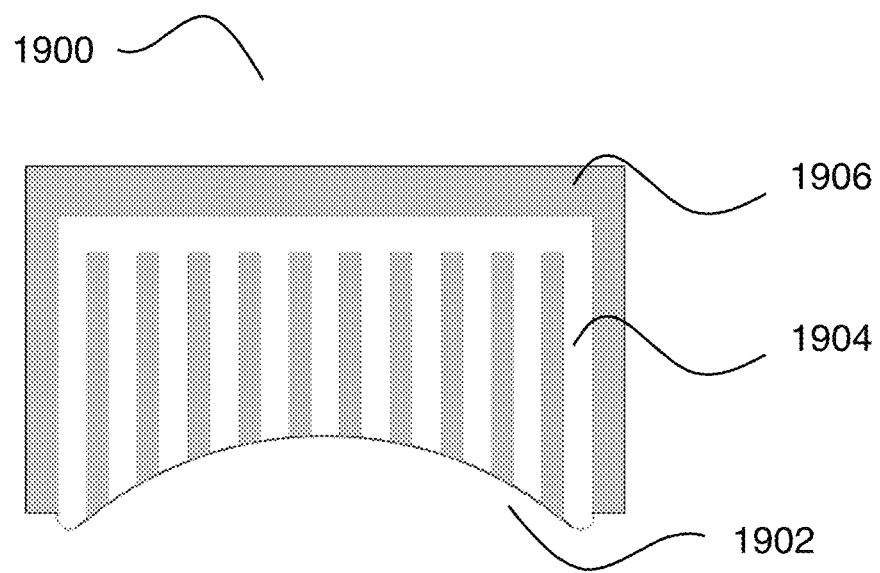
FIG. 19 is a diagram illustrating an embodiment of an ultrasound isolator.

FIG. 19 is a diagram illustrating an embodiment of an ultrasound isolator. In some embodiments, FIG. 19 comprises a cross-sectional view of an ultrasound isolator with a fingers-in, longitudinal groove configuration. In the example shown, ultrasound isolator 1900 comprises a potted ultrasound isolator. Ultrasound isolator 1900 comprises a set of fingers (e.g., finger 1904) and a pipe contouring (e.g., pipe contouring 1902). Ultrasound isolator 1900 additionally comprises potting material 1906. Potting material 1906 fills the regions between, above, and around the fingers of ultrasound isolator 1900. Potting material 1906 comprises a material with high ultrasound attenuation (e.g., silicone, urethane, epoxy, etc.). Potting material 1906 additionally can comprise grit particles (e.g., silicon carbide grit, tungsten grit, iron oxide grit, etc.) or filler particles (e.g., polystyrene filler, etc.) to increase attenuation and/or to tailor acoustic impedance. The acoustic impedance of potting material 1906 should be low compared to the fingers of ultrasound isolator 1900 in order not to compromise the ultrasound reflection properties of ultrasound isolator 1900.

Figure 20:
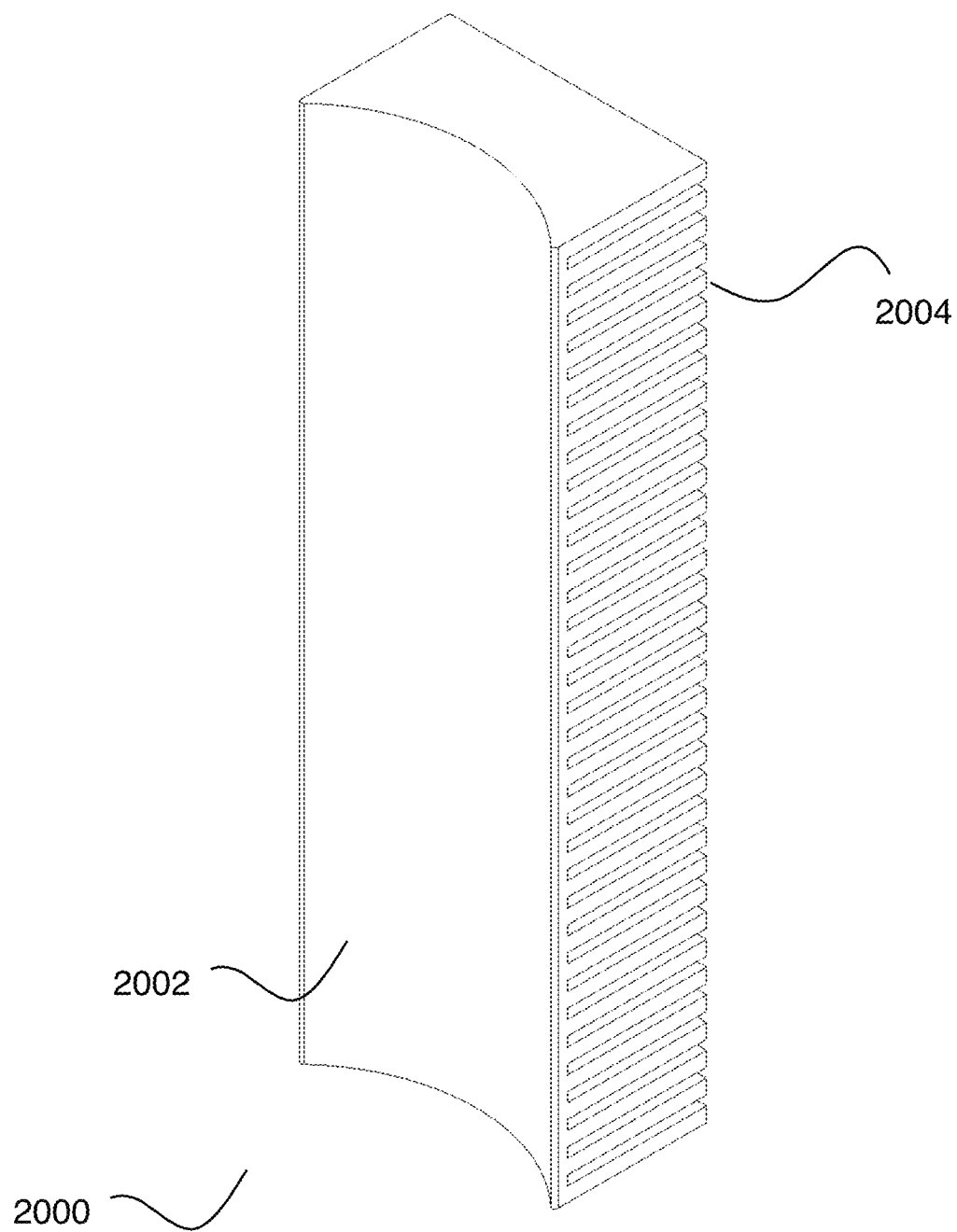
FIG. 20 is a diagram illustrating an embodiment of an ultrasound isolator.

FIG. 20 is a diagram illustrating an embodiment of an ultrasound isolator. In some embodiments, the ultrasound isolator of FIG. 20 is used to implement the ultrasound isolator of FIG. 5. In the example shown, ultrasound isolator 2000 comprises pipe contouring 2002 for coupling to a metal pipeline. Ultrasound isolator 2000 comprises an ultrasound isolator in a fingers-out (e.g., fingers 2004 are fixed on the end coupling to the metal pipeline wall and extend out) and transverse groove (e.g., grooves cut between fingers 2004 are perpendicular to the longitudinal direction of the metal pipeline) configuration.

Figure 21:
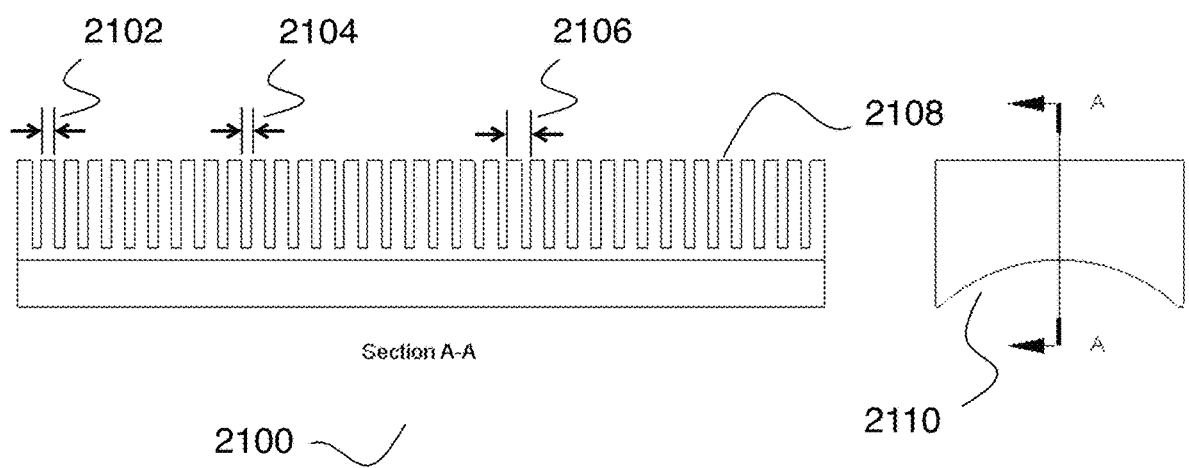
FIG. 21 is a diagram illustrating an embodiment of an ultrasound isolator.

FIG. 21 is a diagram illustrating an embodiment of an ultrasound isolator. In some embodiments, FIG. 21 comprises a cross-sectional view of ultrasound isolator 2000 of FIG. 20. In the example shown, ultrasound isolator 2100 comprises a set of fingers (e.g., finger 2108) mounted on pipe contouring 2110. Each finger comprises a finger height and a finger width (e.g., finger width 2102). A finger spacing (e.g., finger spacing 2104) exists between adjacent fingers. A finger pitch (e.g., finger pitch 2106) comprises the sum of the finger width and the finger spacing. Ultrasound isolator 2100 comprises an ultrasound isolator in a fingers-out, transverse groove configuration.

Figure 22:
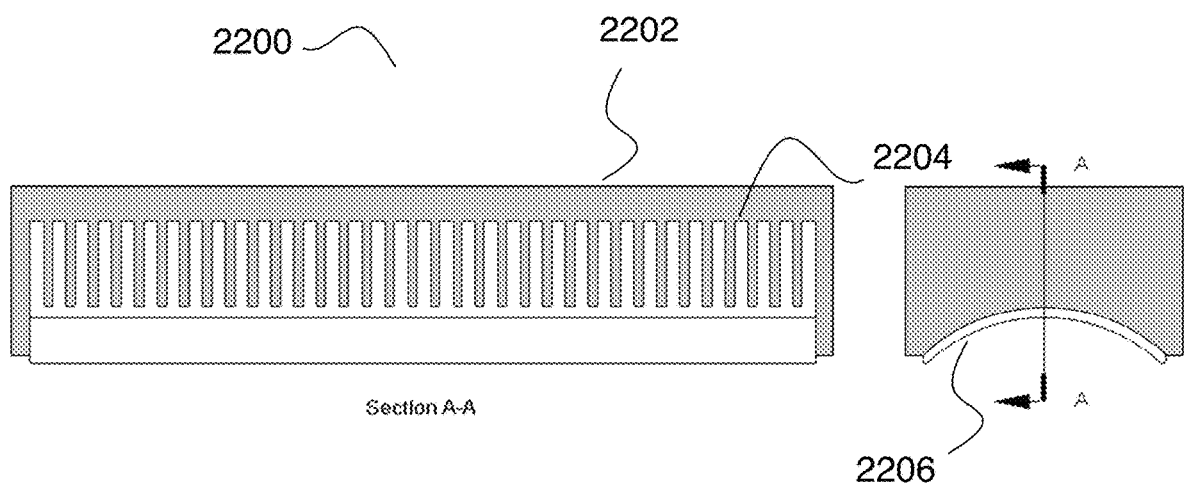
FIG. 22 is a diagram illustrating an embodiment of an ultrasound isolator.

FIG. 22 is a diagram illustrating an embodiment of an ultrasound isolator. In some embodiments, FIG. 22 comprises a cross-sectional view of an ultrasound isolator with a fingers-out, transverse groove configuration (e.g., similar to FIG. 16). In the example shown, ultrasound isolator 2200 comprises a potted ultrasound isolator. Ultrasound isolator 2200 comprises a set of fingers (e.g., finger 2204) and a pipe contouring (e.g., pipe contouring 2206). Ultrasound isolator 2200 additionally comprises potting material 2202. Potting material 2202 fills the regions between, above, and around the fingers of ultrasound isolator 2200. Potting material 2202 comprises a material with high ultrasound attenuation (e.g., silicone, urethane, epoxy, etc.). Potting material 2202 additionally can comprise grit particles (e.g., silicon carbide grit, tungsten grit, iron oxide grit, etc.) or filler particles (e.g., polystyrene filler, etc.) to increase attenuation and/or to tailor acoustic impedance. The acoustic impedance of potting material 2202 should be low compared to the fingers of ultrasound isolator 2200 in order not to compromise the ultrasound reflection properties of ultrasound isolator 2200.

Figure 23:
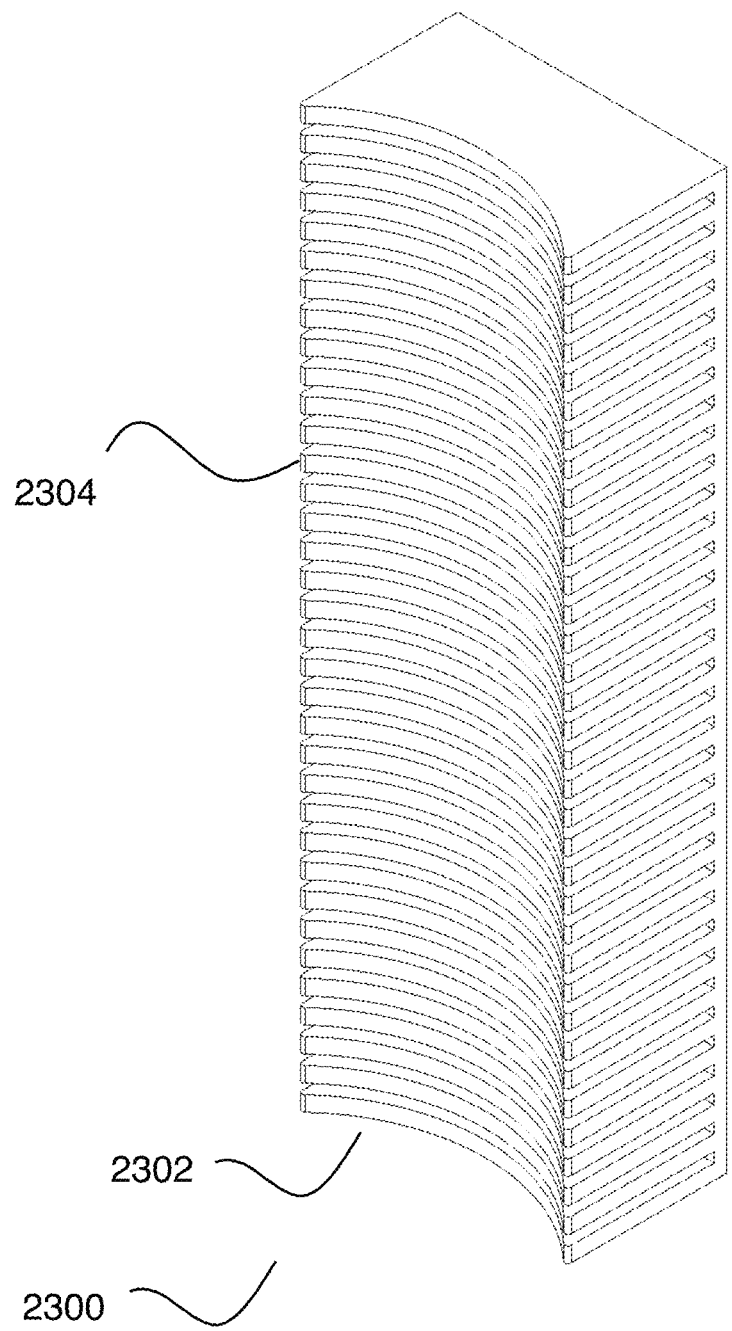
FIG. 23 is a diagram illustrating an embodiment of an ultrasound isolator.

FIG. 23 is a diagram illustrating an embodiment of an ultrasound isolator. In some embodiments, the ultrasound isolator of FIG. 23 is used to implement the ultrasound isolator of FIG. 5. In the example shown, ultrasound isolator 2300 comprises pipe contouring 2302 for coupling to a metal pipeline. Ultrasound isolator 2300 comprises an ultrasound isolator in a fingers-in (e.g., fingers 2304 are fixed on the end opposite from the metal pipeline and free on the end coupled to the metal pipeline) and transverse groove (e.g., grooves cut between fingers 2304 are perpendicular to the longitudinal direction of the metal pipeline) configuration.

Figure 24:
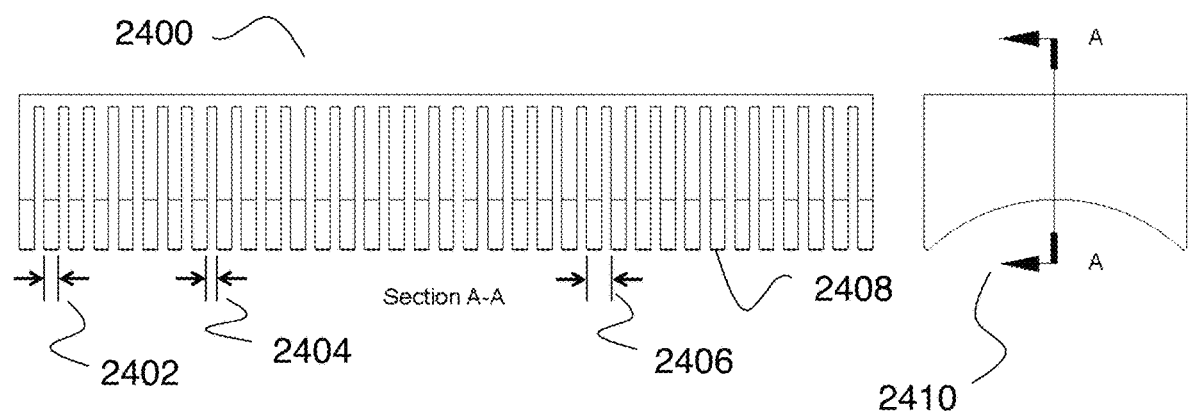
FIG. 24 is a diagram illustrating an embodiment of an ultrasound isolator.

FIG. 24 is a diagram illustrating an embodiment of an ultrasound isolator. In some embodiments, FIG. 24 comprises a cross-sectional view of ultrasound isolator 2300 of FIG. 23. In the example shown, ultrasound isolator 2400 comprises a set of fingers (e.g., finger 2408) mounted on pipe contouring 2410. Each finger comprises a finger height and a finger width (e.g., finger width 2402). A finger spacing (e.g., finger spacing 2404) exists between adjacent fingers. A finger pitch (e.g., finger pitch 2406) comprises the sum of the finger width and the finger spacing. Ultrasound isolator 2400 comprises an ultrasound isolator in a fingers-in, transverse groove configuration.

Figure 25:
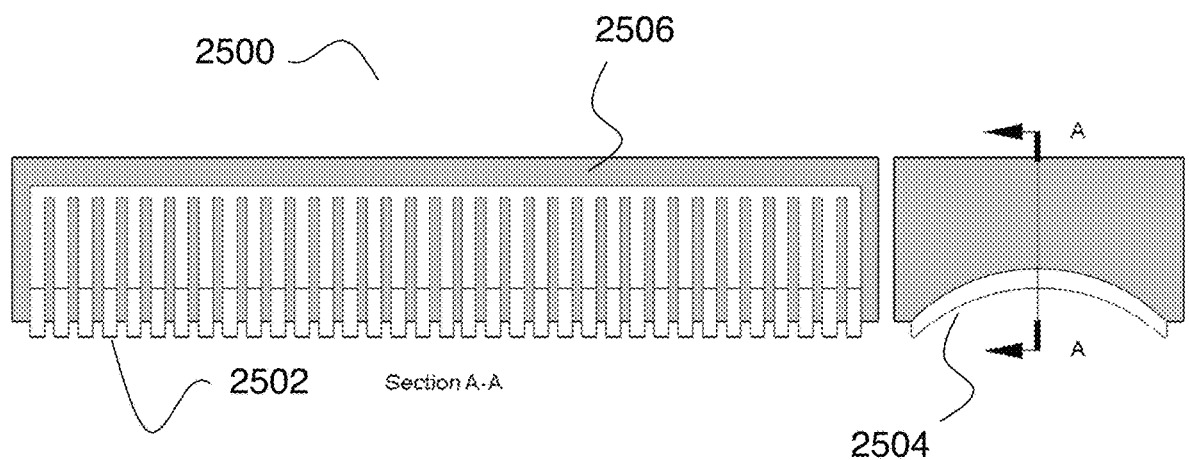
FIG. 25 is a diagram illustrating an embodiment of an ultrasound isolator.

FIG. 25 is a diagram illustrating an embodiment of an ultrasound isolator. In some embodiments, FIG. 25 comprises a cross-sectional view of an ultrasound isolator with a fingers-in, transverse groove configuration (e.g., similar to FIG. 24 but with potting material). Ultrasound isolator 2500 comprises a potted ultrasound isolator. Ultrasound isolator 2500 comprises a set of fingers (e.g., finger 2502) and a pipe contouring (e.g., pipe contouring 2504). Ultrasound isolator 2500 additionally comprises potting material 2506. Potting material 2506 fills the regions between, above, and around the fingers of ultrasound isolator 2500. Potting material 2506 comprises a material with high ultrasound attenuation (e.g., silicone, urethane, epoxy, etc.). Potting material 2506 additionally can comprise grit particles (e.g., silicon carbide grit, tungsten grit, iron oxide grit, etc.) or filler particles (e.g., polystyrene filler, etc.) to increase attenuation and/or to tailor acoustic impedance. The acoustic impedance of potting material 2506 should be low compared to the fingers of ultrasound isolator 2500 in order not to compromise the ultrasound reflection properties of ultrasound isolator 2500.

Figure 26:
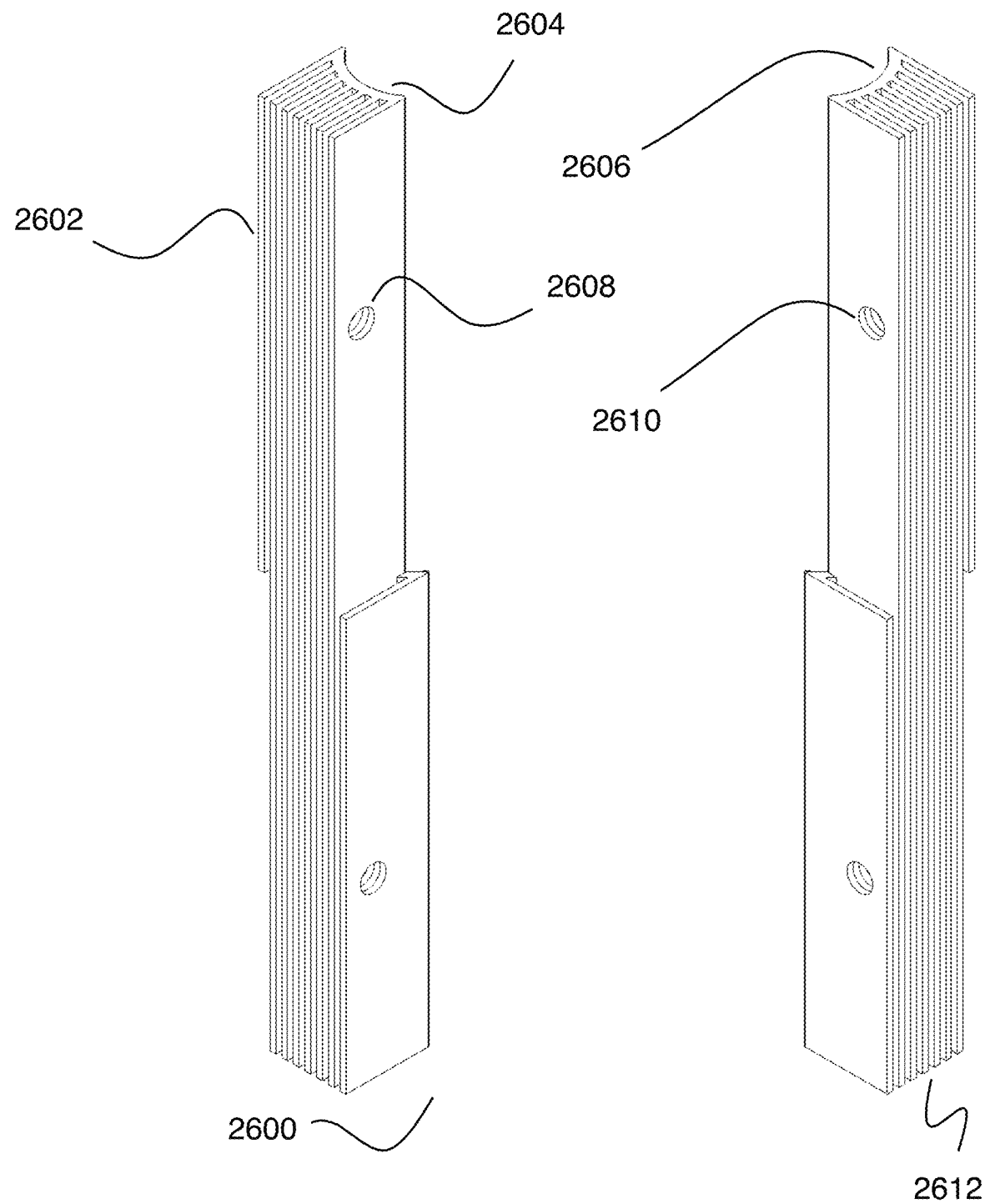
FIG. 26 is a diagram illustrating an embodiment of a mirrored pair of staggered ultrasound isolators.

FIG. 26 is a diagram illustrating an embodiment of a mirrored pair of staggered ultrasound isolators. In some embodiments, the ultrasound isolators of FIG. 26 are similar to the ultrasound isolator of FIG. 14. In the example shown, ultrasound isolators 2600 comprises a mirrored pair of staggered ultrasound isolators in a fingers-out, longitudinal groove configuration. A first ultrasound isolator comprises fingers 2602, pipe contouring 2604, and mounting hole 2608. A second ultrasound isolator comprises fingers 2612, pipe contouring 2606, and mounting hole 2610. The staggered isolator configuration comprises some fingers that do not run the full length of the isolator—for example, allowing for more fingers (e.g., increasing isolation) while providing greater clearance for ultrasonic wedges. The fingers that do not run the full length of the isolator end at some point within the length of the isolator. In some cases the fingers that do not run the full length are at one end of the isolator or at the other end of the isolator. For example, ultrasound isolators 2600 can be potted with high-attenuation material to increase isolation.

Figure 27:
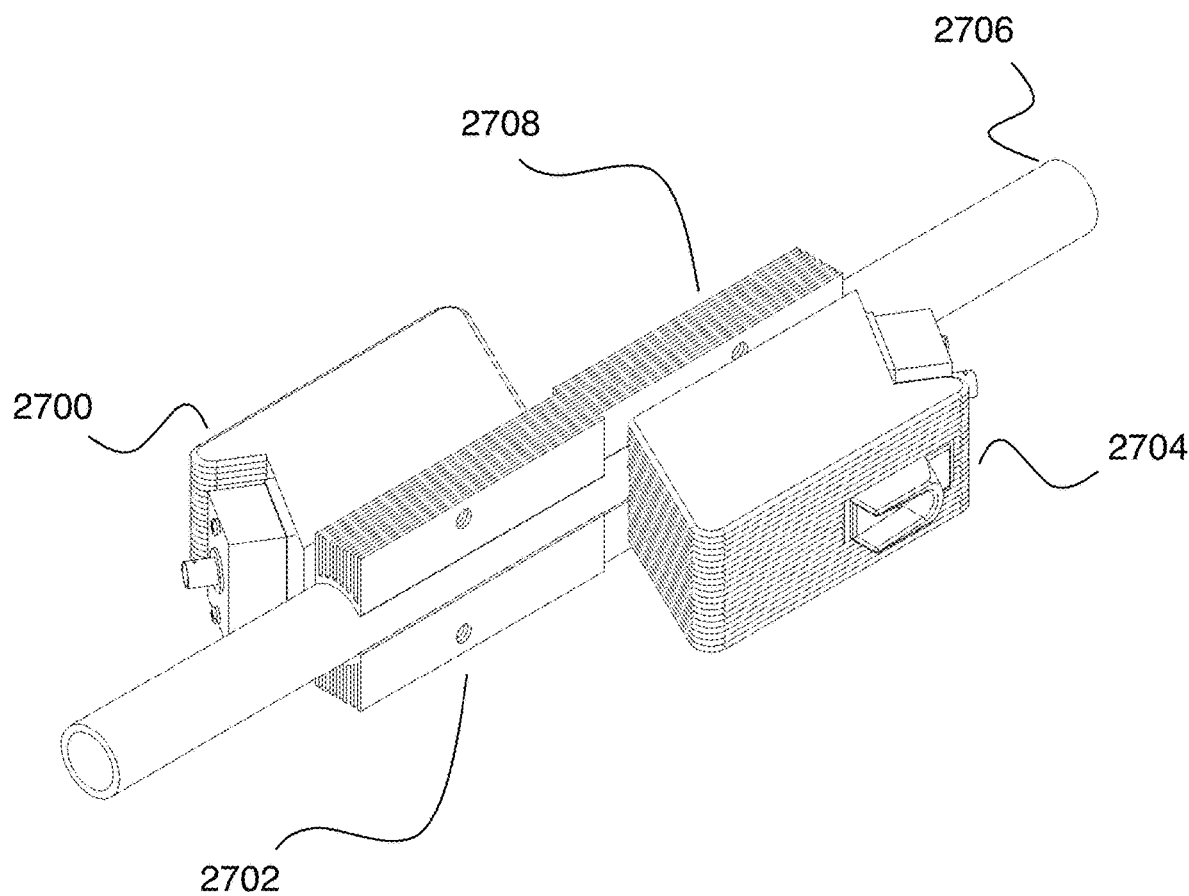
FIG. 27 is a diagram illustrating an embodiment of a pair of ultrasound wedges and a mirrored pair of staggered ultrasound isolators coupled to a metal pipeline.

FIG. 27 is a diagram illustrating an embodiment of a pair of ultrasound wedges and a mirrored pair of staggered ultrasound isolators coupled to a metal pipeline. In some embodiments, the pair of ultrasound wedges of FIG. 27 comprise the ultrasound wedges of FIG. 11, FIG. 12, or FIG. 13. In some embodiments, the staggered ultrasound isolators of FIG. 27 comprise the staggered isolators of FIG. 26. In the example shown, metal pipeline 2706 comprises a metal pipeline (e.g., made of iron, cast iron, steel, another metal, an alloy, etc.). Metal pipeline 2706 comprises a pipeline of any appropriate outer diameter and wall thickness. Typically, a metal pipeline comprises a pipeline with outer diameter in the range of ½" to 12" and wall thickness in the range of ¹⁄₃₂" to ½". Ultrasound wedge 2700 and ultrasound wedge 2704 comprise an ultrasound transmitter and an ultrasound receiver coupled to metal pipeline 2706. Staggered ultrasound isolator 2702 and staggered ultrasound isolator 2708 comprise ultrasound isolators coupled to metal pipeline 2706. Staggered ultrasound isolator 2702 and staggered ultrasound isolator 2708 are positioned on metal pipeline 2706 to provide isolation preventing ultrasound from passing between ultrasound wedge 2700 and ultrasound wedge 2704 along a parasitic circumferential path through the wall of metal pipeline 2706. Staggered ultrasound isolator 2702 and staggered ultrasound isolator 2708 are positioned on metal pipeline 2706 to additionally increase the intensity of ultrasound passing along a desired axial path through the wall of metal pipeline 2706. The staggered configuration of staggered ultrasound isolator 2702 and staggered ultrasound isolator 2708 increases the number of fingers on each isolator (e.g., increasing isolation) while providing clearance for ultrasound wedge 2700 and ultrasound wedge 2704.

Figure 28:
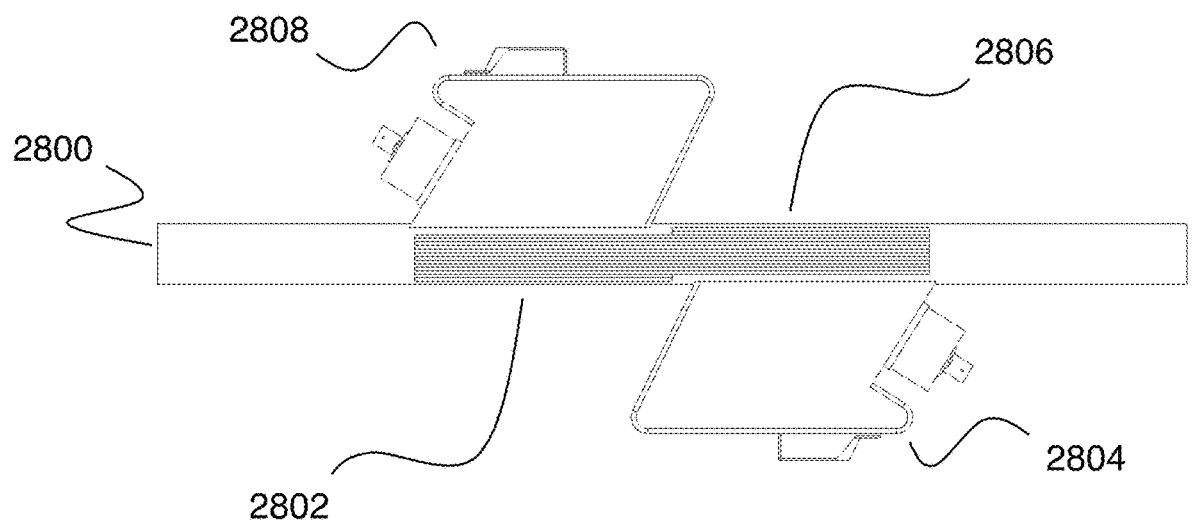
FIG. 28 is a diagram illustrating an embodiment of a pair of ultrasound wedges and a mirrored pair of staggered ultrasound isolators coupled to a metal pipeline.

FIG. 28 is a diagram illustrating an embodiment of a pair of ultrasound wedges and a mirrored pair of staggered ultrasound isolators coupled to a metal pipeline. In some embodiments, the diagram of FIG. 28 comprises a side view of the diagram of FIG. 27. In the example shown, ultrasound wedge 2808 and ultrasound wedge 2804 comprise an ultrasound transmitter and an ultrasound receiver coupled to metal pipeline 2800. Staggered ultrasound isolator 2802 (e.g., in front of metal pipe 2800) and staggered ultrasound isolator 2806 (e.g., behind metal pipe 2800, not seen) comprise ultrasound isolators coupled to metal pipeline 2800. Staggered ultrasound isolator 2802 and staggered ultrasound isolator 2806 are positioned on metal pipeline 2800 to provide isolation preventing ultrasound from passing between ultrasound wedge 2808 and ultrasound wedge 2804 along a parasitic circumferential path through the wall of metal pipeline 2800. Staggered ultrasound isolator 2802 and staggered ultrasound isolator 2806 are positioned on metal pipeline 2800 to additionally increase the intensity of ultrasound passing along a desired axial path through the wall of metal pipeline 2800. The staggered configuration of staggered ultrasound isolator 2802 and staggered ultrasound isolator 2806 increases the number of fingers on each isolator (e.g., increasing isolation) while providing clearance for ultrasound wedge 2808 and ultrasound wedge 2804.

Figure 29:
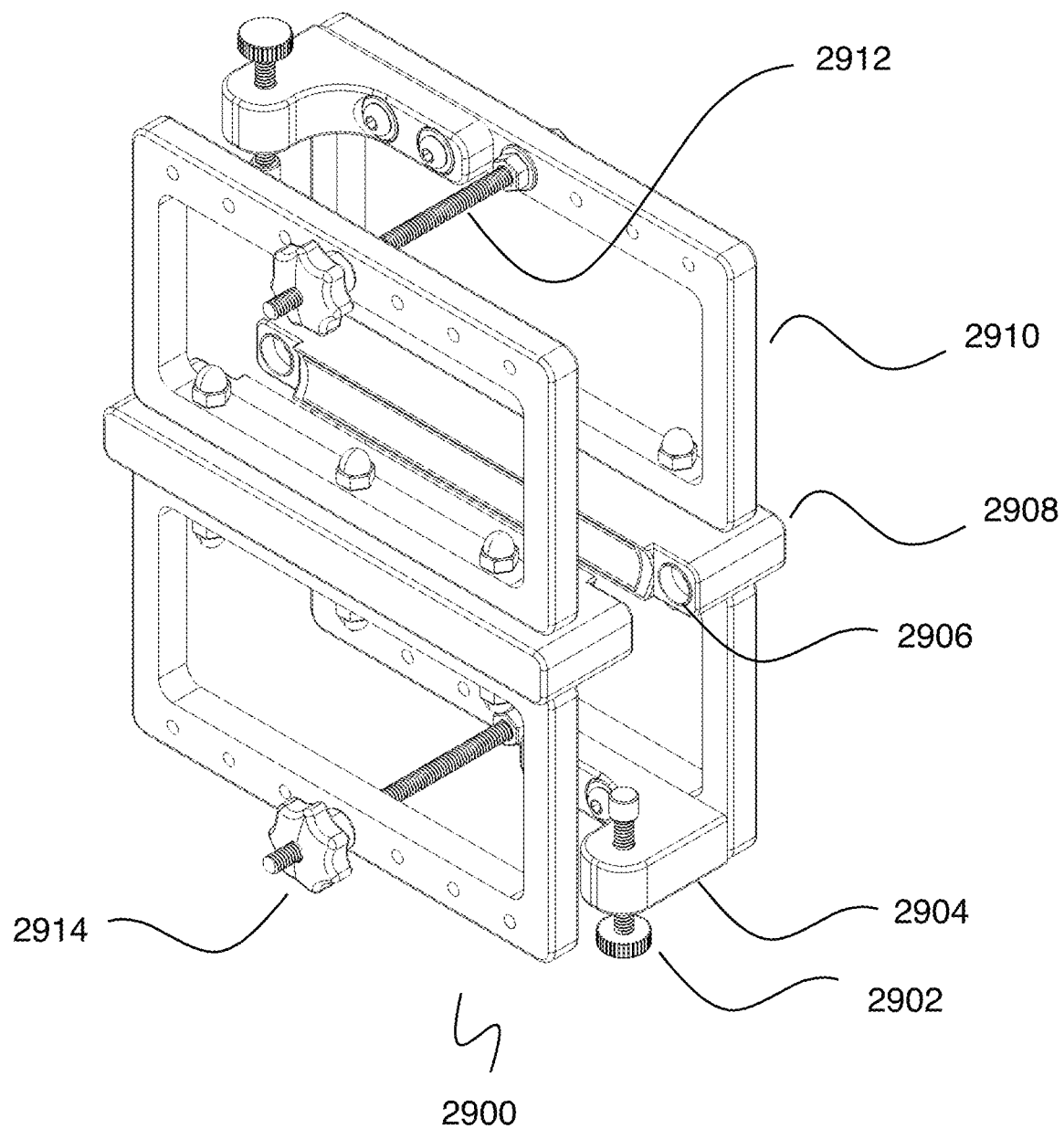
FIG. 29 is a diagram illustrating an embodiment of an assembly alignment cage.

FIG. 29 is a diagram illustrating an embodiment of an assembly alignment cage. In some embodiments, the assembly alignment cage of FIG. 29 is used to couple a pair of ultrasound wedges and a pair of ultrasound isolators to a metal pipeline (e.g., ultrasound wedges and pair of isolators of FIG. 28 although the isolators of FIG. 29 are not staggered isolators as are the isolators of FIG. 28). In the example shown, one or more alignment cages constrain the ultrasound transmitter or the ultrasound receiver and one or more isolators to prescribed axial and angular separation upon being secured to the metal pipeline. Assembly alignment cage 2900 aligns ultrasound isolators and ultrasound wedges to a metal pipeline, enabling greater measurementto-measurement consistency (e.g., enhancing accuracy) and reducing setup and teardown time and effort. Assembly alignment cage 2900 comprises assembly alignment cage frame 2910 for providing structure to assembly alignment cage 2900 and for holding ultrasound wedges. Assembly alignment cage frame 2910 comprises two halves for clamping to opposite sides of a metal pipeline. Assembly alignment cage 2900 comprises magnets (e.g., magnet 2906) for holding assembly alignment cage frame 2910 to the metal pipeline during assembly. Assembly alignment cage 2900 comprises any appropriate number of magnets (e.g., 1 magnet, 2 magnets, 4 magnets, etc.). Assembly alignment cage 2900 comprises a pair of threaded crossbars (e.g., crossbar 2912) and a pair of retaining knobs (e.g., retaining knob 2914) for threading to the threaded crossbars. The threaded crossbars and retaining knobs hold assembly alignment cage 2900 in place during measurement. Assembly alignment cage 2900 comprises a pair of brackets (e.g., bracket 2904) holding wedge-locating clamps (e.g., wedge-locating clamp 2902). The wedge-locating clamps comprise clamps for clamping to a clamping guide of an ultrasound wedge (e.g., for clamping an ultrasound wedge to a metal pipeline). Assembly alignment cage 2900 includes a pair of ultrasound isolators (e.g., ultrasound isolator 2908). When assembly alignment cage 2900 is assembled around a metal pipeline (e.g., and the retaining knobs are tightened on the crossbars), the pair of ultrasound isolators is clamped to the metal pipeline. For example, the pair of ultrasound isolators comprises a pair of potted ultrasound isolators. In the example shown, ultrasound isolators are incorporated into assembly alignment cage 2900. In various embodiments, ultrasound isolators are incorporated into assembly alignment cage 2900, ultrasound wedges are incorporated into assembly alignment cage 2900, ultrasound isolators and ultrasound wedges are incorporated into assembly alignment cage 2900, or neither ultrasound isolators nor ultrasound wedges are incorporated into assembly alignment cage 2900.

Figure 30:
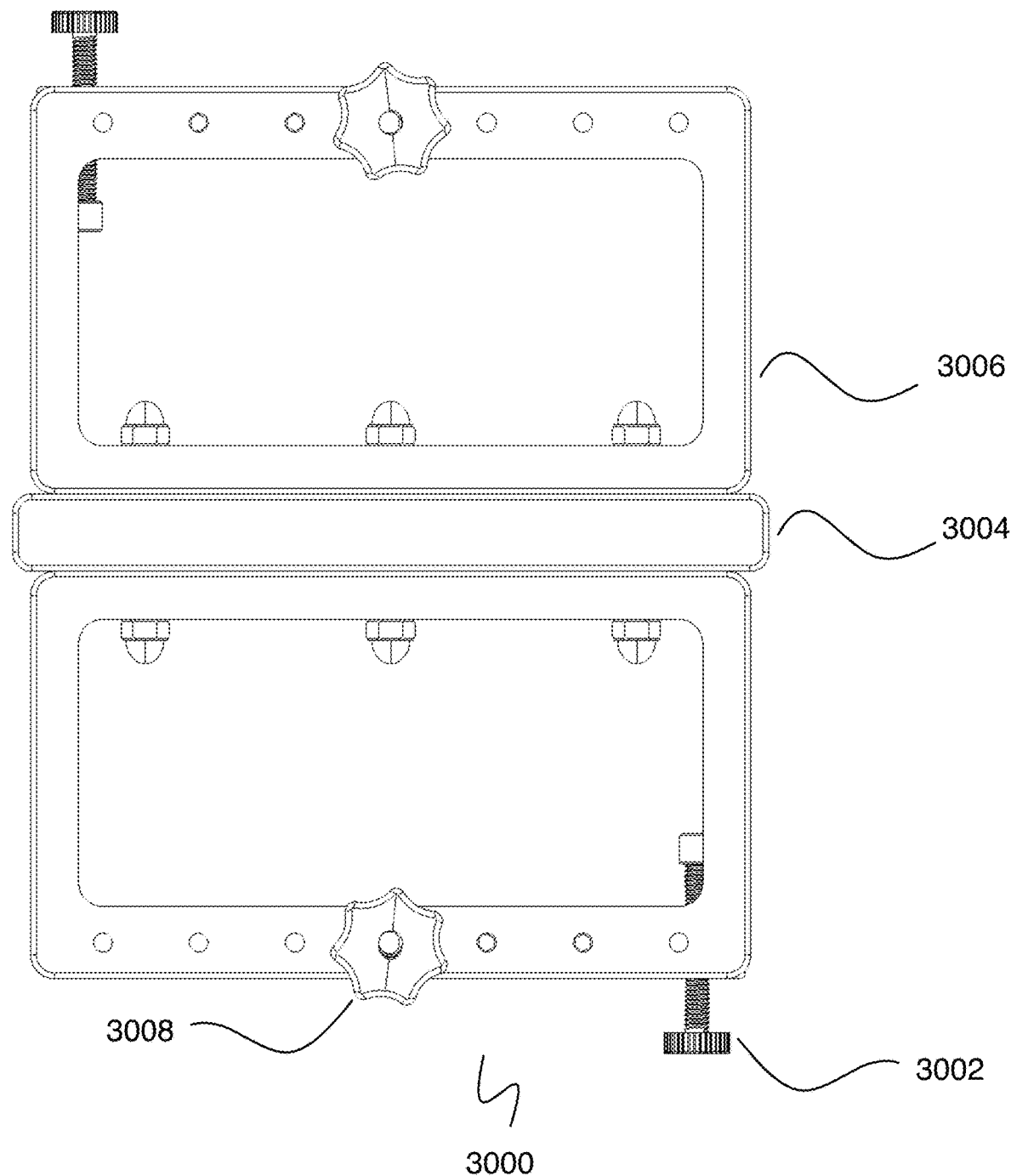
FIG. 30 is a diagram illustrating an embodiment of a side view of an assembly alignment cage.

FIG. 30 is a diagram illustrating an embodiment of a side view of an assembly alignment cage. In some embodiments, assembly alignment cage 3000 comprises assembly alignment cage 2900 of FIG. 29. In the example shown, assembly alignment cage 3000 comprises assembly alignment cage frame 3006, wedge-locating clamps (e.g., wedge-locating clamp 3002), retaining knobs (e.g., retaining knob 3008), and ultrasound isolators (e.g., ultrasound isolator 3004). For example, ultrasound isolator 3004 comprises a potted ultrasound isolator.

Figure 31:
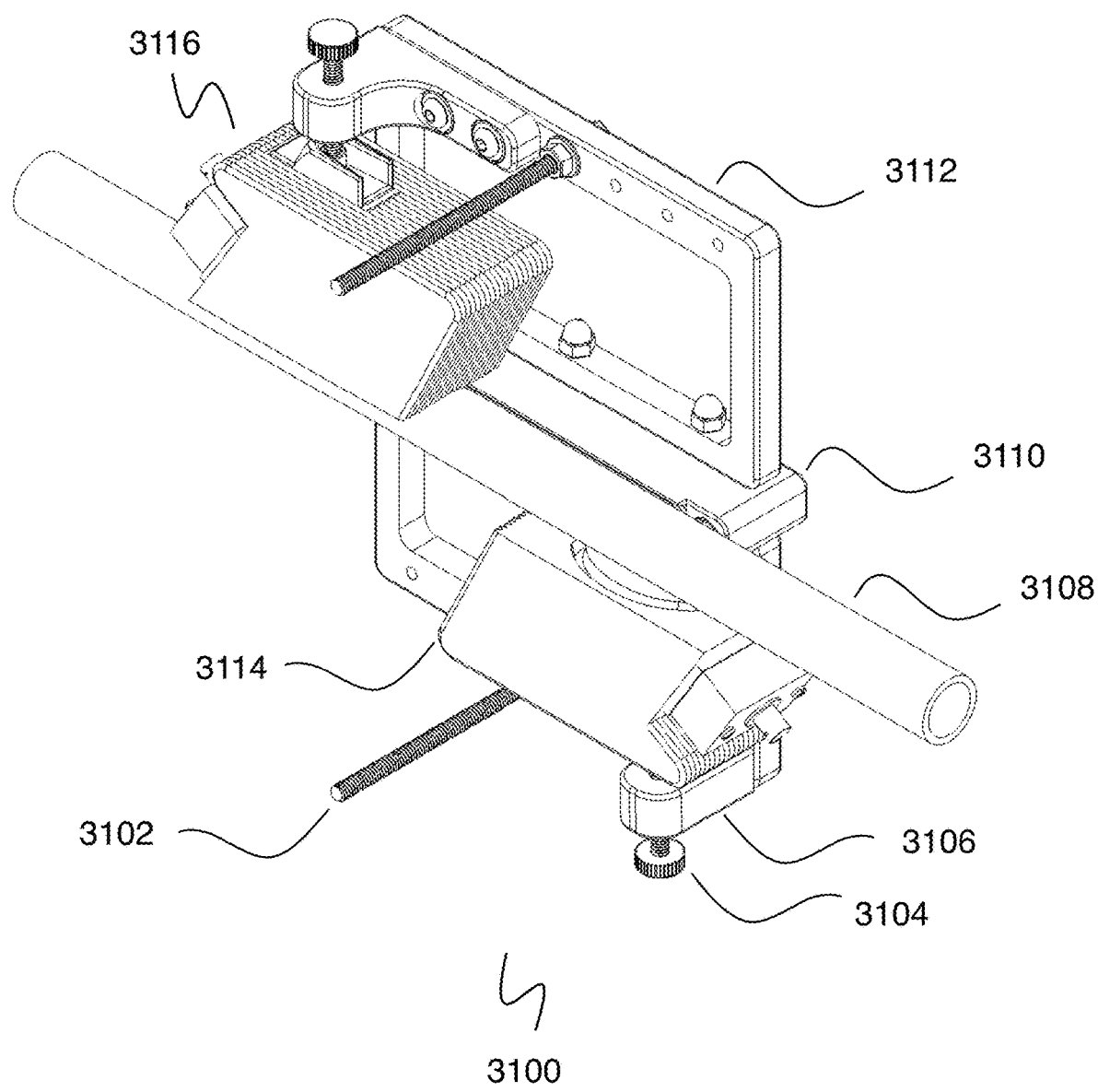
FIG. 31 is a diagram illustrating an embodiment of a partial assembly of an assembly alignment cage coupling two ultrasound wedges to a metal pipeline.

FIG. 31 is a diagram illustrating an embodiment of a partial assembly of an assembly alignment cage coupling two ultrasound wedges to a metal pipeline. In some embodiments, the assembly alignment cage is the assembly alignment cage of FIG. 30. In the example shown, partial assembly 3100 comprises first half of assembly alignment cage frame 3112 positioned behind metal pipeline 3108 and held to metal pipeline 3108 using a magnet. Partial assembly 3100 comprises ultrasound isolator 3110 (e.g., a potted or unpotted ultrasound isolator), a pair of brackets (e.g., bracket 3106), a pair of wedge-locating clamps (e.g., wedge-locating clamp 3104), a pair of crossbars (e.g., crossbar 3102), ultrasound wedge 3114, and ultrasound wedge 3116.

Figure 32:
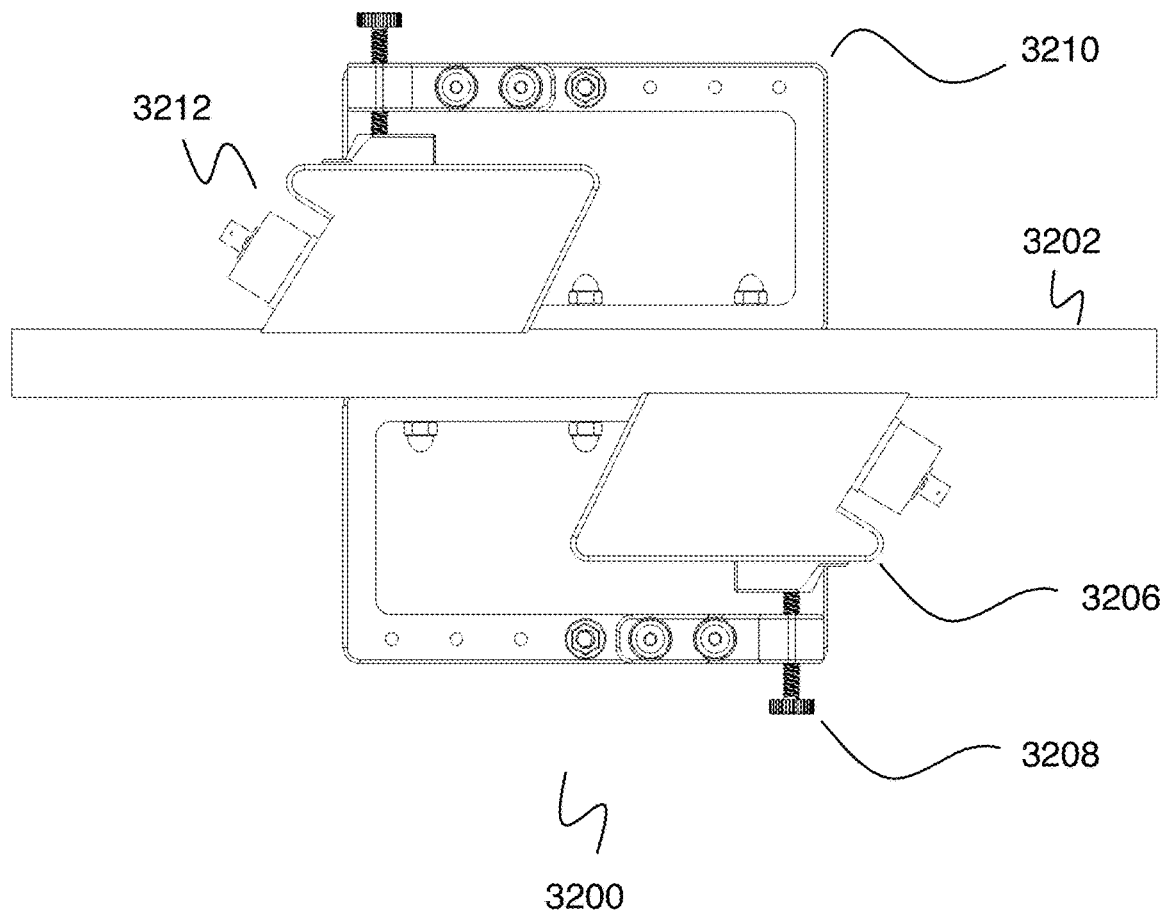
FIG. 32 is a diagram illustrating an embodiment of a side view of a partial assembly of an assembly alignment cage coupling two ultrasound wedges to a metal pipeline.

FIG. 32 is a diagram illustrating an embodiment of a side view of a partial assembly of an assembly alignment cage coupling two ultrasound wedges to a metal pipeline. In some embodiments, the assembly alignment cage coupling two ultrasound wedges to a metal pipeline comprise the assembly alignment cage coupling two ultrasound wedges to a metal pipeline of FIG. 31. In the example shown, partial assembly 3200 comprises first half of assembly alignment cage frame 3210 positioned behind metal pipeline 3202 and held to metal pipeline 3202 using a magnet. Partial assembly 3200 additionally comprises a pair of wedge-locating clamps (e.g., wedge-locating clamp 3208), ultrasound wedge 3206, and ultrasound wedge 3212. In some examples, partial assembly 3200 comprises an ultrasonic isolator that is not visible from behind metal pipeline 3202.

Figure 33:
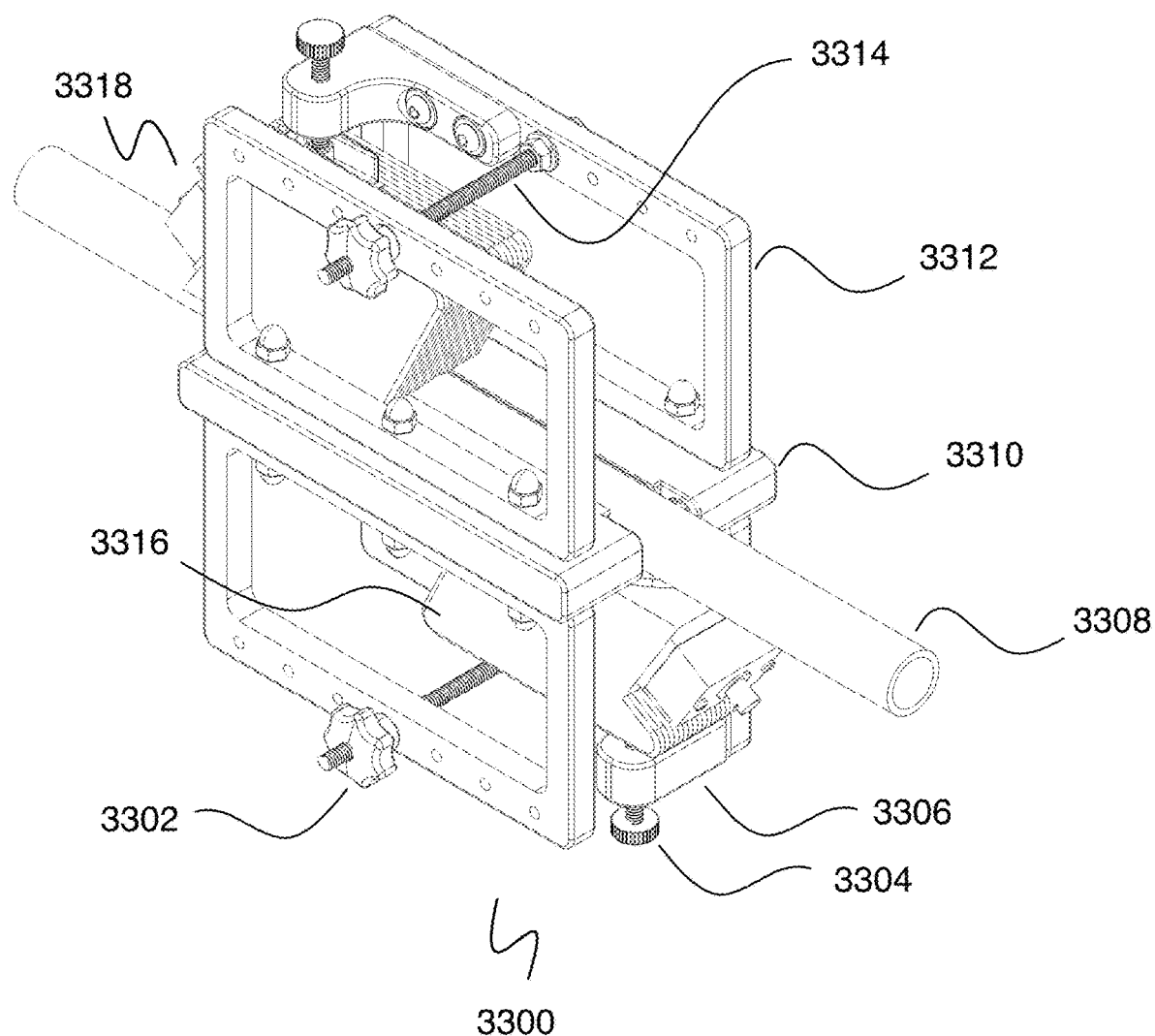
FIG. 33 is a diagram illustrating an embodiment of a complete assembly of an assembly alignment cage coupling two ultrasound wedges to a metal pipeline.

FIG. 33 is a diagram illustrating an embodiment of a complete assembly of an assembly alignment cage coupling two ultrasound wedges to a metal pipeline. In some embodiments, FIG. 33 shows the assembly of FIG. 29 but including a metal pipe and a pair of ultrasound wedges. In the example shown, assembly 3300 comprises assembly alignment cage frame 3312 coupled to front and back of metal pipeline 3308 and held to metal pipeline 3308 using magnets. Assembly alignment cage frame 3312 is clamped using a pair of crossbars (e.g., crossbar 3314) and a pair of retaining knobs (e.g., retaining knob 3302). Assembly alignment cage frame 3312 clamps a pair of ultrasound isolators (e.g., ultrasound isolator 3310) to metal pipeline 3308. For example, the pair of ultrasound isolators comprises a pair of potted ultrasound isolators. Assembly 3300 additionally comprises a pair of brackets (e.g., bracket 3306) and a pair of wedge-locating clamps (e.g., wedge-locating clamp 3304). Assembly alignment cage frame holds ultrasound wedge 3316 and ultrasound wedge 3318 to metal pipeline 3308.

Figure 34:
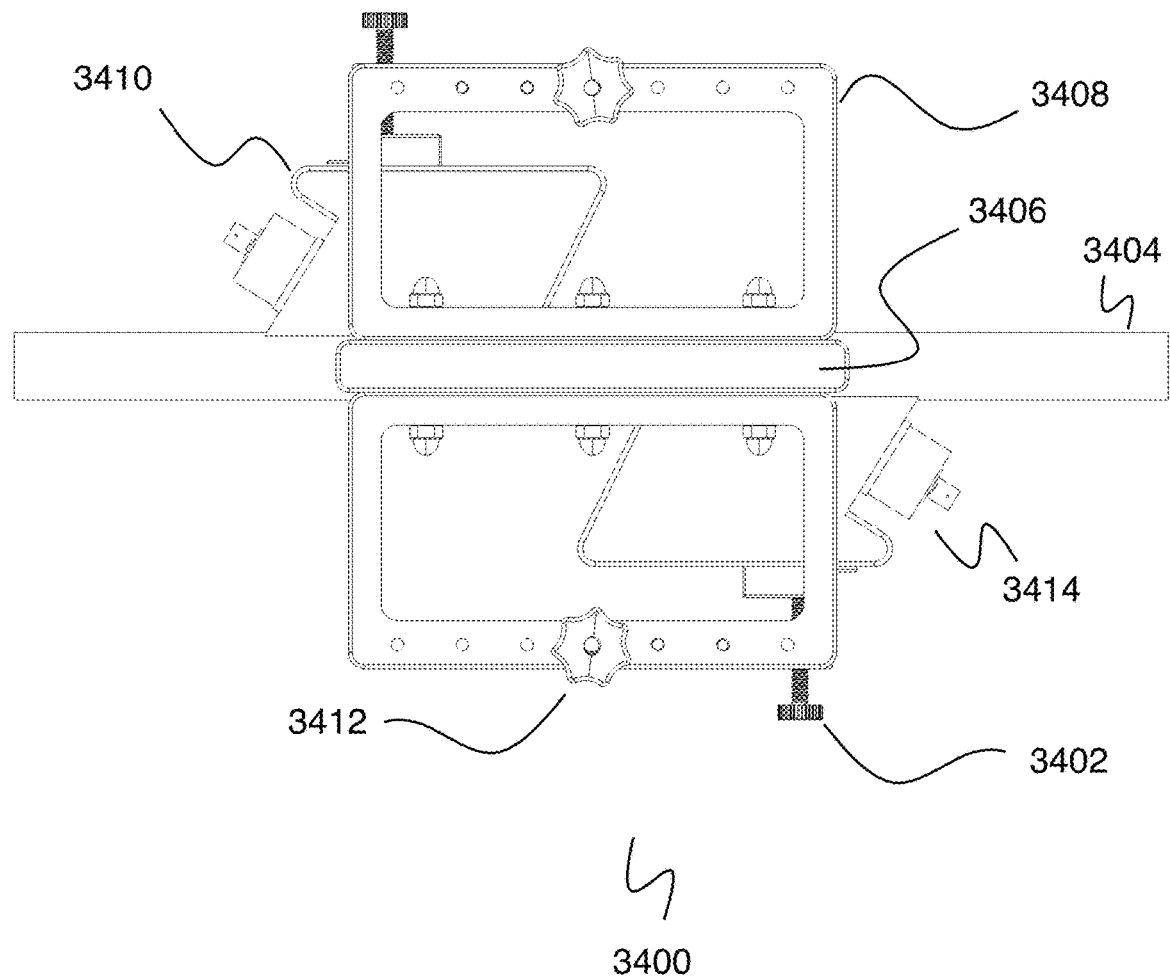
FIG. 34 is a diagram illustrating an embodiment of a side view of a complete assembly of an assembly alignment cage coupling two ultrasound wedges to a metal pipeline.

FIG. 34 is a diagram illustrating an embodiment of a side view of a complete assembly of an assembly alignment cage coupling two ultrasound wedges to a metal pipeline. In some embodiments, the assembly of FIG. 34 comprises the assembly of FIG. 33. In the example shown, assembly 3400 comprises assembly alignment cage frame 3408 coupled to the front and back of metal pipeline 3404 and held to metal pipeline 3404 using magnets. Assembly 3400 additionally comprises a pair of wedge-locating clamps (e.g., wedge-locating clamp 3402), a pair of retaining knobs (e.g., retaining knob 3412), a pair of ultrasound isolators (e.g., ultrasound isolator 3406), ultrasound wedge 3410, and ultrasound wedge 3414. For example, the pair of ultrasound isolators comprises a pair of potted ultrasound isolators.

Figure 35:
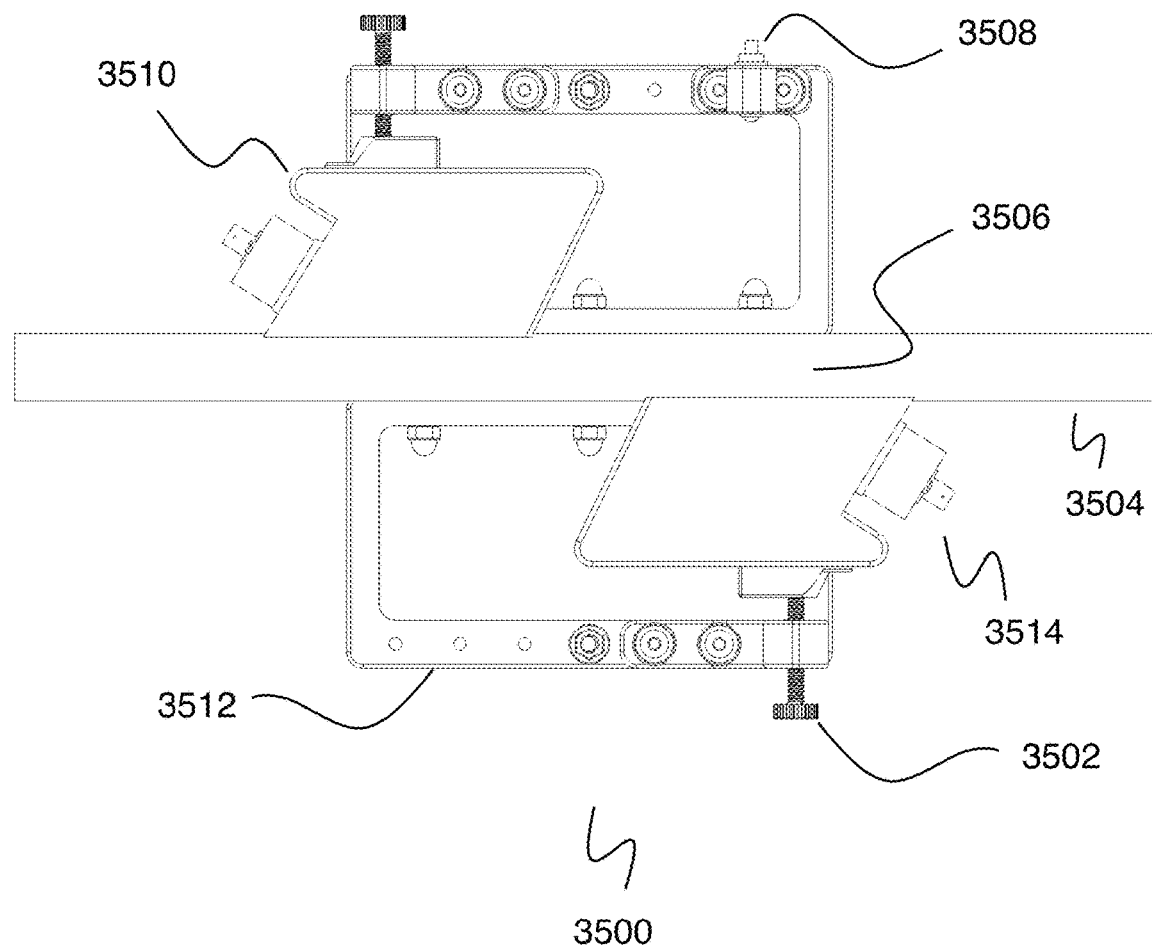
FIG. 35 is a diagram illustrating an embodiment of a side view of a partial assembly of an assembly alignment cage coupling two ultrasound wedges to a metal pipeline including a temperature sensing element.

FIG. 35 is a diagram illustrating an embodiment of a side view of a partial assembly of an assembly alignment cage coupling two ultrasound wedges to a metal pipeline including a temperature sensing element. In some embodiments, the partial assembly of FIG. 35 comprises a part of the assembly shown in FIG. 34. In the example shown, assembly 3500 comprises first half of assembly alignment cage frame 3512, including ultrasound isolator 3506 positioned behind metal pipeline 3504 and held to metal pipeline 3504 using a magnet. Assembly 3500 comprises a pair of wedge-locating clamps (e.g., wedge-locating clamp 3502). The pair of wedge-locating clamps clamp ultrasound wedge 3510 and ultrasound wedge 3514 to metal pipeline 3504. Assembly 3500 additionally comprises temperature sensing element 3508. In the example shown, temperature sensing element 3508 comprises a non-contact temperature sensing element (e.g., a pyrometer, a bolometer, etc.). In some embodiments, temperature sensing element comprises a contact temperature sensing element (e.g., a thermistor, a thermocouple, etc.). Temperature sensing element 3508 senses the temperature of the wall of metal pipeline 3504. The temperature of the wall of metal pipeline 3504 is correlated to the temperature of a fluid enclosed by metal pipeline 3504 and affects the speed of ultrasound waves traveling through the fluid. For example, the temperature measurement can be used to compensate the expected time-of-flight of the ultrasound signal corresponding to an empty pipe condition. The temperature of the wall of metal pipeline 3504 additionally affects the speed of ultrasonic waves traveling through the wall of metal pipeline 3504; however, the temperature dependence of the time-of-flight of an ultrasound signal is typically dominated by the change in the speed of sound waves traveling through the fluid owing to the lower propagation speed of ultrasound in fluids (e.g., an enclosed gas) than in solids (e.g., a wall of a metal pipeline). For example, temperature sensing element 3508 is coupled to a control system and is read directly by the control system, or temperature sensing element 3508 is read manually and the temperature is entered manually into the control system. For example, a typical enclosed fluid temperature is within the range of −10° C. to +40° C.

Figure 36:
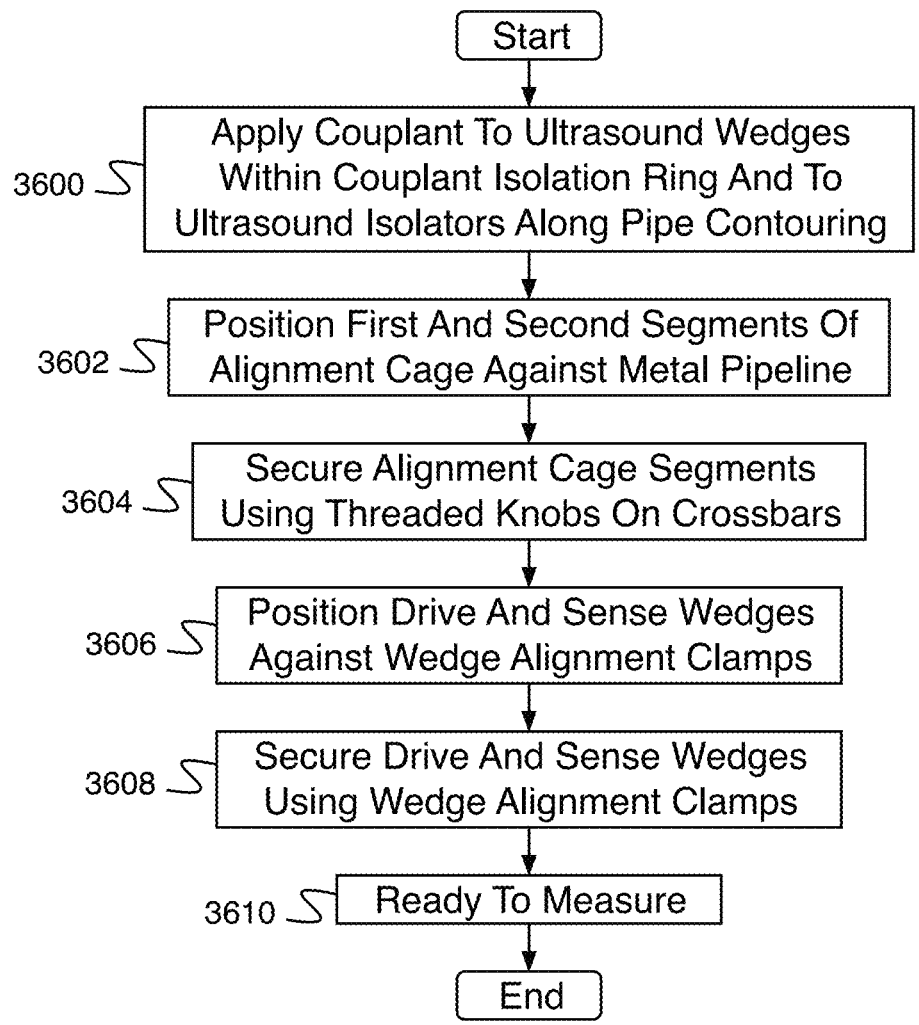
FIG. 36 is a flow diagram illustrating an embodiment of a process for assembling a sensor system assembly.

FIG. 36 is a flow diagram illustrating an embodiment of a process for assembling a sensor system assembly. In some embodiments, the process of FIG. 36 comprises a process for assembling assembly 3300 of FIG. 33. For example, the process of FIG. 36 improves measurement-to-measurement consistency of a sensor system and enables accurate results to be obtained. In the example shown, in 3600, couplant is applied to ultrasound wedges within couplant isolation ring and to ultrasound isolators along pipe contouring. In 3602, first and second segments of the alignment cage are positioned against a metal pipeline. In 3604, alignment cage segments are secured using threaded knobs on crossbars. In 3606, drive and sense wedges are positioned against wedge alignment clamps. In 3608, the drive and sense wedges are secured using the wedge alignment clamps. In 3610, the sensor system is ready to measure.

Figure 37A:
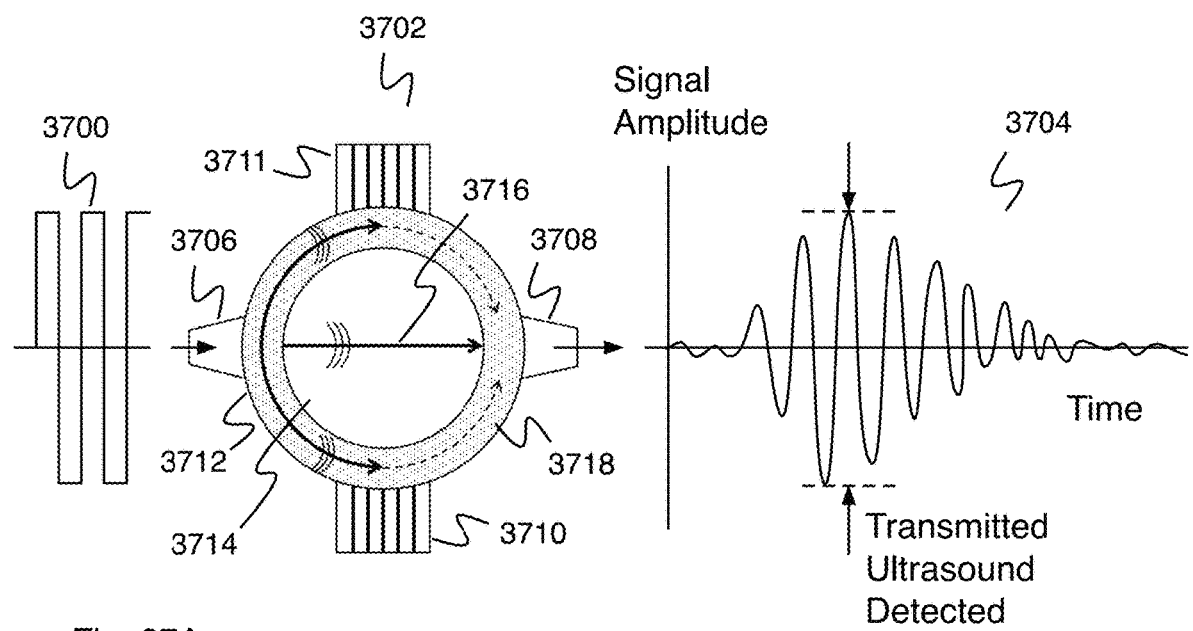
FIG. 37A is a diagram illustrating an embodiment of a received signal in the absence of an inserted plastic pipeline.

FIG. 37A is a diagram illustrating an embodiment of a received signal in the absence of an inserted plastic pipeline. In some embodiments, the received signals shown in FIG. 37A correspond to measurements taken using the assembly of FIG. 33. In the example shown, system 3702 comprises ultrasound transmitter 3706, ultrasound receiver 3708, and ultrasound isolator 3710 and ultrasound isolator 3711 coupled to metal pipeline 3712. Metal pipeline 3712 of system 3702 includes no inserted plastic pipeline or other obstruction. Drive signal 3700 is applied to ultrasound transmitter 3706 of system 3702. For example, drive signal 3700 comprises a square wave signal. In various embodiments, drive signal 3700 comprises a sine wave, a square wave, a triangle wave, a sawtooth wave, a complex waveform, a single frequency, a plurality of frequencies, or any other appropriate signal or signal characteristics. Ultrasound receiver 3708 of system 3702 receives received signal 3704. Received signal 3704 comprises an oscillation increasing and then decreasing in amplitude. For example, received signal 3704 comprises an oscillation at the same frequency as drive signal 3700. Received signal 3704 is received a time delay after drive signal 3700 occurs—for example, corresponding to the time for ultrasonic waves 3716 to pass through fluid 3714 contained in metal pipe 3712 of system 3702. This means that the signal corresponding to ultrasound waves 3718 traveling through the walls of metal pipe 3712 arrive earlier than received signal 3704 from ultrasonic waves 3716 passing through fluid 3714. The signal corresponding to ultrasound waves 3718 traveling through the walls of metal pipe 3712 can represent a noise signal including an oscillation at the same frequency as drive signal 3700 and/or correlated to drive signal 3700. In various embodiments, ultrasound isolator 3710 and ultrasound isolator 3711 can increase the measurement signal-to-noise ratio (e.g., increase the amplitude of a signal corresponding to ultrasonic waves 3716 passing through fluid 3714 and/or reduce the amplitude of a signal corresponding to ultrasound waves 3718 traveling through the walls of metal pipe 3712).

For example, system 3702 additionally comprises a control system, wherein the control system is configured to provide an input signal (e.g., drive signal 3700) to ultrasound transmitter 3706, receive a received signal (e.g., received signal 3704) from ultrasound receiver 3708, and provide a result based at least in part on the received signal. In the example shown, the result comprises an "Empty Pipe" response. For example, the result comprises a determination of an absence of an insert or other obstruction internal to metal pipe 3712 based at least in part on the input signal and the received signal. In some embodiments, a received signal comprises a signal corresponding to ultrasound waves traveling through the walls of a metal pipe and a signal corresponding to ultrasound waves passing through an enclosed fluid.

Figure 37B:
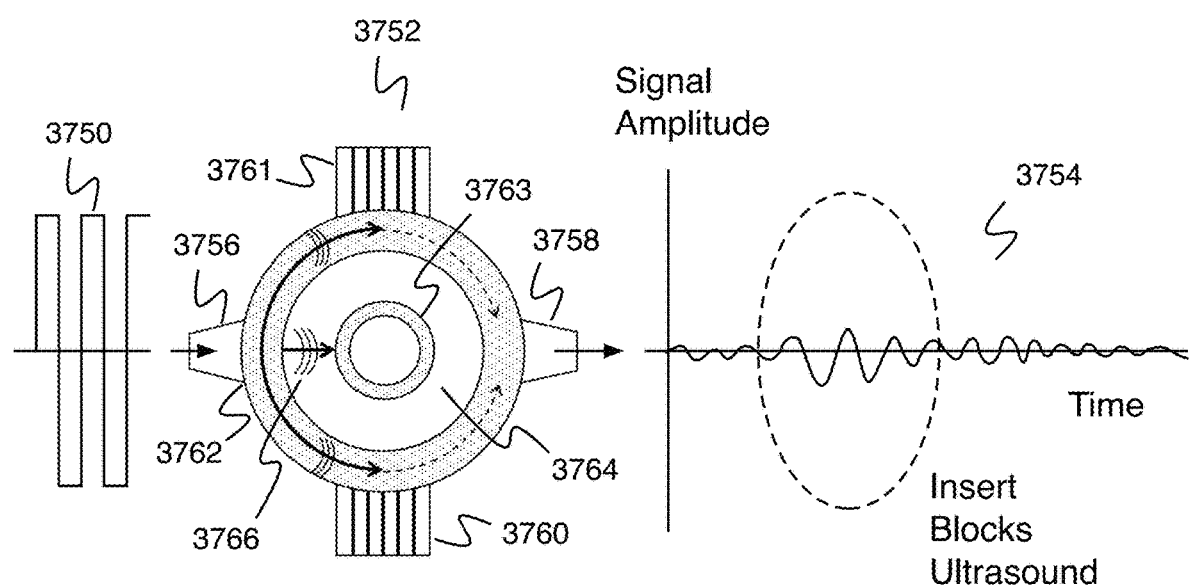
FIG. 37B is a diagram illustrating an embodiment of a received signal in the presence of an inserted plastic pipeline.

FIG. 37B is a diagram illustrating an embodiment of a received signal in the presence of an inserted plastic pipeline. In some embodiments, the received signals shown in FIG. 37B correspond to measurements taken using the assembly of FIG. 33. In the example shown, system 3752 comprises ultrasound transmitter 3756, ultrasound receiver 3758, and ultrasound isolator 3760 and ultrasound isolator 3761 coupled to metal pipeline 3762. Metal pipeline 3762 of system 3752 comprises inserted plastic pipeline 3763. Drive signal 3750 is applied to ultrasound transmitter 3756 of system 3752. For example, drive signal 3750 comprises a square wave signal. In various embodiments, drive signal 3750 comprises a sine wave, a square wave, a triangle wave, a sawtooth wave, a complex waveform, a single frequency, a plurality of frequencies, etc. Ultrasound receiver 3758 of system 3752 receives received signal 3754. Received signal 3754 comprises a noise signal including an oscillation at the same frequency as drive signal 3750 and/or correlated to drive signal 3750 at an amplitude less than a threshold. In some cases, the threshold is a function of the frequency of drive signal 3750.

For example, system 3752 additionally comprises a control system, wherein the control system is configured to provide an input signal (e.g., drive signal 3750) to ultrasound transmitter 3756, receive a received signal (e.g., received signal 3754) from ultrasound receiver 3758, and provide a result based at least in part on the received signal. In the example shown, the result comprises an "Insert Present" response. For example, the result comprises a determination of a presence of an insert or other obstruction internal to metal pipe 3762 based at least in part on the input signal and the received signal. In the example shown, ultrasonic waves 3766 passing through fluid 3764 is attenuated by inserted plastic pipeline 3763 such that the received signal is smaller than a threshold amplitude and this leads to a determination that an insert is present. In some embodiments, a threshold amplitude for determining the presence of an insert is based at least in part on the amplitude of a noise signal and/or on the frequency of drive signal 3750.

Figure 38:
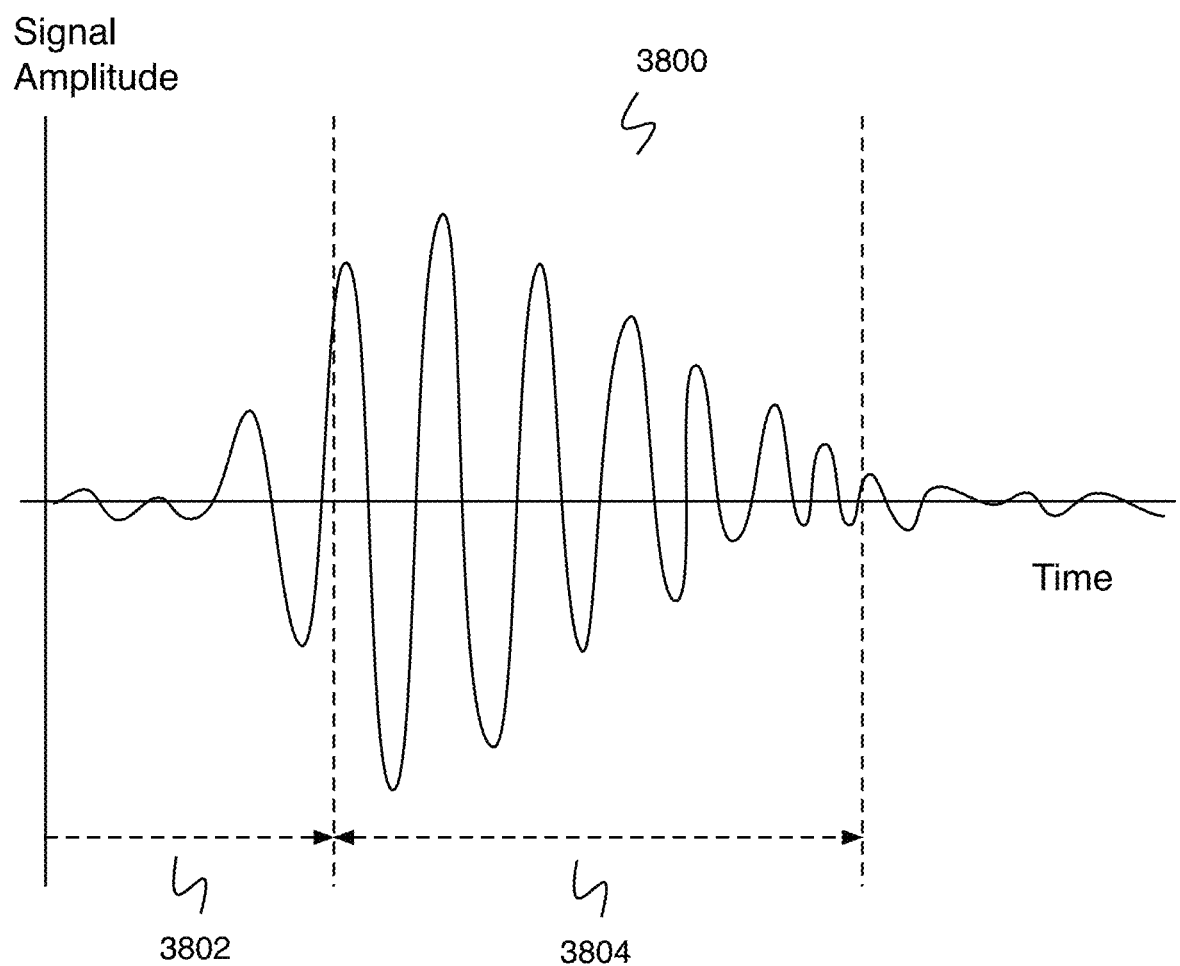
FIG. 38 is a diagram illustrating an embodiment of a received signal.

FIG. 38 is a diagram illustrating an embodiment of a received signal. In some embodiments, received signal of FIG. 38 comprises received signal 3704 of FIG. 37A. In the example shown, received signal 3800 comprises a signal received from a system comprising an ultrasound transmitter, an ultrasound receiver, and two ultrasound isolators coupled to a metal pipeline. Received signal 3800 comprises a received signal potentially in the presence of an inserted plastic pipeline. Received signal 3800 falls within time-of-flight window 3804 after delay time 3802. For example, time-of-flight window 3804 and delay time 3802 are calculated based on the metal pipeline geometry and material properties, the properties of the enclosed fluid, and on the placement of the ultrasound transmitter and the ultrasound receiver. Time-of-flight window 3804 indicates the window of time during which it is expected that a received signal corresponding to a transmitted signal passing through fluid in the metal pipeline unobstructed by an inserted plastic pipeline will be received. For example, the arrival time of a peak of received signal 3800 is compared with time-of-flight window 3804 as part of a determination of whether received signal 3800 corresponds to a transmitted signal passing through fluid in the metal pipeline unobstructed by an inserted plastic pipeline or a transmitted signal passing through a parasitic path (e.g., a time-windowed portion of received signal 3800 is used for the amplitude measurement).

Figure 39:
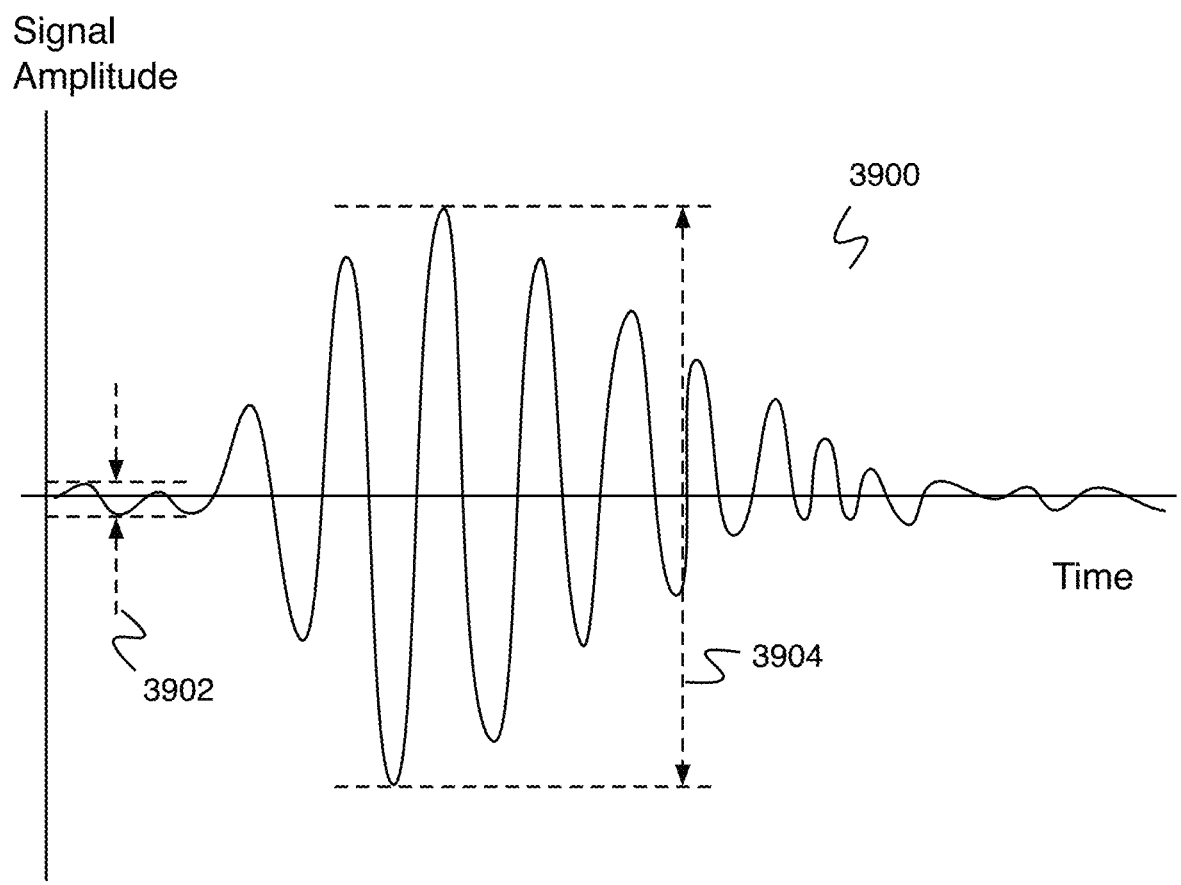
FIG. 39 is a diagram illustrating an embodiment of a received signal.

FIG. 39 is a diagram illustrating an embodiment of a received signal. In the example shown, received signal 3900 comprises a signal received from a system comprising an ultrasound transmitter, an ultrasound receiver, and two ultrasound isolators coupled to a metal pipeline. Received signal 3900 comprises a received signal potentially in the presence of an inserted plastic pipeline. Received signal 3900 comprises reference signal magnitude 3902 and gas signal magnitude 3904. Reference signal magnitude 3902 comprises a magnitude of a first portion of an ultrasound signal at the ultrasound receiver. For example, reference magnitude 3902 comprises a peak magnitude measured during delay time 3802 of FIG. 38. For example, reference signal magnitude 3902 may correspond to ultrasound waves undergoing multiple reflections within the wall of the metal pipeline before reaching the ultrasound receiver. Gas signal magnitude 3904 comprises a magnitude of a second portion of an ultrasound signal at the ultrasound receiver. For example, gas signal magnitude 3904 comprises a peak magnitude measured during time-of-flight window 3804 of FIG. 38. For example, gas signal magnitude 3904 may correspond to ultrasound waves transmitted through the fluid in the metal pipeline. In some embodiments, the portion of an ultrasound signal having reference magnitude 3902 reaches the receiver before the portion of an ultrasound signal having gas signal magnitude 3904. In some embodiments, the portion of an ultrasound signal having reference magnitude 3902 reaches the receiver after the portion of an ultrasound signal having gas signal magnitude 3904. The ratio of gas signal amplitude 3904 to reference signal amplitude 3902 must be greater than a threshold in order to make a conclusive determination that received signal 3900 corresponds to a transmitted signal passing through fluid in the metal pipeline unobstructed by an inserted plastic pipeline. In some embodiments, a threshold in order to make a conclusive determination that received signal 3900 corresponds to a transmitted signal passing through fluid in the metal pipeline unobstructed by an inserted plastic pipeline is based at least in part on the frequency of the drive signal emitted by the ultrasound transmitter. For example, the magnitude of reference signal 3902 may be an indication of the effectiveness of the two ultrasonic isolators at reducing the amplitude of the ultrasound wave transmitted from an ultrasound transmitter to an ultrasound receiver through the metal wall of a metal pipeline. For example, in the absence of the two ultrasonic isolators, the magnitude of reference signal 3902 may be greater than the amplitude of gas signal 3904, thereby masking the ultrasonic signature corresponding to waves passing through an unobstructed metal pipeline.

Figure 40:
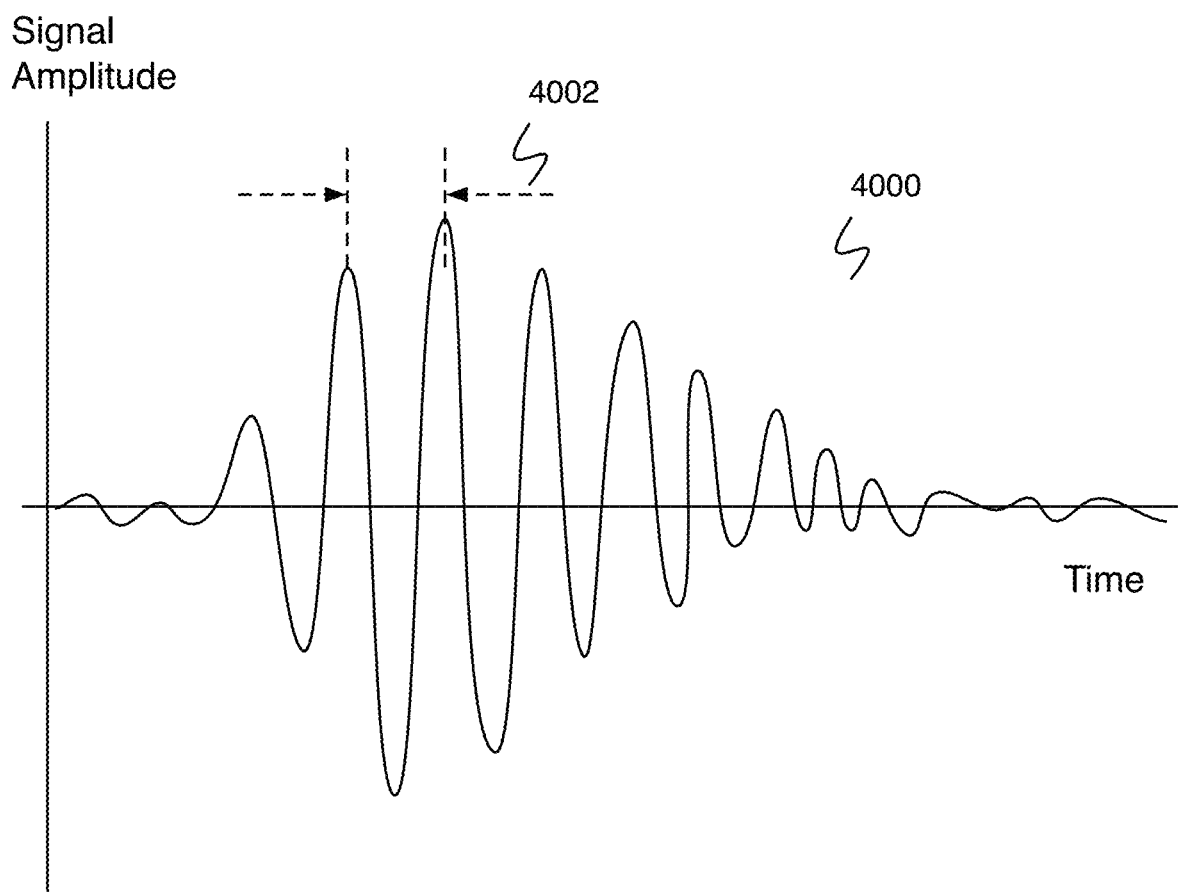
FIG. 40 is a diagram illustrating an embodiment of a received signal.

FIG. 40 is a diagram illustrating an embodiment of a received signal. In some embodiments, received signal of FIG. 40 comprises the received signal of FIG. 39. In the example shown, received signal 4000 comprises a signal received from a system comprising an ultrasound transmitter, an ultrasound receiver, and two ultrasound isolators coupled to a metal pipeline. Received signal 4000 comprises a received signal potentially in the presence of an inserted plastic pipeline. Received signal comprises signal period 4002. For example, signal period 4002 comprises a signal period measured during time-of-flight window 3804 of FIG. 38. Signal period 4002 corresponds to a received signal frequency. The received signal frequency must match a drive signal frequency to within an appropriate tolerance (e.g., within +/−10%) in order to make a conclusive determination that received signal 4000 corresponds to a transmitted signal passing through fluid in the metal pipeline unobstructed by an inserted plastic pipeline.

Figure 41:
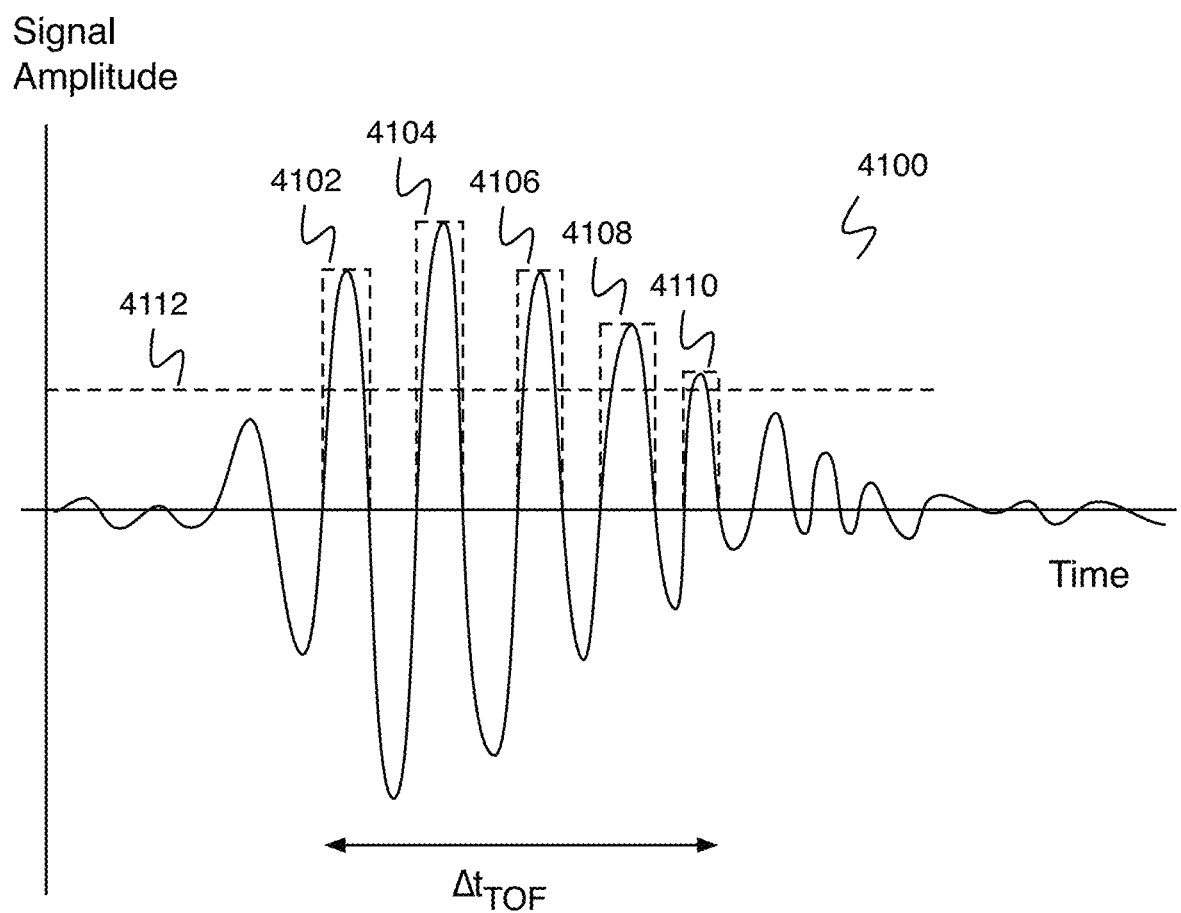
FIG. 41 is a diagram illustrating an embodiment of a received signal.

FIG. 41 is a diagram illustrating an embodiment of a received signal. In some embodiments, received signal of FIG. 41 comprises the received signal of FIG. 39. In the example shown, received signal 4100 comprises a signal received from a system comprising an ultrasound transmitter, an ultrasound receiver, and two ultrasound isolators coupled to a metal pipeline. Received signal 4100 comprises a received signal potentially in the presence of an inserted plastic pipeline. Received signal 4100 comprises received signal pulse 4102, received signal pulse 4104, received signal pulse 4106, received signal pulse 4108, and received signal pulse 4110. For example, received signal pulses comprise signal peaks received during time-of-flight window 3804 of FIG. 38. Received signal pulses are counted to determine a number of received signal pulses during a time-of-flight window. For example, the number of peaks is counted that are above threshold amplitude value 4112 within a time window (e.g., 5 above a threshold value). The number of received signal pulses during the time-of-flight window must be greater than a threshold number of received signal pulses in order to make a conclusive determination that received signal 4100 corresponds to a transmitted signal passing through fluid in the metal pipeline unobstructed by an inserted plastic pipeline. In some embodiments, received signal pulses may be compared to more than one threshold value (e.g., each signal pulse is determined to be above a first threshold value and below a second threshold value). In some embodiments, the value of amplitude threshold value 4112 is based at least in part on the frequency of the drive signal emitted by the ultrasound transmitter.

Figure 42:
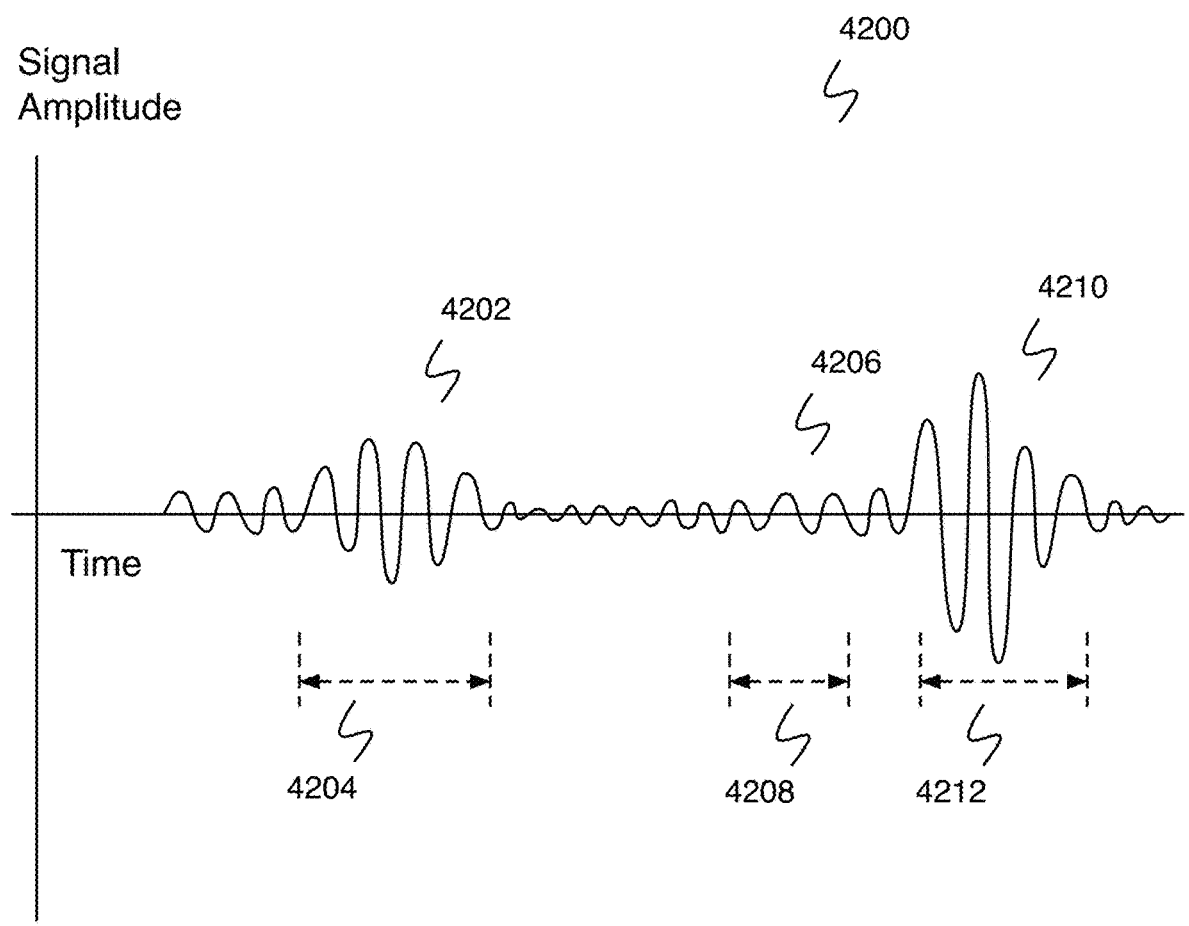
FIG. 42 is a diagram illustrating an embodiment of a received signal.

FIG. 42 is a diagram illustrating an embodiment of a received signal. In some embodiments, received signal of FIG. 42 comprises the received signal of FIG. 39 plus earlier received signals. In the example shown, received signal 4200 comprises a signal received from a system comprising an ultrasound transmitter, an ultrasound receiver, and two ultrasound isolators coupled to a metal pipeline. Received signal 4200 comprises pipe signal 4202 received during pipe time-of-flight region 4204, reference signal 4206 received during reference time-of-flight region 4208, and gas signal 4210 received during gas signal time-of-flight region 4212. The boundaries of pipe time-of-flight region 4204 are determined based at least in part on pipeline properties (e.g., on the time it takes an ultrasound wave to travel through the wall of a metal pipeline of the metal pipeline size and material). The amplitude of pipe signal 4202 comprises an indication of a transducer to pipe coupling and an isolator to pipe coupling. For example, a measurement that the amplitude of pipe signal 4202 is below a threshold amplitude comprises an indication that the transducer to pipe coupling is poor. A measurement that the amplitude of pipe signal 4202 is above a threshold amplitude comprises an indication that the isolator to pipe coupling is poor. A measurement that the time-of-flight of pipe signal 4202 is greater than an expected pipe signal time-of-flight or less than an expected pipe signal time-of-flight comprises an indication that the spacing between an ultrasound transmitter and an ultrasound receiver and/or that the wall thickness of the metal pipeline is not as expected. A ratio of the amplitude of gas signal 4210 to the amplitude of reference signal 4206 comprises an indication of the presence or absence of a plastic insert in the metal pipeline (e.g., a ratio of the amplitude of gas signal 4210 to the amplitude of reference signal 4206 above a threshold comprises an indication of the absence of a plastic insert in the metal pipeline and a ratio of the amplitude of gas signal 4210 to the amplitude of reference signal 4206 below a threshold comprises an indication of the presence of a plastic insert in the metal pipeline). For example, making the determination that received signal 4200 indicates a presence or an absence of a plastic insert in the metal pipeline comprises using a reference window portion of a received signal for calibration. In some embodiments, the threshold for ratio of the amplitude of gas signal 4210 to the amplitude of reference signal 4206 comprising an indication of the presence or absence of a plastic insert in the metal is based at least in part on the frequency of the drive signal emitted by the ultrasound transmitter.

In some embodiments, received signal 4200 is used to measure a time-of-flight and/or an amplitude of an ultrasound signal. For example, a time delay between a drive signal and a peak of pipe signal 4202 comprises an indication of the time-of-flight of an ultrasound signal through the metal pipeline wall following a direct path, a time delay between a drive signal and a peak of reference signal 4206 comprises an indication of the time-of-flight of an ultrasound signal through the metal pipeline wall after undergoing multiple reflections, and a time delay between a drive signal and a peak of gas signal 4210 comprises an indication of the time-of-flight of an ultrasound signal through a fluid enclosed by the metal pipeline wall. An amplitude of pipe signal 4202 comprises a measurement of the amplitude of an ultrasound signal having traveled through the metal pipeline wall following a direct path, an amplitude of reference signal 4206 comprises a measurement of the amplitude of an ultrasound signal having traveled through the metal pipeline wall after undergoing multiple reflections, and an amplitude of gas signal 4210 comprises a measurement of the amplitude of an ultrasound signal having traveled through a fluid enclosed by the metal pipeline wall.

In some embodiments, the pipe signal 4202 has amplitudes larger than reference signal 4206 and gas signal 4210. Typically, the amplitude of gas signal 4206 increases in proportion to the density of the enclosed fluid. In some embodiments, ultrasonic isolators can increase the amplitude of gas signal 4210 relative to reference signal 4206 and relative to pipe signal 4202.

Figure 43:
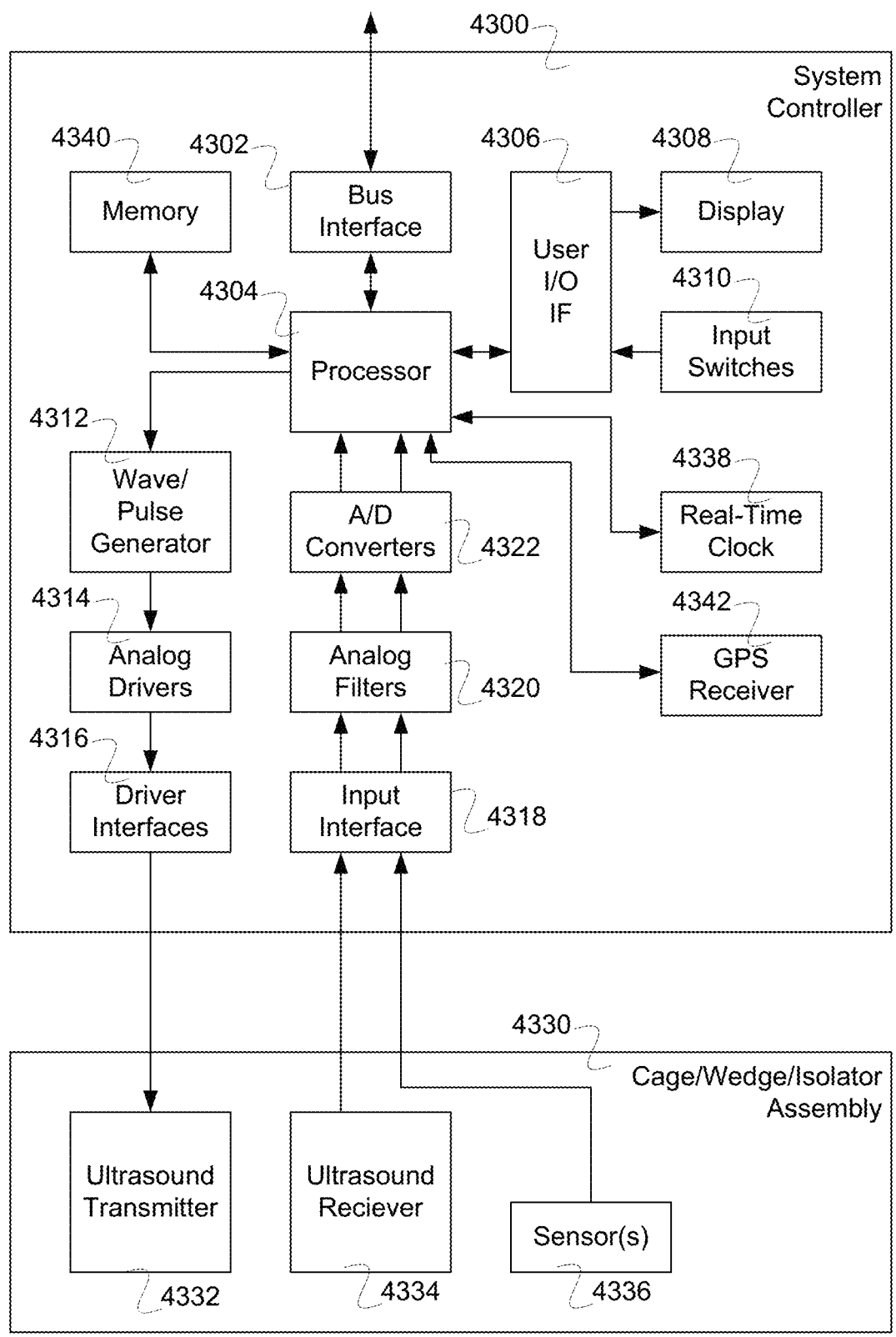
FIG. 43 is a diagram illustrating an embodiment of an ultrasound system.

FIG. 43 is a diagram illustrating an embodiment of an ultrasound system. In some embodiments, the ultrasound system is used for making a measurement with a complete assembly of an assembly alignment cage coupling two ultrasound wedges and isolators to a metal pipeline as in FIG. 33. In the example shown, system controller 4300 is electrically coupled to cage/wedge/isolator assembly 4330. A user using the system to make a measurement attaches cage/wedge/isolator assembly 4330 to a pipeline. The user attaches the input and output connectors to between the cage/wedge/isolator assembly 4330 to system controller 4300. The user then uses input switches (e.g., toggle switch(es), selector switch(es), rotary switch(es), and/or push button switch(es), etc.) to initiate a measurement. Processor 4304 receives the indication to initiate and requests other input parameters (e.g., pipeline type, size, etc.) and receives the information through switch settings (e.g., selector switch, pushbutton or rotary switch position).

Processor 4304 then performs one or more pre-measurement diagnostic test(s). A pre-measurement diagnostic test includes making a measurement by having processor 4304 indicate to wave/pulse generator 4312 to create a waveform appropriate for analog drivers 4314 to be output from system controller 4300 using driver interfaces 4316. The signals output using driver interfaces 4316 are provided to ultrasound transmitter 4332 of cage/wedge/isolator assembly 4330. The signals generate ultrasound waves using ultrasound transmitter 4332 (mounted in a wedge of cage/wedge/isolator assembly 4330) that propagate in the pipeline coupled to the wedge and positioned to launch the ultrasound waves toward ultrasound receiver 4334. The cage of cage/wedge/isolator assembly 4330 disposes a wedge housing ultrasound transmitter 4332, a wedge housing ultrasound receiver 4334, and isolator(s) with respect to a metal pipeline to enable a measurement. The pre-measurement diagnostic test(s) are designed to determine whether ultrasound transmitter 4332, ultrasound receiver 4334, and/or isolator(s) are positioned appropriately to make a measurement able to identify the presence or absence of an insert inside the pipeline. In various embodiments, the pre-measurement diagnostic test(s) are able to diagnose poor coupling of ultrasound transmitter 4332, ultrasound receiver 4334, and/or isolator(s) to the wall of the metal pipeline, inappropriate user-specified pipeline parameters (e.g., diameter, wall thickness, composition, etc. of the pipeline being measured), a missing electrical connection between ultrasound transmitter 4332, ultrasound receiver 4334 and system controller 4300, proximity of the measurement location to a feature (e.g., a weld, a pipe fitting, an abrupt change in wall thickness, an end of the pipe, etc.) on the pipeline that causes undesired return signals as well as any other appropriate system setup criteria. In various embodiments, the pre-measurement diagnostic test(s) are able to diagnose a low battery, loss of system or drive voltage regulation, real-time clock stoppage, a full memory as well as any other appropriate system condition criteria. In the event that pre-measurement diagnostic test(s) fail, the user is informed. In the event that pre-measurement diagnostic test(s) failure indicate(s) a system component failure, the tool may prevent the user from performing measurements until the fault is cleared by a qualified administrator. In the event that pre-measurement diagnostic test(s) pass, the user is informed and the test instrument is readied for a measurement of the pipeline.

A measurement is able to be made by a user by indicating and selecting appropriately using input switches 4310 on the system controller 4300. Processor 4304 indicates to wave/pulse generator 4312 that feeds a signal to analog drivers 4314 through driver interfaces 4316 to ultimately cause ultrasound transmitter 4332 to launch an ultrasound wave in a pipeline. Ultrasound receiver 4334 receives the ultrasound wave and converts it to an analog signal that is provided to input interface 4318 and filtered by analog filters 4320 ultimately to be converted for processor 4304 by A/D converters 4322. In various embodiments, analog filters 4320 comprise one or more of the following: a bandpass filter, a lowpass filter, a highpass filter, a bandstop filter, an allpass filter, or another suitable filter topology. In various embodiments, analog filters 4320 comprise passive filters, active filters, or a combination of passive and active filters. In various embodiments, input interface 4318 comprises a gain stage (e.g., a low-noise amplifier) and/or a signal multiplexer. In various embodiments, A/D converters 4322 comprise level comparators. Processor 4304 interprets received digitized signals to determine whether there is an insert in the pipeline.

In some embodiments, the ultrasound system of FIG. 43 is used for making a system self-test. In the example shown, system controller 4300 is electrically coupled to cage/wedge/isolator assembly 4330. A user using the system to perform a system self-test attaches cage/wedge/isolator assembly 4330 to a length of reference metal pipeline. The user attaches the input and output connectors to between the cage/wedge/isolator assembly 4330 to system controller 4300. The user then uses input switches (e.g., toggle switch(es), selector switch(es), rotary switch(es), and/or push button switch(es), etc.) to initiate a system self-test. Processor 4304 receives the indication to initiate and requests other input parameters (e.g., pipeline type, size, etc.) and receives the information through switch settings (e.g., selector switch or rotary switch position).

Processor 4304 then performs one or more system self-test(s). A system self-test comprises a measurement on an unobstructed reference metal pipeline and a measurement on an insert-containing reference metal pipeline. Typically, the unobstructed reference metal pipeline and the insert-containing reference metal pipeline used for performing a system self-test comprise the same reference metal pipeline and a plastic pipeline is either inserted or removed from within that reference metal pipeline depending on which measurement is being made. For example, display 4308 of system controller 4300 instructs a user to ensure the length of reference metal pipeline does not contain an insert, the user acknowledges the condition of the reference pipeline using input switches (e.g., toggle switch(es), selector switch(es), rotary switch(es), and/or push button switch(es), etc.), processor 4304 initiates a measurement and stores the outcome, display 4308 of system controller 4300 instructs a user to ensure the length of reference metal pipeline does contain an insert, the user acknowledges the condition of the reference pipeline using input switches (e.g., toggle switch(es), selector switch(es), rotary switch(es), and/or push button switch(es), etc.), processor 4304 initiates a measurement and stores the outcome. The system self-test is designed to determine whether system controller 4300 and cage/wedge/isolator assembly 4330 are functioning properly and/or properly calibrated. In some embodiments, the system calibration comprises values corresponding to time(s)-of-flight, signal amplitude threshold(s), and other values used by processor 4304 to determine whether a received signal indicates the presence of an empty metal pipeline or of an insert-containing metal pipeline. In the event a self-test fails, the user is informed and/or the tool is locked out to prevent the user from performing measurements on metal pipeline until the fault has been cleared by a qualified administrator.

In some embodiments, system controller may require system self-test(s) based on fixed criteria (e.g., after a predetermined number of measurement cycles or a predetermined time interval, etc.) or adaptive criteria (e.g., marginal or failing of pre-measurement diagnostics results, measurement results that indicate unfavorable measurement margin, etc.). For example, the system can indicate to the user that a system self-test is required and in some cases prevent measurements until the system self-test is successfully completed.

In some cases, the digitized signal is analyzed for its amplitude, and it is determined whether the received signal is within the correct time window and is larger than a noise threshold but lower than a signal threshold, which indicates that there is an insert in the pipeline. In some cases, the digitized signal is analyzed for its amplitude, and it is determined whether the received signal is within the correct time window and is larger than a threshold, which indicates that there is not an insert in the pipeline. In the event that the digitized signal does not provide a clear indication whether there is or if there is not an insert in the pipeline, the system can inform the user and/or repeat the measurement.

Sensor(s) 4336 in cage/wedge/isolator assembly 4330 may measure status of or signals from the transmitter and/or the status of or parameters regarding the ambient environment (e.g., temperature, etc.). In some embodiments, sensor(s) 4306 comprise a user identification device (e.g., a fingerprint sensor, a camera, an authentication token reader, a PIN reader, etc.). For example, a user identification device can be used to track system usage, attribute measurement results to a specific user, prevent unauthorized system usage, etc.

Bus interface 4302 is coupled to processor 4304 of system controller 4300 to enable communication between system controller 4300 and other devices or computer systems. In various embodiments, bus interface 4302 comprises a wired connection and/or a wireless connection to other devices or computer systems.

Real-time clock 4338 is coupled to processor 4304 of controller system 4300 and memory 4340 to log the result of a measurement (e.g., store the test parameters and outcome in a non-volatile memory for retrieval at a later time). In some embodiments, data stored in the data log are retrieved using display device 4308 and/or bus interface 4302.

GPS receiver 4342 is coupled to processor 4304 of controller system 4300 and memory 4340 to determine and log the coordinates of a measurement. For example, the latitude, longitude and elevation of a measurement are received from a positioning satellite system and stored in a non-volatile memory for retrieval at a later time. The aggregated data comprising test locations and outcomes can be used to automatically map pipeline assets. In some embodiments, tool coordinates can be used for geo-fencing (e.g., the measurement system only allows measurements to be made within whitelisted areas, the measurement system prevents measurements from being made within blacklisted areas, etc.). In various embodiments, the default pipeline parameters (e.g., composition, wall thickness, diameter, etc.) are based at least in part on the location of the measurement.

In some embodiments, processor 4304 of controller system 4300 uses an artificial intelligence algorithm that is trained (e.g., using a neural network, etc.) to determine whether an ultrasound received signal comprises an indication of an unobstructed pipe or of a pipe containing an insert or another obstruction.

Figure 44:
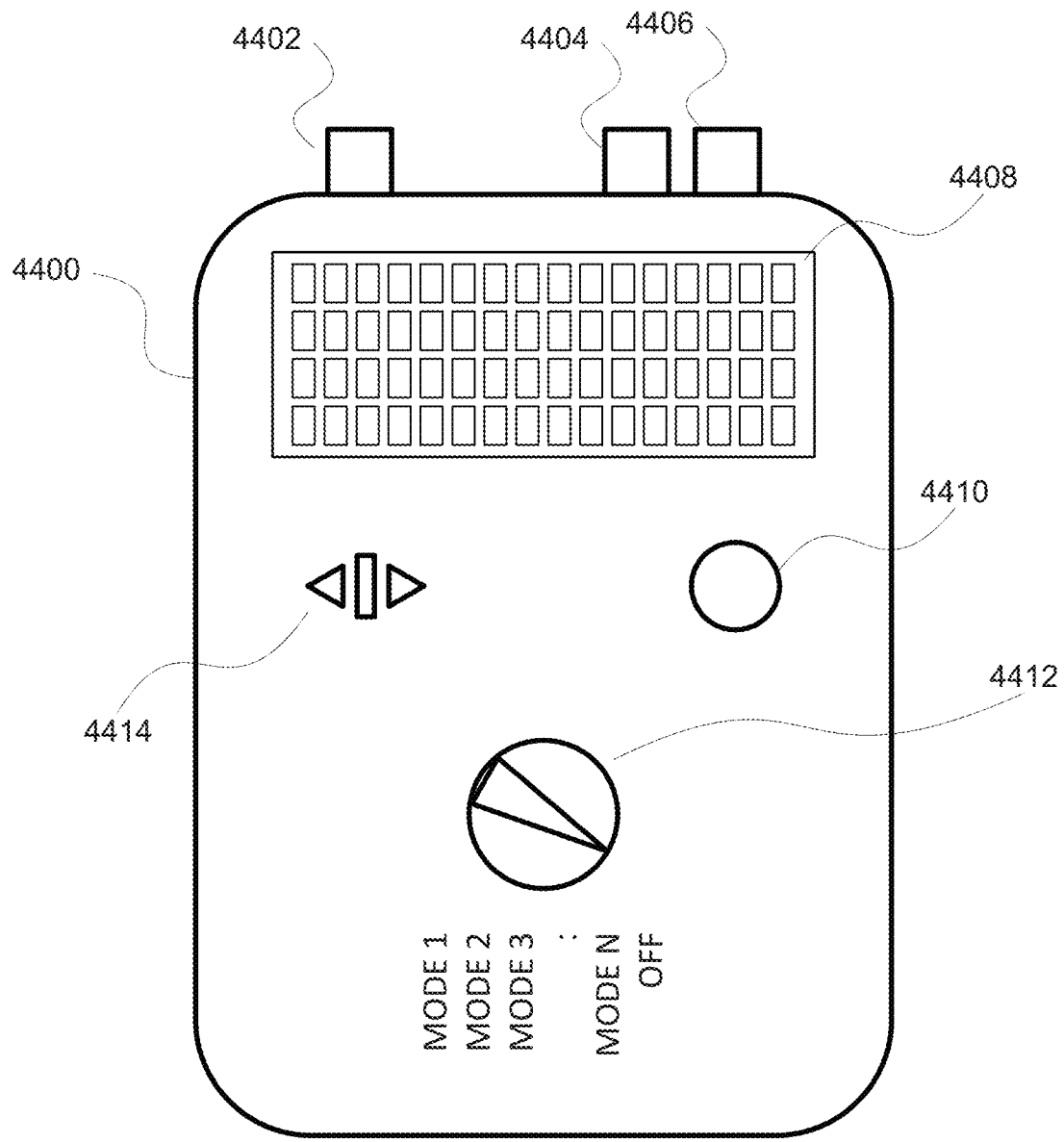
FIG. 44 is a diagram illustrating an embodiment of a user interface of a system controller.

FIG. 44 is a diagram illustrating an embodiment of a user interface of a system controller. In some embodiments, system controller interface 4400 of FIG. 44 is used to implement a user interface of system controller 4300 of FIG. 43. In the example shown, system controller interface 4400 includes an input connector 4402, output connector 4404, sensor connector 4406, display device 4408, push button 4410, rotary switch 4412, and toggle switch 4414. Input connector 4402 enables electrical coupling of system controller interface 4400 with an ultrasound receiver. Input connector 4402 and sensor connector 4406 are connected internally to an input interface, analog filter(s), and A/D converter(s) to provide the processor of the system controller with signal data. Output connector 4404 enables electrical coupling of system controller to an ultrasound transmitter. Output connector 4404 is connected internally to a driver interface, analog driver, and wave/pulse generator which provide stimulus generation for the ultrasound transmitter to generate ultrasound waves to measure a pipeline as controlled by the processor of the system controller. In various embodiments, system controller interface 4400 comprises a second input connector (i.e., in addition to input connector 4402) to support differential sensing and/or a second output connector (i.e., in addition to output connector 4404) to support differential driving. Display device 4408 provides output messages from the system controller to the user. For example, display device 4408 may comprise an N×M character display, a graphic display, or any other suitable type of display. Push button 4410, rotary switch 4412, and toggle switch 4414 enable user input for system controller. In some cases, push button 4410 is used to initiate a measurement; rotary switch 4412 is used to select an operating mode, and toggle switch 4414 is used to select pipe parameters.

Figure 45:
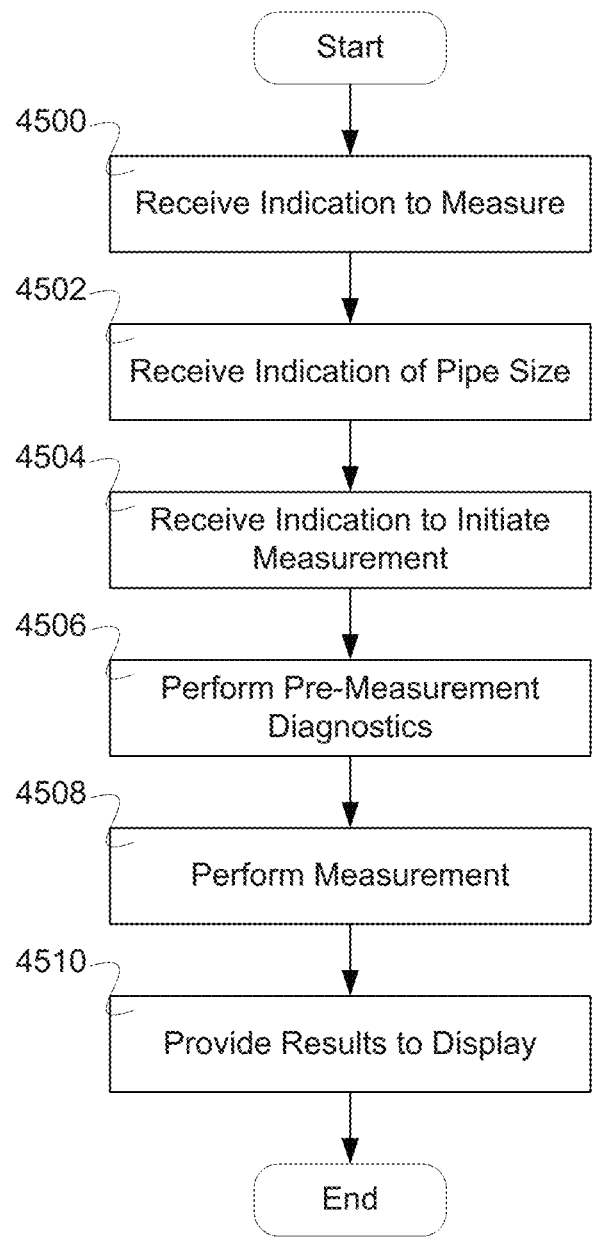
FIG. 45 is a flow diagram illustrating an embodiment of a process for operating an ultrasound system.

FIG. 45 is a flow diagram illustrating an embodiment of a process for operating an ultrasound system. In some embodiments, the process of FIG. 45 is executed using processor 4304 of FIG. 43. In the example shown, in 4500 an indication is received to measure. For example, the user indicates to the system to measure a pipeline by using a switch. In 4502, an indication of a pipe size is received. For example, a toggle switch is used to select the size, composition, and/or wall thickness of a pipeline to be measured. In 4504, an indication is received to initiate measurement. For example, a push button is pushed by a user to indicate to the system to start a measurement. In 4506, pre-measurement diagnostics are performed. For example, a test is made by generating an ultrasound wave using an ultrasound transmitter and receiving the ultrasound wave using an ultrasound receiver. The signal received is analyzed to make sure that its timing and amplitude are appropriate. The signals can indicate that coupling between transmitter, isolator, and/or receiver are appropriate as well as that the positioning of the transmitter, isolator, and/or receiver are appropriate. In the event that the pre-measurement diagnostics are not passed, the user is informed and it is indicated that the system is not ready to measure. In the event that the pre-measurement diagnostics are passed, the user is informed and it is indicated that the system is ready to measure. In 4508, the measurement is performed. For example, the system stimulates the pipeline with an ultrasound wave and the wave is detected and analyzed. In 4510, results are provided to the display. For example, the analysis indicates the presence or absence of an insert in the pipeline and this indication is displayed on a system display.

Figure 46:
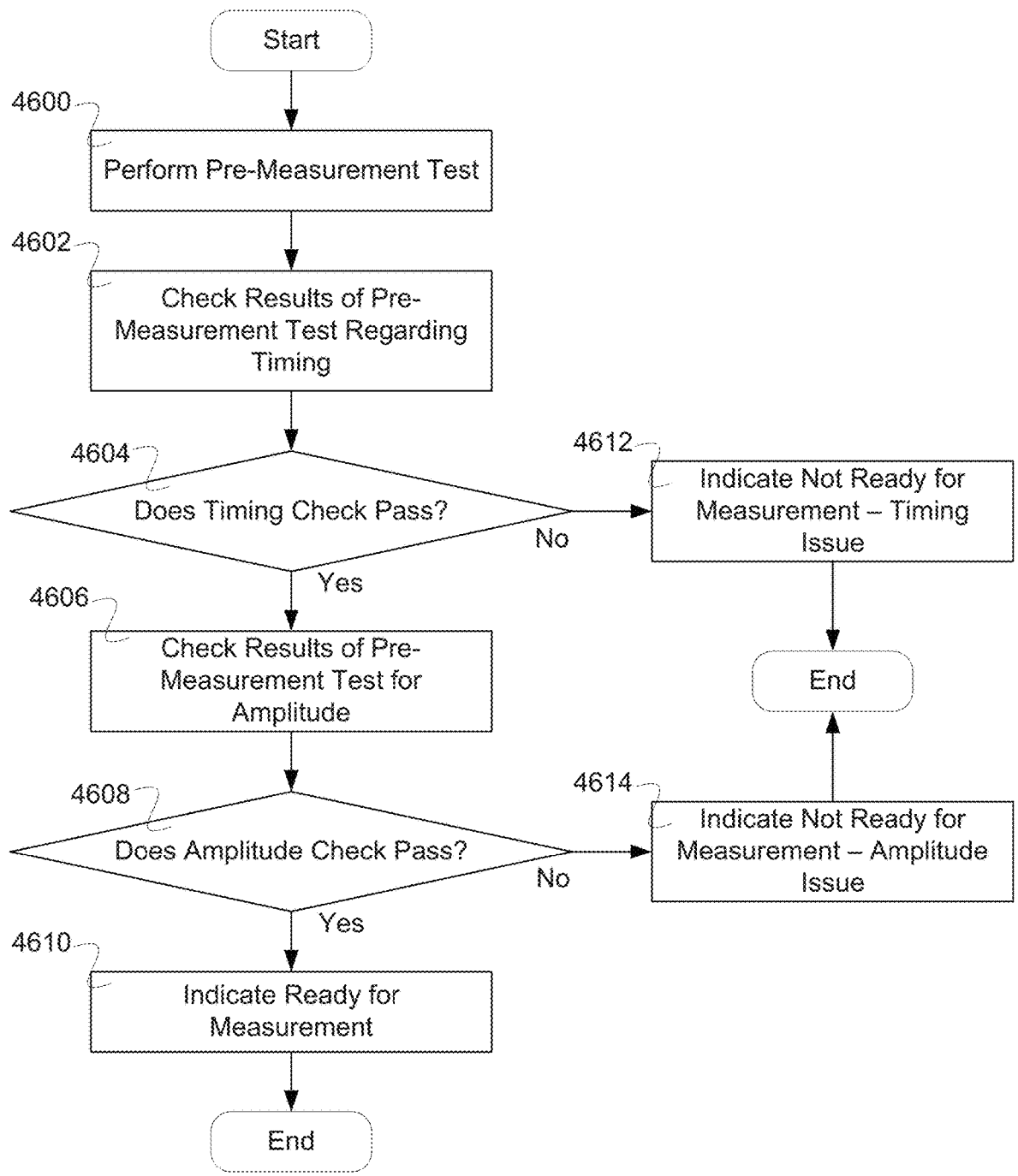
FIG. 46 is a flow diagram illustrating an embodiment of a process for pre-measurement diagnostics.

FIG. 46 is a flow diagram illustrating an embodiment of a process for pre-measurement diagnostics. In some embodiments, the process of FIG. 46 is used to implement 4506 of FIG. 45. In the example shown, in 4600 a pre-measurement test is performed. For example, a test ultrasound measurement is performed to determine whether timing and amplitude characteristics of the received wave are appropriate. In 4602, the results of pre-measurement test are checked regarding the timing. For example, the timing of the first set of waves received is examined to see whether the timing is appropriate for the pipeline wall, pipeline thickness, and pipeline composition. In 4604, it is determined whether the timing check is passed. For example, the timing of the signal that comes through the pipe wall is considered to verify the test setup (e.g., that the pipe is of the expected OD and wall thickness, that the wedges are properly located, etc.). For example, the time of arrival of the first set of signals (e.g., the pipe wall signal) is compared to an expected stored time window. In the event that the first set of signals falls within the expected time window, then the system confirms that the test setup is verified and indicates this to the user; In the event that the first set of signals does not fall within the expected time window, then the system indicates that the test setup is not confirmed and indicates this to the user.

In response to the timing check not passing, in 4612 it is indicated that there is a timing issue and the system is not ready for measurement and the process ends. In response to the timing check passing, in 4606 the results of pre-measurement test are checked regarding the amplitude. For example, the amplitude is checked to see if it is of appropriate size and that the coupling between components (e.g., transmitter and receiver and pipeline as well as isolators) is good as well as whether components are appropriately positioned. In 4608, it is determined whether the amplitude check is passed. For example, the signal amplitude of the first set of signals (e.g., the pipe wall signal) is also considered to verify the test setup (e.g., that the isolators are properly positioned and properly clamped to the pipe wall). For example, the amplitude of the first set of signals is compared to one or more thresholds to determine whether the amplitude is appropriate. In the event that the first set of signals is above a signal threshold, then the coupling between the isolators and the pipe is not adequate and the system indicates this to the user. In the event that the first set of signals is below a noise threshold, then the transmitter wedge and the receiver wedge may not be appropriately positioned or well coupled to the pipe wall and the system indicates this to the user. In the event that the first set of signals is above the noise threshold, but below a signal threshold, then the system indicates that the test setup is confirmed.

In response to the amplitude check not passing, in 4614 it is indicated that there is an amplitude issue and the system is not ready for measurement and the process ends. In response to the amplitude check passing, in 4610 it is indicated that the system is ready for a measurement.

In some embodiments, the automated pre-measurement diagnostics system looks for unexpected signals and in the event that unexpected signals are discovered, informs the user that unexpected signals are present and shuts down the measurement system. For example, the presence of an unexpected signal may comprise an indication of the presence of an ultrasound-reflecting feature (e.g., a hole, weld, valve, elbow, fitting, etc.) on the wall of the metal pipeline in proximity to the measurement location that could cause erroneous measurement results.

In some embodiments, the system uses the time arrival of the pipe signal to help determine the appropriate time window of a gas signal and time window of a reference signal and to automatically determine a set of pipe parameters. For example, the time window of a gas signal may be the product of the time of arrival of the pipe signal and a first constant, and the time window of a reference signal may be the product of the time of arrival of the pipe signal and a second constant, where a first constant and a second constant are determined at least in part by the composition, wall thickness and diameter of the metal pipeline, and the composition and temperature of the enclosed fluid.

In some embodiments, the system uses the amplitude of the pipe signal to help determine the appropriate amplitude threshold of a gas signal and amplitude threshold of a reference signal and to automatically determine a set of pipe parameters.

In some embodiments, the system uses differences between the change in the amplitude of a reference signal at a first drive frequency and the amplitude of a reference signal at a second drive frequency, and between the change in the amplitude of a gas signal at a first drive frequency and the amplitude of a gas signal at a second drive frequency as part of the determination of the presence of an insert or other obstruction within a metal pipeline.

Figure 47:
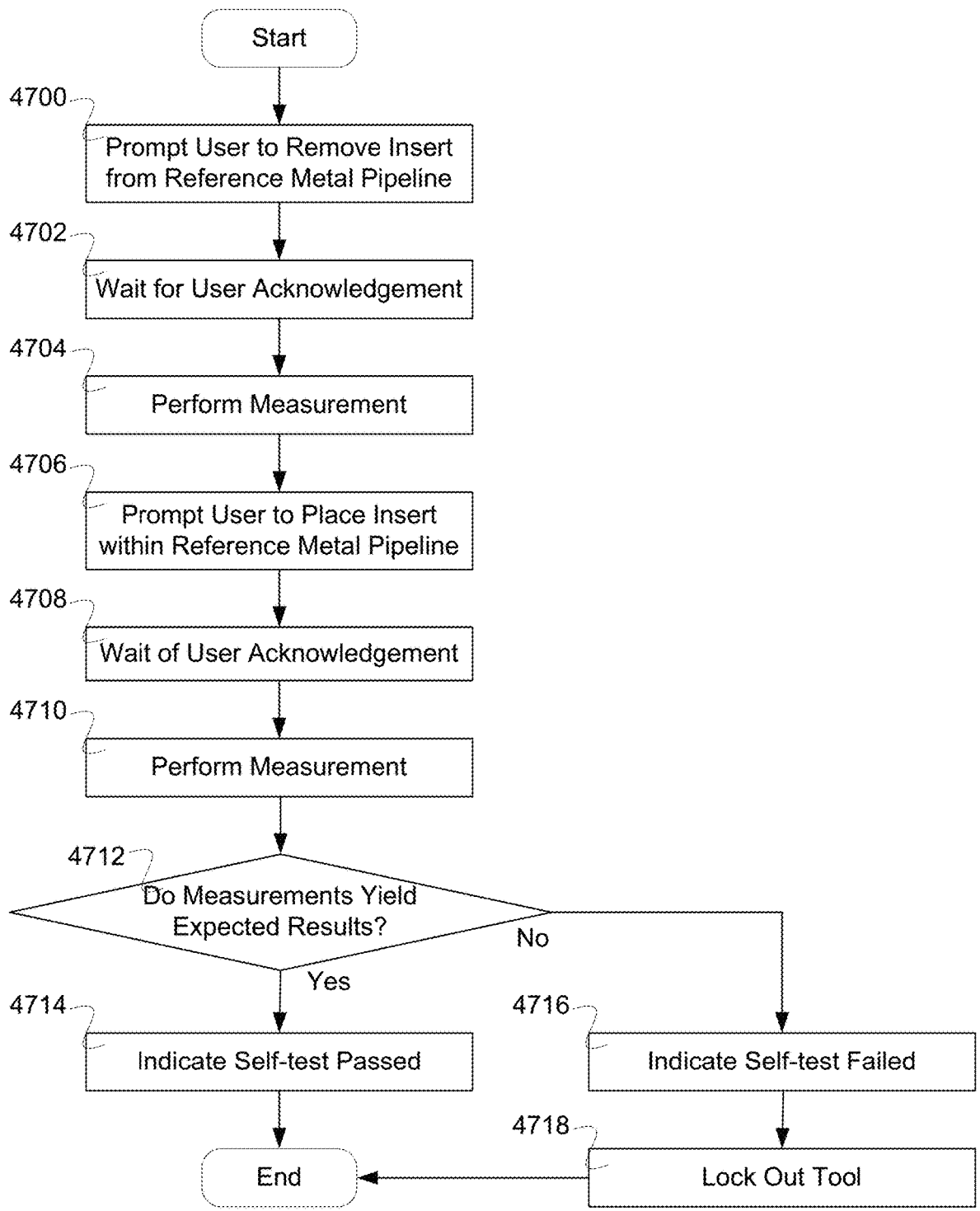
FIG. 47 is a flow diagram illustrating an embodiment of a process for a measurement system self-test.

FIG. 47 is a flow diagram illustrating an embodiment of a measurement system self-test. In some embodiments, the process of FIG. 47 is used to implement 4506 of FIG. 45. In the example shown, in 4700 a user is prompted to remove an insert from a reference metal pipeline. For example, a user is prompted to remove any insert (or other obstruction) from a length of reference metal pipeline. In 4702, user acknowledgement is waited for. For example, the system waits for the user to acknowledge the condition of the reference metal pipeline using input switches (e.g., toggle switch(es), selector switch(es), rotary switch(es), and/or push button switch(es), etc.). In 4704, a measurement is performed. For example, an ultrasound measurement is performed to determine whether timing and amplitude characteristics of the received wave are appropriate for an unobstructed pipeline. In 4706, the user is prompted to place an insert within the reference metal pipeline. In 4708, user acknowledgement is waited for. For example, the system waits for the user to acknowledge the condition of the reference metal pipeline using input switches (e.g., toggle switch(es), selector switch(es), rotary switch(es), and/or push button switch(es), etc.). In 4710 a measurement is performed. For example, an ultrasound measurement is performed to determine whether timing and amplitude characteristics of the received wave are appropriate for a pipeline containing an insert or another type of obstruction. In 4712, it is determined whether the measurements yielded the expected results. For example, it is determined whether the self-test is passed by determining that the results of measurement 4704 is consistent with the expected outcome for an unobstructed reference metal pipeline and the result of measurement 4710 is consistent with the expected outcome for a reference metal pipeline containing an insert. For example, the self-test is not passed when a determination that the result of measurement 4704 is inconsistent with the expected outcome for an unobstructed reference metal pipeline and/or the result of measurement 4710 is inconsistent with the expected outcome for a reference metal pipeline containing an insert.

In response to the measurements yielding the expected results, in 4714 it is indicated that the self-test passed, and the process ends. For example, the system has passed its self-test and is ready for making measurements. In response to the measurements not yielding the expected results, in 4716 it is indicated that the self-test failed. For example, the system has not passed its self-test and is not ready for making measurements. In 4718, the tool is locked out. For example, the measurement system is locked out to prevent the user from using it to make measurements and the process ends. In some embodiments, the system lock out may be bypassed.

In some embodiments, measurement 4704 and/or measurement 4710 include a pre-measurement test as in FIG. 46.

Figure 48:
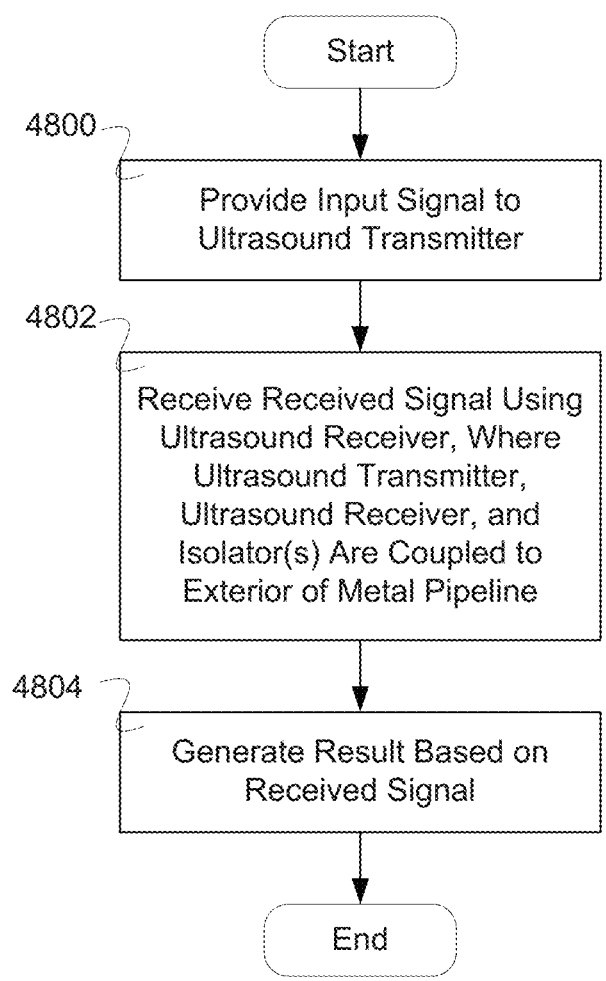
FIG. 48 is a flow diagram illustrating an embodiment of a process for an inspection measurement.

FIG. 48 is a flow diagram illustrating an embodiment of a process for an inspection measurement. In some embodiments, the process of FIG. 48 is executed by system controller 4300 of FIG. 43. In some embodiments, the process of FIG. 48 is used to implement 4508 of FIG. 45, 4600 of FIG. 46, or 4704 or 4710 of FIG. 47. In the example shown in 4800, an input signal is provided to an ultrasound transmitter. For example, the processor of the system controller provides an indication to generate an appropriate signal to drive an ultrasound transmitter attached to a pipeline. In 4802, a received signal is received using an ultrasound receiver, wherein the ultrasound transmitter, the ultrasound receiver, and an isolator are coupled to an exterior of a metal pipeline. For example, an ultrasound receiver is positioned to receive the ultrasound waves generated by an ultrasound transmitter and with isolation for a path through the pipeline wall using isolators. The received waves are analyzed to determine the presence or absence of an insert in the pipeline. In 4804, a result is provided based at least in part on the received signal. For example, the received signal is processed by using the reference signal and determining whether the gas signal is more than a threshold amplitude greater than the reference signal amplitude. For example, the received signal is checked that it has the same periodicity or frequency as the input pulses and that there are more than a threshold number of pulses whose amplitude is greater than an amplitude threshold. In some embodiments, the difference in amplitude between the gas signal and reference signal, the frequency of the received signal and the number of received pulses are checked at more than one frequency of the drive signal to determine the presence or absence of an insert in the pipeline.

Figure 49:
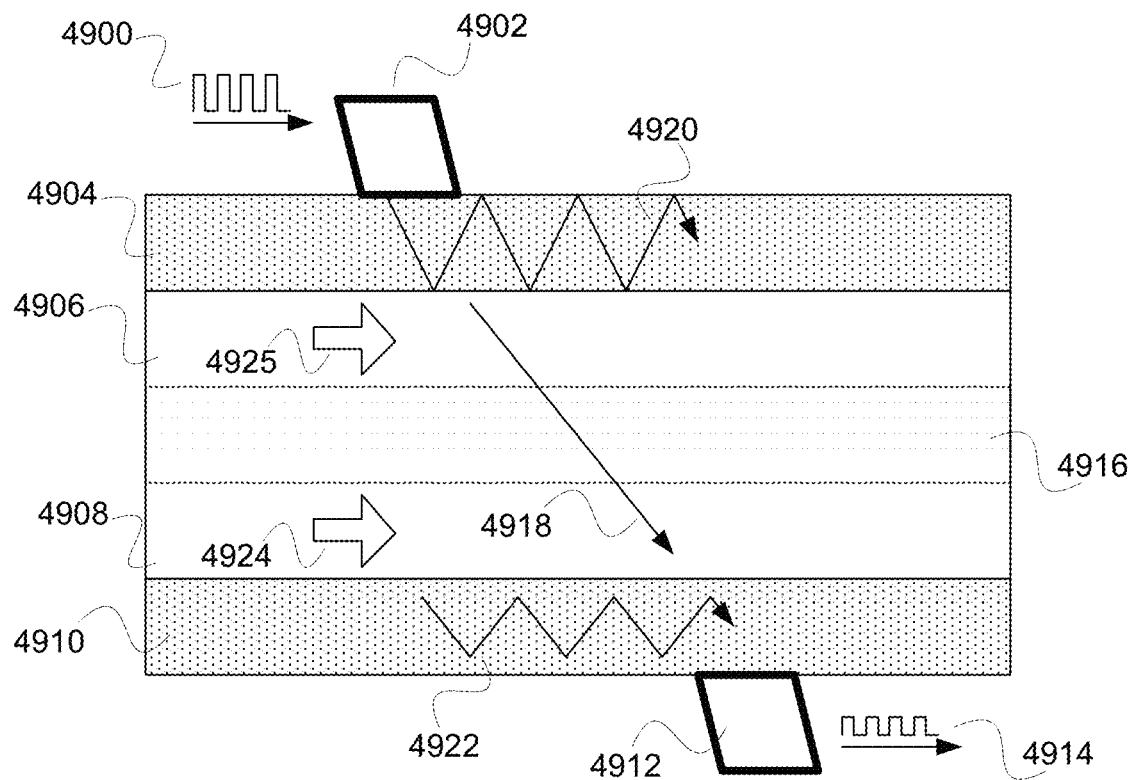
FIG. 49 is a diagram illustrating an embodiment of a system for determination of an average flow of a fluid internal to a metal pipeline based at least in part on an input signal, a received downstream signal, and a received upstream signal.

FIG. 49 is a diagram illustrating an embodiment of a system for determination of an average flow of a fluid internal to a metal pipeline based at least in part on an input signal, a received downstream signal, and a received upstream signal. In the example shown, metal pipeline 4904 is shown in a cross section view of a length of pipe cut along a diameter. In various embodiments, metal pipeline 4904 comprises a pipe made from iron, cast iron, steel, another metal, an alloy or any other appropriate material. Metal pipeline 4904 comprises a pipeline of any appropriate outer diameter and wall thickness. Typically, metal pipeline 4904 comprises a pipeline with outer diameter in the range of ½" to 12" and wall thickness in the range of ¹⁄₃₂" to ½". Metal pipeline 4904 encloses enclosed fluid 4908 flowing at an average velocity in a direction denoted by direction of flow 4924 and direction of flow 4925. In various embodiments, enclosed fluid 4908 comprises one or more of the following: air at atmospheric pressure, a gas at less than 100 psi gauge, methane, natural gas, ethane, propane, butane, isobutene, ethylene, propylene, gasoline, butylene, and/or isobutylene, a combination of gases, or any other appropriate gas or fluid. Upstream ultrasound transducer 4902 and downstream ultrasound transducer 4912 are coupled to metal pipeline 4904. Ultrasound isolator 4916 is coupled to metal pipeline 4904 along the outer wall of metal pipeline 4904. In some embodiments, more than one ultrasonic isolator is coupled to metal pipeline 4904 (e.g., an ultrasonic isolator is coupled opposite ultrasonic isolator 4916).

In the example shown, the system is depicted measuring a downstream signal. Upstream ultrasound transducer 4902 is driven with ultrasound drive signal 4900 (e.g., a square wave). Upstream ultrasound transducer 4902 couples ultrasound waves 4920 into metal pipeline 4904. For example, ultrasound wave 4920 comprises a Lamb wave mode. The out-of-plane component of ultrasound wave 4920 (e.g., up and down as drawn in FIG. 49) couples ultrasound vibrational energy into fluid 4906 and fluid 4908, creating downstream ultrasound waves 4918. For example, downstream ultrasound waves 4918 comprise pressure waves in the direction of direction of fluid flow 4924 and fluid flow 4925. Downstream ultrasound waves 4918 propagate across fluid 4906 and fluid 4908 and couple into pipe wall region 4910, creating ultrasound wave 4922. For example, ultrasound wave 4922 comprises a Lamb wave mode. Ultrasound wave 4922 is received by downstream ultrasound transducer 4912 and is converted to received downstream ultrasound signal 4914. Typically, received ultrasound signal 4914 comprises an amplitude-scaled and time-delayed version of ultrasound drive signal 4900. The time delay comprises the time-of-flight of the downstream measurement.

Figure 50:
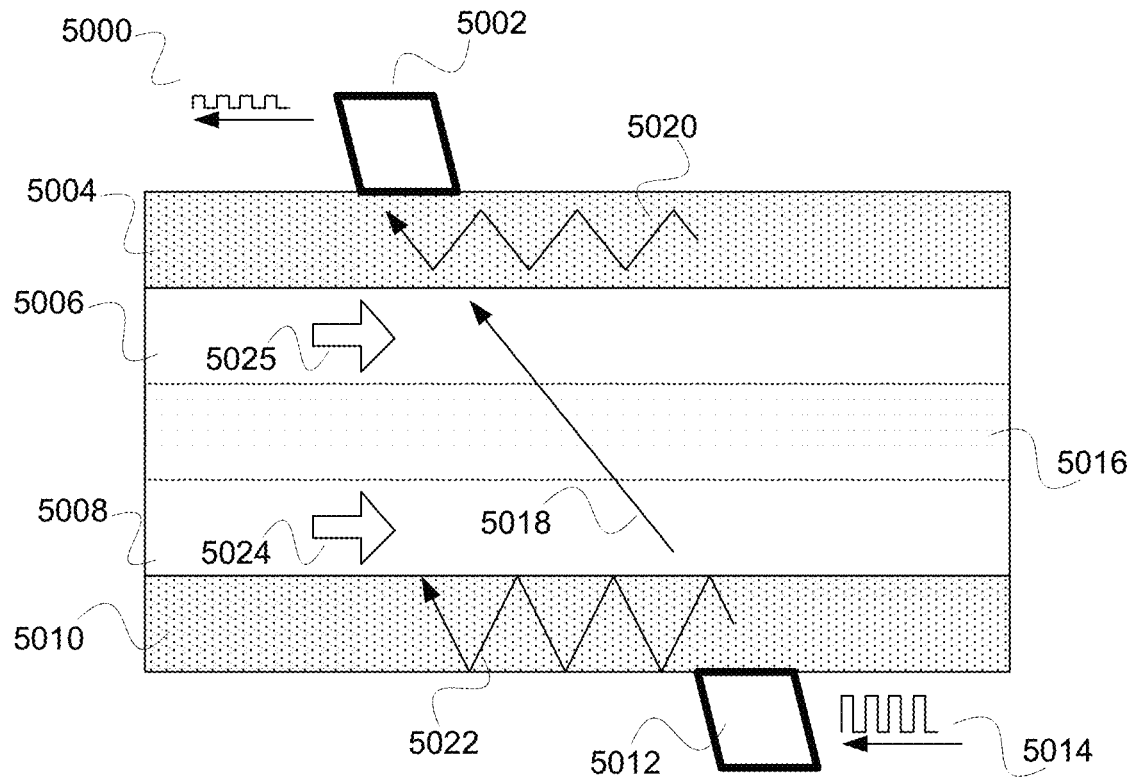
FIG. 50 is a diagram illustrating an embodiment of a system for determination of an average flow of a fluid internal to a metal pipeline based at least in part on an input signal, a received downstream signal, and a received upstream signal.

FIG. 50 is a diagram illustrating an embodiment of a system for determination of an average flow of a fluid internal to a metal pipeline based at least in part on an input signal, a received downstream signal, and a received upstream signal. In the example shown, metal pipeline 5004 is shown in a cross section view of a length of pipe cut along a diameter. In various embodiments, metal pipeline 5004 comprises a pipe made from iron, cast iron, steel, another metal, an alloy or any other appropriate material. Metal pipeline 5004 comprises a pipeline of any appropriate outer diameter and wall thickness. Typically, metal pipeline 5004 comprises a pipeline with outer diameter in the range of ½" to 12" and wall thickness in the range of ⅟32" to ½". Metal pipeline 5004 encloses enclosed fluid 5008 flowing at an average velocity in a direction denoted by direction of flow 5024 and direction of flow 5025. In various embodiments, enclosed fluid 5008 comprises one or more of the following: air at atmospheric pressure, a gas at less than 100 psi gauge, methane, natural gas, ethane, propane, butane, isobutene, ethylene, propylene, gasoline, butylene, and/or isobutylene, a combination of gases, or any other appropriate gas or fluid. Upstream ultrasound transducer 5002 and downstream ultrasound transducer 5012 are coupled to metal pipeline 5004. Ultrasound isolator 5016 is coupled to metal pipeline 5004 along the outer wall of metal pipeline 5004. In some embodiments, more than one ultrasonic isolator is coupled to metal pipeline 5004 (e.g., an ultrasonic isolator is coupled opposite ultrasonic isolator 5016).

To measure an upstream signal, downstream ultrasound transducer 5012 is driven with ultrasound drive signal 5014 (e.g., a square wave). Downstream ultrasound transducer 5012 couples ultrasound waves 5022 into metal pipeline 5010. For example, ultrasound wave 5022 comprises a Lamb wave mode. The out-of-plane component of ultrasound wave 5022 (e.g., up and down as drawn in FIG. 50) couples ultrasound vibrational energy into fluid 5008 and fluid 5006, creating upstream ultrasound waves 5018. For example, upstream ultrasound waves 5018 comprise pressure waves against the direction of direction of fluid flow 5024 and fluid flow 5025. Upstream ultrasound waves 5018 propagate across fluid 5008 and fluid 5006 and couple into pipe wall region 5004, creating ultrasound wave 5020. For example, ultrasound wave 5020 comprises a Lamb wave mode. Ultrasound wave 5020 is received by upstream ultrasound transducer 5002 and is converted to received upstream ultrasound signal 5000. Typically, received ultrasound signal 5000 comprises an attenuated and time-delayed version of ultrasound drive signal 5014. The time delay comprises the time-of-flight of the upstream measurement.

The average flow velocity of a fluid enclosed within a metal pipeline is determined at least in part based on the difference between the time-of-flight of the downstream measurement and the time-of-flight of the upstream measurement, the distance between the upstream ultrasound transducer and the downstream ultrasound transducer, the composition, diameter and wall thickness of the metal pipeline, and the composition, temperature and flow velocity of the enclosed fluid. Typically, the time-of-flight of the downstream measurement is less than the time-of-flight of the upstream measurement.

Ultrasonic isolator 4916 and ultrasound isolator 5016 increases the measurement signal-to-noise ratio. Greater signal-to-noise can enable greater flow velocity measurement accuracy for a given gas pressure, maintaining flow velocity measurement accuracy at a lower gas pressure, maintaining flow velocity measurement accuracy for a lower molar mass gas, or a combination.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An isolating device for creating an ultrasound boundary, comprising:
   a structure with a first region of acoustic impedance and a second region of acoustic impedance, wherein the first acoustic impedance and the second acoustic impedance are different from each other, wherein the structure causes a boundary that confines a wave in a metal pipeline wave wall region using an impedance mismatch created by the first region of acoustic impedance and the second region of acoustic impedance, wherein the structure is in contact with a metal pipeline adjacent to the metal pipeline wave wall region, wherein the structure is made from one or more of the following; a metal, a void, and/or a polymer, wherein the structure comprises a staggered comb structure with at least one finger that does not run a full length of the structure, and wherein the staggered comb structure has a longitudinal groove configuration with fingers oriented along a longitudinal direction of the metal pipeline.

2. The isolating device of claim 1, wherein the structure comprises fingers-away-from-coupling topology and/or fingers-toward-coupling topology.

3. The isolating device of claim 1, wherein the structure is periodic.

4. The isolating device of claim 3, wherein structure is periodic parallel and/or perpendicular to an axis of the metal pipeline.

5. The isolating device of claim 3, wherein a periodicity of the structure is related to a wavelength of the wave in a wall of the metal pipeline.

6. The isolating device of claim 1, wherein the structure is potted in an ultrasound damping material.

7. The isolating device of claim 3, wherein a periodicity of the structure is approximately a half of a wavelength of the wave in a wall of the metal pipeline.

8. The isolating device of claim 1, wherein an ultrasound damping potting material comprises a third region of acoustic impedance.

9. The isolating device of claim 1, wherein the structure is configured to confine the wave in a circumferential direction of the metal pipeline.

10. The isolating device of claim 1, wherein the first region of acoustic impedance is approximately equal to a metal pipeline wall acoustic impedance and the second region of acoustic impedance is higher than the metal pipeline wall acoustic impedance.

11. The isolating device of claim 1, wherein the first region of acoustic impedance is approximately equal to a metal pipeline wall acoustic impedance and the second region of acoustic impedance is lower than the metal pipeline wall acoustic impedance.

12. The isolating device of claim 1, wherein the metal pipeline comprises a metal pipeline isolating device wall region and the metal pipeline wave wall region, wherein the structure is configured to attenuate amplitudes of waves in the pipeline isolating device wall region where the structure is in contact with the metal pipeline and increases amplitudes of waves in the metal pipeline wave wall region.

13. The isolating device of claim 1, wherein the structure is configured to reflect a portion of the wave in the metal pipeline wave wall region at the interface where the structure is in contact with the metal pipeline adjacent to the metal pipeline wave wall region.

14. The isolating device of claim 1, wherein the structure is one of a plurality of structures.

15. The isolating device of claim 14, wherein the plurality of structures are positioned around a circumference of the metal pipeline creating regions of attenuated and/or increased wave amplitudes.

16. The isolating device of claim 1, wherein the structure is mounted on an exterior wall of the metal pipeline.

17. The isolating device of claim 16, wherein a surface of the structure is contoured to fit the exterior wall of the metal pipeline.

18. The isolating device of claim 16, wherein a surface of the structure is clamped against the exterior wall of the metal pipeline.

19. The isolating device of claim 1, wherein the isolating device includes a mounting hole for mechanical fastening.

20. The isolating device of claim 1, wherein the isolating device is removable from the metal pipeline.

21. The isolating device of claim 1, wherein the structure is in contact with a portion of a circumference of a wall of the metal pipeline.

22. The isolating device of claim 1, wherein an ultrasonic couplant gel is disposed between the structure and the metal pipeline to enhance coupling between the structure and the metal pipeline.

23. An isolating device for creating an ultrasound boundary, comprising:
   a structure with a first region of acoustic impedance and a second region of acoustic impedance, wherein the first acoustic impedance and the second acoustic impedance are different from each other, wherein the structure causes a boundary that confines a wave in a metal pipeline wave wall region using an impedance mismatch created by the first region of acoustic impedance and the second region of acoustic impedance, wherein the structure is in contact with a metal pipeline adjacent to the metal pipeline wave wall region, wherein the structure is made from one or more of the following; a metal, a void, and/or a polymer, wherein the structure is periodic, wherein the structure comprises a staggered comb structure with at least one finger that does not run a full length of the structure, and wherein the staggered comb structure has a longitudinal groove configuration with fingers oriented along a longitudinal direction of the metal pipeline.

24. The isolating device of claim 23, wherein the structure comprises fingers-away-from-coupling topology and/or fingers-toward-coupling topology.

25. The isolating device of claim 23, wherein structure is periodic parallel or perpendicular to an axis of the metal pipeline.

26. The isolating device of claim 23, wherein the structure is potted in an ultrasound damping material.

27. The isolating device of claim 23, wherein a periodicity of the structure is approximately a half of a wavelength of the wave in a wall of the metal pipeline.

28. The isolating device of claim 23, wherein an ultrasound damping potting material comprises a third region of acoustic impedance.

29. The isolating device of claim 23, wherein the structure is configured to confine the wave in a circumferential direction of the metal pipeline.

30. The isolating device of claim 23, wherein the first region of acoustic impedance is approximately to a metal pipeline wall acoustic impedance and the second region of acoustic impedance is higher than the metal pipeline wall acoustic impedance.

31. The isolating device of claim 23, wherein the first region of acoustic impedance is approximately equal to a metal pipeline wall acoustic impedance and the second region of acoustic impedance is lower than the metal pipeline wall acoustic impedance.

32. The isolating device of claim 23, wherein the metal pipeline comprises a metal pipeline isolating device wall region and the metal pipeline wave wall region, wherein the structure is configured to attenuate amplitudes of waves in the pipeline isolating device wall region where the structure is in contact with the metal pipeline and increases amplitudes of waves in the metal pipeline wave wall region.

33. The isolating device of claim 23, wherein the structure is configured to reflect a portion of the wave in the metal pipeline wave wall region at the interface where the structure is in contact with the metal pipeline adjacent to the metal pipeline wave wall region.

34. The isolating device of claim 23, wherein the structure is one of a plurality of structures.

35. The isolating device of claim 34, wherein the plurality of structures are positioned around a circumference of the metal pipeline creating regions of attenuated and/or increased waves.

36. The isolating device of claim 23, wherein the structure is mounted on an exterior wall of the metal pipeline and is removable.

37. The isolating device of claim 36, wherein a surface of the structure is contoured to fit the exterior wall of the metal pipeline.

38. The isolating device of claim 36, wherein a surface of the structure is clamped against the exterior wall of the metal pipeline.

39. The isolating device of claim 23, wherein the isolating device includes a mounting hole for mechanical fastening.

40. The isolating device of claim 23, wherein the isolating device is removable from the metal pipeline.

41. The isolating device of claim 23, wherein the structure is in contact with a portion of a circumference of the wall of the metal pipeline.

42. The isolating device of claim 23, wherein an ultrasonic couplant gel is disposed between the structure and the metal pipeline to enhance coupling between the structure and the metal pipeline.

* * * * *